US011250352B2

(12) United States Patent
Hammad

(10) Patent No.: US 11,250,352 B2
(45) Date of Patent: Feb. 15, 2022

(54) SECURE ANONYMOUS TRANSACTION APPARATUSES, METHODS AND SYSTEMS

(71) Applicant: Visa International Service Association, San Francisco, CA (US)

(72) Inventor: Ayman Hammad, Pleasanton, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 164 days.

(21) Appl. No.: 16/592,236

(22) Filed: Oct. 3, 2019

(65) Prior Publication Data

US 2020/0034753 A1 Jan. 30, 2020

Related U.S. Application Data

(63) Continuation of application No. 15/666,466, filed on Aug. 1, 2017, now Pat. No. 10,482,398, which is a
(Continued)

(51) Int. Cl.
*G06Q 10/00* (2012.01)
(52) U.S. Cl.
CPC .................................. *G06Q 10/00* (2013.01)
(58) Field of Classification Search
CPC ....................................................... G06Q 10/00
(Continued)

(56) References Cited

U.S. PATENT DOCUMENTS

| 789,106 A | 5/1905 | Seymour |
| 5,237,164 A | 8/1993 | Takada |

(Continued)

FOREIGN PATENT DOCUMENTS

| EP | 855659 | 11/2007 |
| JP | 2008545210 | 12/2008 |

(Continued)

OTHER PUBLICATIONS

U.S. Appl. No. 13/407,719, "Advisory Action", dated May 5, 2017, 1 page.
(Continued)

*Primary Examiner* — Russell S Glass
(74) *Attorney, Agent, or Firm* — Kilpatrick Townsend & Stockton LLP

(57) ABSTRACT

The SECURE ANONYMOUS TRANSACTION APPARATUSES, METHODS AND SYSTEMS ("SAT") transform hardware-verified user authentication requests via SAT components into secure transaction notifications. In one implementation, the SAT obtains a secure anonymous transaction user authentication request. The SAT verifies the authenticity of a user, using the secure anonymous transaction user authentication request. The SAT obtains an authenticated purchase order, in response to which it generates a one-time anonymous card account. Using the one-time card account, the SAT generates an anonymized purchase order for a merchant, and provides the anonymized purchase order. On obtaining a purchase notification for the anonymized purchase order, the SAT provides a real-time notification for a user of the purchase notification. Also, on obtaining notification of a shipment related to the anonymized purchase order to an anonymized address, the SAT generates an order to re-route the shipment from the anonymized address to an actual shipment address of the user.

20 Claims, 37 Drawing Sheets

Example: Secure Anonymous Transactions

Related U.S. Application Data continuation of application No. 13/407,719, filed on Feb. 28, 2012, now Pat. No. 9,773,212.

(60) Provisional application No. 61/447,644, filed on Feb. 28, 2011, provisional application No. 61/468,569, filed on Mar. 28, 2011, provisional application No. 61/469,063, filed on Mar. 29, 2011.

(58) Field of Classification Search
USPC .......................................................... 705/16
See application file for complete search history.

(56) References Cited

U.S. PATENT DOCUMENTS

| | | |
|---|---|---|
| 5,311,594 A | 5/1994 | Penzias |
| 5,446,890 A | 8/1995 | Renslo et al. |
| 5,459,656 A | 10/1995 | Fields et al. |
| 5,510,777 A | 4/1996 | Pile et al. |
| 5,521,362 A | 5/1996 | Powers |
| 5,530,438 A | 6/1996 | Bickham et al. |
| 5,536,045 A | 7/1996 | Adams |
| 5,615,110 A | 3/1997 | Wong |
| 5,615,264 A | 3/1997 | Kazmierczak et al. |
| 5,649,118 A | 7/1997 | Carlisle et al. |
| 5,815,657 A | 9/1998 | Williams et al. |
| 5,850,446 A | 12/1998 | Berger et al. |
| 5,878,337 A | 3/1999 | Joao et al. |
| 5,903,830 A | 5/1999 | Joao et al. |
| 5,943,624 A | 8/1999 | Fox et al. |
| 5,963,924 A | 10/1999 | Williams et al. |
| 6,064,990 A | 5/2000 | Goldsmith |
| 6,092,053 A | 7/2000 | Boesch et al. |
| 6,202,052 B1 | 3/2001 | Miller |
| 6,202,933 B1 | 3/2001 | Poore et al. |
| 6,263,447 B1 | 7/2001 | French et al. |
| 6,267,292 B1 | 7/2001 | Walker et al. |
| 6,336,099 B1 | 1/2002 | Barnett et al. |
| 6,473,500 B1 | 10/2002 | Risafi et al. |
| 6,529,725 B1 | 3/2003 | Joao et al. |
| 6,535,855 B1 | 3/2003 | Cahill et al. |
| 6,601,761 B1 | 8/2003 | Katis |
| 6,735,572 B2 | 5/2004 | Landesmann |
| 6,853,982 B2 | 2/2005 | Smith et al. |
| 6,857,073 B2 | 2/2005 | French et al. |
| 6,873,974 B1 | 3/2005 | Schutzer |
| 6,898,598 B2 | 5/2005 | Himmel et al. |
| 6,934,528 B2 | 8/2005 | Loureiro et al. |
| 6,999,943 B1 | 2/2006 | Johnson et al. |
| 7,024,383 B1 | 4/2006 | Mancini et al. |
| 7,028,052 B2 | 4/2006 | Chapman et al. |
| 7,047,041 B2 | 5/2006 | Vanska et al. |
| 7,051,002 B2 | 5/2006 | Keresman, III et al. |
| 7,089,208 B1 | 8/2006 | Levchin et al. |
| 7,096,003 B2 | 8/2006 | Joao et al. |
| 7,111,789 B2 | 9/2006 | Rajasekaran et al. |
| 7,155,411 B1 | 12/2006 | Blinn et al. |
| 7,177,848 B2 | 2/2007 | Hogan et al. |
| 7,194,437 B1 | 3/2007 | Britto et al. |
| 7,206,847 B1 | 4/2007 | Alberth et al. |
| 7,212,979 B1 | 5/2007 | Matz et al. |
| 7,225,156 B2 | 5/2007 | Fisher et al. |
| RE39,736 E | 7/2007 | Morrill, Jr. |
| 7,268,667 B2 | 9/2007 | Beenau et al. |
| 7,268,668 B2 | 9/2007 | Beenau et al. |
| 7,290,704 B1 | 11/2007 | Ball et al. |
| 7,318,049 B2 | 1/2008 | Iannacci |
| 7,337,119 B1 | 2/2008 | Geschwender et al. |
| 7,337,144 B1 | 2/2008 | Blinn et al. |
| 7,343,149 B2 | 3/2008 | Benco et al. |
| 7,343,351 B1 | 3/2008 | Bishop et al. |
| 7,349,885 B2 | 3/2008 | Gangi |
| 7,356,505 B2 | 4/2008 | March |
| 7,357,310 B2 | 4/2008 | Calabrese et al. |
| 7,359,880 B2 | 4/2008 | Abel et al. |
| 7,373,669 B2 | 5/2008 | Eisen |
| 7,379,899 B1 | 5/2008 | Junger |
| 7,392,222 B1 | 6/2008 | Hamilton et al. |
| 7,395,242 B2 | 7/2008 | Blinn et al. |
| 7,398,250 B2 | 7/2008 | Blinn et al. |
| 7,413,113 B1 | 8/2008 | Zhu |
| 7,450,966 B2 | 11/2008 | Vanska et al. |
| 7,477,780 B2 | 1/2009 | Boncyk et al. |
| 7,499,889 B2 | 3/2009 | Golan et al. |
| 7,500,607 B2 | 3/2009 | Williams |
| 7,533,064 B1 | 5/2009 | Boesch |
| 7,536,360 B2 | 5/2009 | Stolfo et al. |
| 7,571,139 B1 | 8/2009 | Giordano et al. |
| 7,571,140 B2 | 8/2009 | Weichert et al. |
| 7,593,858 B2 | 9/2009 | Matz et al. |
| 7,603,311 B1 | 10/2009 | Yadav-Ranjan |
| 7,630,937 B1 | 12/2009 | Mo et al. |
| 7,634,295 B2 | 12/2009 | Hayaashi et al. |
| 7,644,037 B1 | 1/2010 | Ostrovsky |
| 7,644,859 B1 | 1/2010 | Zhu |
| 7,660,749 B2 | 2/2010 | Koski |
| 7,676,434 B2 | 3/2010 | Evans |
| 7,685,067 B1 | 3/2010 | Britto et al. |
| 7,698,221 B2 | 4/2010 | Blinn et al. |
| 7,707,113 B1 | 4/2010 | DiMartino et al. |
| 7,708,194 B2 | 5/2010 | Vawter |
| 7,708,198 B2 | 5/2010 | Gangi |
| 7,712,658 B2 | 5/2010 | Gangi |
| 7,739,194 B2 | 6/2010 | Blinn et al. |
| 7,742,984 B2 | 6/2010 | Mohsenzadeh |
| 7,774,076 B2 | 8/2010 | Skowronek et al. |
| 7,783,569 B2 | 8/2010 | Abel et al. |
| 7,784,684 B2 | 8/2010 | Labrou et al. |
| 7,801,829 B2 | 9/2010 | Gray et al. |
| 7,802,719 B2 | 9/2010 | Johnson et al. |
| 7,810,720 B2 | 10/2010 | Lovett |
| 7,819,307 B2 | 10/2010 | Lyons et al. |
| 7,828,206 B2 | 11/2010 | Hessburg et al. |
| 7,828,992 B2 | 11/2010 | Kilickiran et al. |
| 7,837,125 B2 | 11/2010 | Biskupski |
| 7,844,530 B2 | 11/2010 | Ziade et al. |
| 7,849,014 B2 | 12/2010 | Erikson |
| 7,870,027 B1 | 1/2011 | Tannenbaum |
| 7,877,299 B2 | 1/2011 | Bui et al. |
| 7,878,400 B2 | 2/2011 | Harris |
| 7,890,370 B2 | 2/2011 | Whitsitt et al. |
| 7,895,119 B2 | 2/2011 | Praisner |
| 7,899,744 B2 | 3/2011 | Bishop et al. |
| 7,904,360 B2 | 3/2011 | Evans |
| 7,908,227 B2 | 3/2011 | Zissimopoulos et al. |
| 7,926,714 B1 | 4/2011 | Zhu |
| 7,933,779 B2 | 4/2011 | Rooks et al. |
| 7,942,337 B2 | 5/2011 | Jain |
| 7,962,418 B1 | 6/2011 | Wei et al. |
| 7,967,196 B1 | 6/2011 | Bierbaum et al. |
| 7,971,782 B1 | 7/2011 | Shams |
| 7,996,259 B1 | 8/2011 | DiStefano |
| 8,016,192 B2 | 9/2011 | Messerges et al. |
| 8,020,763 B1 | 9/2011 | Kowalchyk et al. |
| 8,024,260 B1 | 9/2011 | Hogl et al. |
| 8,028,041 B2 | 9/2011 | Olliphant et al. |
| 8,032,438 B1 | 10/2011 | Barton et al. |
| 8,041,338 B2 | 10/2011 | Chen et al. |
| 8,050,997 B1 | 11/2011 | Nosek et al. |
| 8,060,413 B2 | 11/2011 | Castell et al. |
| 8,074,876 B2 | 12/2011 | Foss et al. |
| 8,108,261 B2 | 1/2012 | Carlier et al. |
| 8,127,982 B1 | 3/2012 | Cressall et al. |
| 8,140,418 B1 | 3/2012 | Casey et al. |
| 8,145,188 B2 | 3/2012 | Park et al. |
| 8,145,561 B1 | 3/2012 | Zhu |
| 8,145,566 B1 | 3/2012 | Ahuja et al. |
| 8,145,569 B2 | 3/2012 | Gong |
| 8,145,898 B2 | 3/2012 | Kamalakantha |
| 8,150,767 B2 | 4/2012 | Wankmueller |
| 8,150,772 B2 | 4/2012 | Mardikar et al. |
| 8,151,328 B1 | 4/2012 | Lundy et al. |
| 8,151,330 B2 | 4/2012 | Vishik et al. |
| 8,151,336 B2 | 4/2012 | Savoor |

(56) References Cited

U.S. PATENT DOCUMENTS

| | | |
|---|---|---|
| 8,155,999 B2 | 4/2012 | De-Boer et al. |
| 8,156,000 B1 | 4/2012 | Thompson |
| 8,156,026 B2 | 4/2012 | Junger et al. |
| 8,156,042 B2 | 4/2012 | Winkelman et al. |
| 8,156,549 B2 | 4/2012 | Rice et al. |
| 8,157,178 B2 | 4/2012 | Dewan et al. |
| 8,157,181 B2 | 4/2012 | Bates et al. |
| 8,160,935 B2 | 4/2012 | Bui |
| 8,160,959 B2 | 4/2012 | Rackley et al. |
| 8,165,961 B1 | 4/2012 | Dimartino et al. |
| 8,166,068 B2 | 4/2012 | Stevens |
| RE43,351 E | 5/2012 | Jordan |
| 8,170,921 B2 | 5/2012 | Stocker |
| 8,175,235 B2 | 5/2012 | Mumford et al. |
| 8,175,965 B2 | 5/2012 | Moore et al. |
| 8,175,967 B2 | 5/2012 | O'Leary et al. |
| 8,175,968 B2 | 5/2012 | O'Leary et al. |
| 8,175,975 B2 | 5/2012 | Cai et al. |
| 8,175,979 B2 | 5/2012 | Baentsch et al. |
| 8,176,416 B1 | 5/2012 | Williams et al. |
| 8,179,563 B2 | 5/2012 | King et al. |
| 8,180,289 B1 | 5/2012 | Glickman |
| 8,180,705 B2 | 5/2012 | Kowalchyk et al. |
| 8,190,513 B2 | 5/2012 | Felger |
| 8,191,775 B2 | 6/2012 | Hildred |
| 8,195,233 B2 | 6/2012 | Morikuni et al. |
| 8,195,544 B2 | 6/2012 | Horsfall |
| 8,195,547 B2 | 6/2012 | Aaltonen et al. |
| 8,195,565 B2 | 6/2012 | Bishop et al. |
| 8,195,576 B1 | 6/2012 | Grigg et al. |
| 8,196,131 B1 | 6/2012 | von Behren et al. |
| 8,200,582 B1 | 6/2012 | Zhu |
| 8,204,774 B2 | 6/2012 | Chwast et al. |
| 8,204,829 B2 | 6/2012 | Alvarez et al. |
| 8,209,245 B2 | 6/2012 | Dennes |
| 8,209,744 B2 | 6/2012 | Zhu et al. |
| 8,214,288 B2 | 7/2012 | Olliphant et al. |
| 8,214,289 B2 | 7/2012 | Scipioni |
| 8,214,291 B2 | 7/2012 | Pelegero et al. |
| 8,214,292 B2 | 7/2012 | Duggal et al. |
| 8,214,293 B2 | 7/2012 | Powell |
| 8,214,886 B2 | 7/2012 | Foley et al. |
| 8,215,546 B2 | 7/2012 | Lin et al. |
| 8,219,411 B2 | 7/2012 | Matz et al. |
| 8,219,474 B2 | 7/2012 | Sutton et al. |
| 8,219,490 B2 | 7/2012 | Hammad et al. |
| 8,220,047 B1 | 7/2012 | Soghoian et al. |
| 8,224,702 B2 | 7/2012 | Mengerink et al. |
| 8,224,754 B2 | 7/2012 | Pastusiak et al. |
| 8,224,773 B2 | 7/2012 | Spiegel |
| 8,225,997 B1 | 7/2012 | Bierbaum et al. |
| 8,227,936 B1 | 7/2012 | Folk et al. |
| 8,229,354 B2 | 7/2012 | Sklovsky et al. |
| 8,229,808 B1 | 7/2012 | Heit |
| 8,229,844 B2 | 7/2012 | Felger |
| 8,229,851 B2 | 7/2012 | Doran et al. |
| 8,229,854 B2 | 7/2012 | Stephen et al. |
| 8,233,841 B2 | 7/2012 | Griffin et al. |
| 8,234,183 B2 | 7/2012 | Smith et al. |
| 8,239,276 B2 | 8/2012 | Lin et al. |
| 8,244,580 B2 | 8/2012 | Mankoff |
| 8,249,965 B2 | 8/2012 | Tumminaro |
| 8,255,278 B1 | 8/2012 | Young et al. |
| 8,255,323 B1 | 8/2012 | Casey et al. |
| 8,255,324 B2 | 8/2012 | Bercy et al. |
| 8,275,704 B2 | 9/2012 | Bishop et al. |
| 8,280,777 B2 | 10/2012 | Mengerink et al. |
| 8,281,998 B2 | 10/2012 | Tang et al. |
| 8,282,002 B2 | 10/2012 | Shams |
| 8,285,640 B2 | 10/2012 | Scipioni |
| 8,285,820 B2 | 10/2012 | Olliphant et al. |
| 8,285,832 B2 | 10/2012 | Schwab et al. |
| 8,286,875 B2 | 10/2012 | Tang et al. |
| 8,290,433 B2 | 10/2012 | Fisher et al. |
| 8,290,819 B2 | 10/2012 | Bawcutt |
| 8,290,829 B1 | 10/2012 | Katz et al. |
| 8,295,898 B2 | 10/2012 | Ashfield et al. |
| 8,296,187 B2 | 10/2012 | Light et al. |
| 8,296,204 B2 | 10/2012 | Templeton et al. |
| 8,296,228 B1 | 10/2012 | Kloor |
| 8,296,231 B2 | 10/2012 | Britto et al. |
| 8,301,500 B2 | 10/2012 | Pharris |
| 8,301,510 B2 | 10/2012 | Boesch |
| 8,301,556 B2 | 10/2012 | Hogl et al. |
| 8,311,520 B2 | 11/2012 | Choi et al. |
| 8,312,096 B2 | 11/2012 | Cohen et al. |
| 8,321,267 B2 | 11/2012 | Hoerenz |
| 8,321,294 B2 | 11/2012 | Carlier et al. |
| 8,321,315 B2 | 11/2012 | Abel et al. |
| 8,321,338 B2 | 11/2012 | Baumgart et al. |
| 8,321,343 B2 | 11/2012 | Ramavarjula et al. |
| 8,326,756 B2 | 12/2012 | Egendorf |
| 8,326,769 B1 | 12/2012 | Weisman |
| 8,326,770 B1 | 12/2012 | Weisman |
| 8,327,450 B2 | 12/2012 | Clement et al. |
| 8,332,272 B2 | 12/2012 | Fisher |
| 8,332,275 B2 | 12/2012 | Poon et al. |
| 8,332,323 B2 | 12/2012 | Stals et al. |
| 8,335,720 B2 | 12/2012 | Juang et al. |
| 8,335,726 B1 | 12/2012 | Ling et al. |
| 8,335,822 B2 | 12/2012 | Ahmed et al. |
| 8,335,921 B2 | 12/2012 | Von Behren et al. |
| 8,335,932 B2 | 12/2012 | Von Behren et al. |
| 8,340,666 B2 | 12/2012 | Ramer et al. |
| 8,341,029 B1 | 12/2012 | Ramalingam et al. |
| 8,346,643 B2 | 1/2013 | Boyer et al. |
| 8,346,659 B1 | 1/2013 | Mohsenzadeh |
| 8,346,663 B2 | 1/2013 | Kawan |
| 8,352,323 B2 | 1/2013 | Fisher |
| 8,352,362 B2 | 1/2013 | Mohsenzadeh |
| 8,352,499 B2 | 1/2013 | Bharat et al. |
| 8,352,749 B2 | 1/2013 | Von Behren et al. |
| 8,355,987 B2 | 1/2013 | Hirson et al. |
| 8,359,070 B1 | 1/2013 | Zhu et al. |
| 8,364,587 B2 | 1/2013 | Nuzum et al. |
| 8,364,590 B1 | 1/2013 | Casey et al. |
| 8,370,264 B1 | 2/2013 | Wei et al. |
| 8,380,177 B2 | 2/2013 | Laracey |
| 8,401,904 B1 | 3/2013 | Simakov et al. |
| 8,412,586 B1 | 4/2013 | Foulser et al. |
| 8,412,630 B2 | 4/2013 | Ross et al. |
| 8,417,633 B1 | 4/2013 | Chmara et al. |
| 8,423,462 B1 | 4/2013 | Amacker et al. |
| 9,773,212 B2 | 9/2017 | Hammad |
| 2001/0037297 A1 | 11/2001 | Mcnair |
| 2001/0044785 A1 | 11/2001 | Stolfo et al. |
| 2001/0056359 A1 | 12/2001 | Abreu |
| 2002/0040325 A1 | 4/2002 | Takae et al. |
| 2002/0077976 A1 | 6/2002 | Meyer et al. |
| 2002/0107755 A1 | 8/2002 | Steed et al. |
| 2002/0112014 A1 | 8/2002 | Bennett et al. |
| 2002/0116271 A1 | 8/2002 | Mankoff |
| 2002/0143614 A1 | 10/2002 | Maclean et al. |
| 2003/0014307 A1 | 1/2003 | Heng et al. |
| 2003/0026404 A1 | 2/2003 | Joyce et al. |
| 2003/0028481 A1 | 2/2003 | Flitcroft et al. |
| 2003/0080185 A1 | 5/2003 | Werther |
| 2003/0097318 A1 | 5/2003 | Yu et al. |
| 2003/0101134 A1 | 5/2003 | Liu et al. |
| 2003/0174823 A1 | 9/2003 | Justice et al. |
| 2003/0177361 A1 | 9/2003 | Wheeler et al. |
| 2003/0191711 A1 | 10/2003 | Jamison et al. |
| 2003/0200142 A1 | 10/2003 | Hicks et al. |
| 2003/0200184 A1 | 10/2003 | Dominguez et al. |
| 2003/0212642 A1 | 11/2003 | Weller et al. |
| 2004/0078332 A1 | 4/2004 | Ferguson et al. |
| 2004/0103037 A1 | 5/2004 | Wetmore et al. |
| 2004/0128197 A1 | 7/2004 | Bam et al. |
| 2004/0138999 A1 | 7/2004 | Friedman et al. |
| 2004/0148255 A1 | 7/2004 | Beck et al. |
| 2004/0167826 A1* | 8/2004 | Kobayashi ............ G06Q 20/04 705/51 |
| 2004/0215963 A1 | 10/2004 | Kaplan |
| 2004/0230536 A1 | 11/2004 | Fung et al. |

(56) References Cited

U.S. PATENT DOCUMENTS

| | | |
|---|---|---|
| 2004/0236646 A1 | 11/2004 | Wu et al. |
| 2004/0254891 A1 | 12/2004 | Blinn et al. |
| 2004/0254893 A1 | 12/2004 | Tsuei et al. |
| 2004/0260653 A1* | 12/2004 | Tsuei ............... G06Q 20/4037 705/54 |
| 2004/0267608 A1 | 12/2004 | Mansfield |
| 2005/0010483 A1 | 1/2005 | Ling |
| 2005/0065819 A1 | 3/2005 | Schultz |
| 2005/0080747 A1 | 4/2005 | Anderson et al. |
| 2005/0080821 A1 | 4/2005 | Breil et al. |
| 2005/0097320 A1 | 5/2005 | Golan et al. |
| 2005/0137969 A1 | 6/2005 | Shah |
| 2005/0171894 A1 | 8/2005 | Traynor |
| 2005/0192893 A1 | 9/2005 | Keeling et al. |
| 2005/0192895 A1 | 9/2005 | Rogers et al. |
| 2005/0220326 A1 | 10/2005 | Sim |
| 2005/0234817 A1 | 10/2005 | VanFleet et al. |
| 2005/0246278 A1 | 11/2005 | Gerber et al. |
| 2005/0254714 A1 | 11/2005 | Anne |
| 2005/0261967 A1 | 11/2005 | Barry et al. |
| 2006/0053056 A1 | 3/2006 | Alspach-Goss et al. |
| 2006/0085328 A1 | 4/2006 | Cohen et al. |
| 2006/0085477 A1 | 4/2006 | Phillips et al. |
| 2006/0124729 A1 | 6/2006 | Martin |
| 2006/0129427 A1 | 6/2006 | Wennberg |
| 2006/0163349 A1 | 7/2006 | Neugebauer |
| 2006/0178986 A1 | 8/2006 | Giordano et al. |
| 2006/0178994 A1* | 8/2006 | Stolfo ................... G06Q 10/08 705/50 |
| 2006/0190347 A1 | 8/2006 | Cuervo |
| 2006/0226216 A1 | 10/2006 | Keithley et al. |
| 2006/0277143 A1 | 12/2006 | Almonte et al. |
| 2006/0293947 A1 | 12/2006 | Nicholson |
| 2007/0011025 A1 | 1/2007 | Cracchiolo et al. |
| 2007/0038515 A1 | 2/2007 | Postrel |
| 2007/0038516 A1 | 2/2007 | Apple et al. |
| 2007/0055571 A1 | 3/2007 | Fox et al. |
| 2007/0087820 A1 | 4/2007 | Van Luchene et al. |
| 2007/0094066 A1 | 4/2007 | Kumar et al. |
| 2007/0100691 A1 | 5/2007 | Patterson |
| 2007/0100728 A1 | 5/2007 | Rotman et al. |
| 2007/0106607 A1 | 5/2007 | Seib et al. |
| 2007/0113289 A1 | 5/2007 | Blumenau |
| 2007/0143204 A1 | 6/2007 | Claus et al. |
| 2007/0150413 A1 | 6/2007 | Morgenstern |
| 2007/0180119 A1 | 8/2007 | Khivesara |
| 2007/0208662 A1 | 9/2007 | Jeronimus et al. |
| 2007/0214078 A1 | 9/2007 | Coppinger |
| 2007/0214250 A1 | 9/2007 | Ahmed et al. |
| 2007/0226152 A1 | 9/2007 | Jones |
| 2007/0233590 A1 | 10/2007 | Hardison |
| 2007/0239502 A1 | 10/2007 | Babu |
| 2007/0276765 A1 | 11/2007 | Hazel et al. |
| 2008/0004116 A1 | 1/2008 | Van Luchene et al. |
| 2008/0004952 A1 | 1/2008 | Koli |
| 2008/0010096 A1 | 1/2008 | Patterson et al. |
| 2008/0021829 A1 | 1/2008 | Kranzley |
| 2008/0077489 A1 | 3/2008 | Gilley et al. |
| 2008/0086365 A1 | 4/2008 | Zollino et al. |
| 2008/0091553 A1 | 4/2008 | Koski et al. |
| 2008/0091616 A1 | 4/2008 | Helwin et al. |
| 2008/0097856 A1 | 4/2008 | Blagg et al. |
| 2008/0114737 A1 | 5/2008 | Neely et al. |
| 2008/0126145 A1 | 5/2008 | Rackley, III et al. |
| 2008/0133351 A1 | 5/2008 | Rackley, III et al. |
| 2008/0140568 A1 | 6/2008 | Henry |
| 2008/0147883 A1 | 6/2008 | Philyaw |
| 2008/0162361 A1 | 7/2008 | Sklovsky et al. |
| 2008/0167965 A1 | 7/2008 | Von Nothaus et al. |
| 2008/0172274 A1 | 7/2008 | Hurowitz et al. |
| 2008/0172331 A1 | 7/2008 | Graves et al. |
| 2008/0177574 A1 | 7/2008 | Lara Gonzalez et al. |
| 2008/0177672 A1 | 7/2008 | Brunner et al. |
| 2008/0223918 A1 | 9/2008 | Williams et al. |
| 2008/0270300 A1 | 10/2008 | Jones et al. |
| 2008/0272188 A1 | 11/2008 | Keithley et al. |
| 2008/0319905 A1 | 12/2008 | Carlson |
| 2009/0006181 A1 | 1/2009 | Ghosh et al. |
| 2009/0013051 A1 | 1/2009 | Renschler et al. |
| 2009/0024527 A1 | 1/2009 | Sellen et al. |
| 2009/0037255 A1 | 2/2009 | Chiu et al. |
| 2009/0048934 A1 | 2/2009 | Haddad et al. |
| 2009/0061884 A1 | 3/2009 | Rajan et al. |
| 2009/0063261 A1 | 3/2009 | Scribner et al. |
| 2009/0064056 A1 | 3/2009 | Anderson et al. |
| 2009/0076953 A1 | 3/2009 | Saville et al. |
| 2009/0076966 A1 | 3/2009 | Bishop et al. |
| 2009/0089176 A1 | 4/2009 | McCabe et al. |
| 2009/0089193 A1 | 4/2009 | Paintin |
| 2009/0104888 A1 | 4/2009 | Cox |
| 2009/0106151 A1 | 4/2009 | Nelsen et al. |
| 2009/0119176 A1 | 5/2009 | Johnson |
| 2009/0119211 A1 | 5/2009 | Johnson |
| 2009/0132347 A1 | 5/2009 | Anderson et al. |
| 2009/0144104 A1 | 6/2009 | Johnson |
| 2009/0164344 A1 | 6/2009 | Shiftan et al. |
| 2009/0171778 A1 | 7/2009 | Powell |
| 2009/0182664 A1 | 7/2009 | Trombley |
| 2009/0210300 A1 | 8/2009 | Cansler et al. |
| 2009/0222347 A1 | 9/2009 | Whitten |
| 2009/0233579 A1 | 9/2009 | Castell et al. |
| 2009/0234751 A1 | 9/2009 | Chan et al. |
| 2009/0241159 A1 | 9/2009 | Campagna et al. |
| 2009/0254471 A1 | 10/2009 | Seidel et al. |
| 2009/0254479 A1 | 10/2009 | Pharris |
| 2009/0254535 A1 | 10/2009 | Eickelmann et al. |
| 2009/0265274 A1 | 10/2009 | Hahn-Carlson et al. |
| 2009/0271265 A1 | 10/2009 | Lay et al. |
| 2009/0288012 A1 | 11/2009 | Hertel et al. |
| 2009/0307135 A1 | 12/2009 | Gupta et al. |
| 2009/0313132 A1 | 12/2009 | McKenna et al. |
| 2009/0327045 A1 | 12/2009 | Olives et al. |
| 2009/0327088 A1 | 12/2009 | Puthupparambil et al. |
| 2010/0004989 A1 | 1/2010 | Bonalle et al. |
| 2010/0005025 A1 | 1/2010 | Kumar et al. |
| 2010/0009663 A1 | 1/2010 | Chang |
| 2010/0010964 A1 | 1/2010 | Skowronek et al. |
| 2010/0023386 A1 | 1/2010 | Avisar et al. |
| 2010/0023455 A1 | 1/2010 | Dispensa et al. |
| 2010/0036741 A1 | 2/2010 | Cleven |
| 2010/0036775 A1 | 2/2010 | Edens |
| 2010/0042456 A1 | 2/2010 | Stinchcombe et al. |
| 2010/0042537 A1 | 2/2010 | Smith et al. |
| 2010/0042540 A1 | 2/2010 | Graves et al. |
| 2010/0049879 A1 | 2/2010 | Leavitt et al. |
| 2010/0063903 A1 | 3/2010 | Whipple et al. |
| 2010/0076873 A1 | 3/2010 | Taylor et al. |
| 2010/0078471 A1 | 4/2010 | Lin et al. |
| 2010/0078472 A1 | 4/2010 | Lin et al. |
| 2010/0082444 A1 | 4/2010 | Lin et al. |
| 2010/0082445 A1 | 4/2010 | Hodge et al. |
| 2010/0082447 A1 | 4/2010 | Lin et al. |
| 2010/0082455 A1 | 4/2010 | Rosenblatt et al. |
| 2010/0082480 A1 | 4/2010 | Korosec |
| 2010/0082481 A1 | 4/2010 | Lin et al. |
| 2010/0082485 A1 | 4/2010 | Lin et al. |
| 2010/0082490 A1 | 4/2010 | Rosenblatt et al. |
| 2010/0082491 A1 | 4/2010 | Rosenblatt et al. |
| 2010/0088188 A1 | 4/2010 | Kumar et al. |
| 2010/0094730 A1 | 4/2010 | Koski |
| 2010/0100480 A1 | 4/2010 | Altman et al. |
| 2010/0121707 A1 | 5/2010 | Goeldi |
| 2010/0125492 A1 | 5/2010 | Lin et al. |
| 2010/0125495 A1 | 5/2010 | Smith et al. |
| 2010/0125803 A1 | 5/2010 | Johnson et al. |
| 2010/0131347 A1 | 5/2010 | Sartipi |
| 2010/0131415 A1 | 5/2010 | Sartipi |
| 2010/0155470 A1 | 6/2010 | Woronec |
| 2010/0161433 A1 | 6/2010 | White |
| 2010/0174599 A1 | 7/2010 | Rosenblatt et al. |
| 2010/0185505 A1 | 7/2010 | Sprogoe et al. |
| 2010/0185531 A1 | 7/2010 | Van Luchene |
| 2010/0191578 A1 | 7/2010 | Tran et al. |
| 2010/0191622 A1 | 7/2010 | Reiss et al. |

(56) References Cited

U.S. PATENT DOCUMENTS

| | | |
|---|---|---|
| 2010/0191770 A1 | 7/2010 | Cho et al. |
| 2010/0198626 A1 | 8/2010 | Cho et al. |
| 2010/0211445 A1 | 8/2010 | Bodington |
| 2010/0211452 A1 | 8/2010 | D'angelo et al. |
| 2010/0211499 A1 | 8/2010 | Zanzot et al. |
| 2010/0217682 A1 | 8/2010 | Chan |
| 2010/0250351 A1 | 9/2010 | Gillenson et al. |
| 2010/0276484 A1 | 11/2010 | Banerjee et al. |
| 2010/0305848 A1 | 12/2010 | Stallman |
| 2010/0306075 A1 | 12/2010 | Drance et al. |
| 2010/0306113 A1 | 12/2010 | Gray et al. |
| 2010/0312645 A1 | 12/2010 | Niejadlik et al. |
| 2010/0312676 A1 | 12/2010 | Muthukumaran et al. |
| 2010/0332262 A1 | 12/2010 | Horvitz et al. |
| 2010/0332283 A1 | 12/2010 | Ng et al. |
| 2011/0040650 A1* | 2/2011 | Johnson ............. G06Q 30/0615 705/26.42 |
| 2011/0047075 A1 | 2/2011 | Fourez |
| 2011/0078082 A1 | 3/2011 | Gupta |
| 2011/0082789 A1 | 4/2011 | Boyd |
| 2011/0099057 A1 | 4/2011 | Tenyer |
| 2011/0105183 A1 | 5/2011 | Hsiao et al. |
| 2011/0106698 A1 | 5/2011 | Isaacson et al. |
| 2011/0137742 A1 | 6/2011 | Parikh |
| 2011/0178896 A1 | 7/2011 | Nakajima et al. |
| 2011/0184827 A1 | 7/2011 | Hubert |
| 2011/0215146 A1 | 9/2011 | Shams et al. |
| 2011/0218870 A1 | 9/2011 | Shams et al. |
| 2011/0246290 A1 | 10/2011 | Howard et al. |
| 2011/0258123 A1 | 10/2011 | Dawkins et al. |
| 2011/0296508 A1 | 12/2011 | Os et al. |
| 2011/0320344 A1 | 12/2011 | Faith et al. |
| 2012/0011063 A1 | 1/2012 | Killian et al. |
| 2012/0022943 A1 | 1/2012 | Howard et al. |
| 2012/0023026 A1 | 1/2012 | Chen et al. |
| 2012/0030101 A1 | 2/2012 | Boyd |
| 2012/0036071 A1 | 2/2012 | Fulton et al. |
| 2012/0084204 A1 | 4/2012 | Castell et al. |
| 2012/0095895 A1 | 4/2012 | Aston |
| 2012/0101881 A1 | 4/2012 | Taylor et al. |
| 2012/0116966 A1 | 5/2012 | Tan |
| 2012/0118950 A1 | 5/2012 | Belk |
| 2012/0123838 A1 | 5/2012 | Sparks |
| 2012/0136780 A1 | 5/2012 | El-Awady et al. |
| 2012/0166333 A1 | 6/2012 | von Behren et al. |
| 2012/0173431 A1 | 7/2012 | Ritchie et al. |
| 2012/0190386 A1 | 7/2012 | Anderson |
| 2012/0215640 A1 | 8/2012 | Ramer et al. |
| 2012/0215650 A1 | 8/2012 | Oba et al. |
| 2012/0221421 A1* | 8/2012 | Hammad ............... G06Q 10/00 705/16 |
| 2012/0221502 A1 | 8/2012 | Jerram et al. |
| 2012/0231844 A1 | 9/2012 | Coppinger |
| 2012/0259763 A1 | 10/2012 | Pessin |
| 2012/0304273 A1 | 11/2012 | Bailey et al. |
| 2012/0310826 A1 | 12/2012 | Chatterjee |
| 2012/0323664 A1 | 12/2012 | Klems et al. |
| 2013/0090750 A1 | 4/2013 | Herrman et al. |
| 2018/0012147 A1 | 1/2018 | Hammad |

FOREIGN PATENT DOCUMENTS

| | | |
|---|---|---|
| KR | 100432430 | 5/2004 |
| KR | 20060117177 | 11/2006 |
| KR | 20070104087 | 10/2007 |
| WO | 0165502 | 9/2001 |
| WO | 03023674 | 3/2003 |
| WO | 2010148737 | 12/2010 |

OTHER PUBLICATIONS

U.S. Appl. No. 13/407,719 , "Final Office Action", dated May 26, 2015, 10 pages.

U.S. Appl. No. 13/407,719 , "Final Office Action", dated Nov. 4, 2016, 9 pages.

U.S. Appl. No. 13/407,719 , "Non-Final Office Action", dated Apr. 15, 2016, 8 pages.

U.S. Appl. No. 13/407,719 , "Non-Final Office Action", dated Sep. 25, 2014, 9 pages.

U.S. Appl. No. 13/407,719 , "Notice of Allowance", dated May 5, 2017, 9 pages.

U.S. Appl. No. 15/666,466 , "Non-Final Office Action", dated Apr. 4, 2019, 6 pages.

U.S. Appl. No. 15/666,466 , "Notice of Allowance", dated Jul. 3, 2019, 8 pages.

AU2012223415 , "First Examiner Report", dated Jun. 21, 2016, 3 pages.

AU2012223415 , "Second Examiners Report", dated Mar. 6, 2017, 4 pages.

AU2017210574 , "First Examination Report", dated Sep. 21, 2018, 4 pages.

AU2017210574 , "Second Examination Report", dated Mar. 22, 2019, 4 pages.

AU2017210574 , "Third Examination Report", dated Jul. 17, 2019, 5 pages.

Breitkopf , "ACS to Take Over Mich. WC Distribution Program", American Banker, New York, NY, vol. 171, No. 138, Jul. 20, 2006, p. 6.

Business Wire , "New York State Department of Labor Selects JPMorgan Chase to Provide New Banking Services for Unemployment Insurance Benefits", JPMorgan Chase Electronic Services to Help Speed Benefit Payments, Business Wire, New York, Aug. 4, 2006, p. 1.

Gopalan et al., "TCP/IP Illustrated", Prentice-Hall, 2008, pp. 101-102, 175-176 and 235.

PCT/US2009/54921 , "International Search Report and Written Opinion", dated Oct. 21, 2009, 8 Pages.

PCT/US2010/033229 , "International Search Report and Written Opinion", dated Dec. 29, 2010, 8 Pages.

PCT/US2010/033547 , "International Search Report and Written Opinion", dated Dec. 14, 2010, 7 Pages.

PCT/US2010/033861 , "International Search Report and Written Opinion", dated Dec. 9, 2010, 7 Pages.

PCT/US2010/041860 , "International Search Report and Written Opinion", dated Feb. 1, 2011, 8 Pages.

PCT/US2010/045445 , "International Search Report and Written Opinion", dated Feb. 24, 2011, 9 Pages.

PCT/US2010/045500 , "International Search Report and Written Opinion", dated Mar. 29, 2011, 7 Pages.

PCT/US2010/046833 , "International Search Report and Written Opinion", dated Apr. 26, 2011, 8 Pages.

PCT/US2010/048344 , "International Search Report and Written Opinion", dated Nov. 15, 2010, 7 Pages.

PCT/US2011/024941 , "International Search Report and Written Opinion", dated Apr. 19, 2011, 6 Pages.

PCT/US2011/032093 , "International Search Report and Written Opinion", dated Aug. 24, 2011, 11 pages.

PCT/US2011/035268 , "International Search Report and Written Opinion", dated Aug. 5, 2011, 11 pages.

PCT/US2011/039178 , "International Search Report and Written Opinion", dated Sep. 16, 2011, 8 pages.

PCT/US2011/042062 , "International Search Report and Written Opinion", dated Sep. 29, 2011, 9 pages.

PCT/US2011/049393 , "International Search Report and Written Opinion", dated Dec. 5, 2011, 7 pages.

PCT/US2011/057173 , "International Search Report and Written Opinion", dated Mar. 15, 2012, 12 pages.

PCT/US2011/057179 , "International Search Report and Written Opinion", dated Jan. 5, 2012, 8 pages.

PCT/US2011/057180 , "International Search Report and Written Opinion", dated Mar. 15, 2012, 12 pages.

PCT/US2011/065305 , "International Search Report and Written Opinion", dated Apr. 16, 2012, 11 pages.

PCT/US2011/26734 , "International Search Report and Written Opinion", dated Apr. 29, 2011, 7 pages.

(56) References Cited

OTHER PUBLICATIONS

PCT/US2011/29790 , "International Search Report and Written Opinion", dated May 19, 2011, 7 pages.
PCT/US2012/021000 , "International Search Report and Written Opinion", dated May 15, 2012, 8 pages.
PCT/US2012/023856 , "International Search Report and Written Opinion", dated Jun. 6, 2012, 10 pages.
PCT/US2012/024772 , "International Search Report and Written Opinion", dated Jul. 24, 2012, 8 pages.
PCT/US2012/025530 , "International Search Report and Written Opinion", dated Aug. 7, 2012, 11 pages.
PCT/US2012/026205 , "International Search Report and Written Opinion", dated May 29, 2012, 13 pages.
PCT/US2012/027043 , "International Search Report and Written Opinion", dated Jul. 13, 2012, 16 pages.
PCT/US2012/027620 , "International Search Report and Written Opinion", dated Aug. 10, 2012, 9 pages.
PCT/US2012/037597 , "International Search Report and Written Opinion", dated Sep. 21, 2012, 12 pages.
PCT/US2012/039638 , "International Search Report and Written Opinion", dated Sep. 24, 2012, 14 pages.
PCT/US2012/041437 , "International Search Report and Written Opinion", dated Aug. 24, 2012, 22 pages.
PCT/US2012/045601 , "International Search Report and Written Opinion", dated Feb. 1, 2013.
PCT/US2012/047092 , "International Search Report and Written Opinion", dated Nov. 26, 2012, 12 pages.
PCT/US2012/055636 , "International Search Report and Written Opinion", dated Nov. 30, 2012.
PCT/US2012/056759 , "International Search Report and Written Opinion", dated Feb. 25, 2013, 13 pages.
PCT/US2012/057528 , "International Search Report and Written Opinion", dated Dec. 17, 2012, 9 pages.
PCT/US2012/057577 , "International Search Report and Written Opinion", dated Nov. 29, 2012, 7 pages.
PCT/US2012/065738 , "International Search Report and Written Opinion", dated Apr. 19, 2013, 10 pages.
PCT/US2012/066898 , "International Search Report and Written Opinion", dated Feb. 11, 2013, 15 pages.
PCT/US2012/069557 , "International Search Report and Written Opinion", dated Feb. 22, 2013, 8 pages.
PCT/US2012/45875 , "International Search Report and Written Opinion", dated Nov. 16, 2012, 14 pages.
PCT/US2013/020411 , "International Search Report and Written Opinion", dated May 21, 2013, 19 pages.
PCT/US2013/024538 , "International Search Report and Written Opinion", dated May 31, 2013.
Shadrach et al., "A Weighted Metric Based Adaptive Algorithm for Web Server Load Balancing", Third International Symposium on Intelligenr Information Technology Application, available at link "http://ieeexplore.ieee.org/document/5369384/", 2009, pp. 449-452.
AU2019232792 , "First Examination Report", dated Sep. 22, 2020, 5 pages.

\* cited by examiner

FIGURE 2 Example Data Flow: User Purchase Checkout

Example Logic Flow: User Purchase Checkout ("UPC") component 300

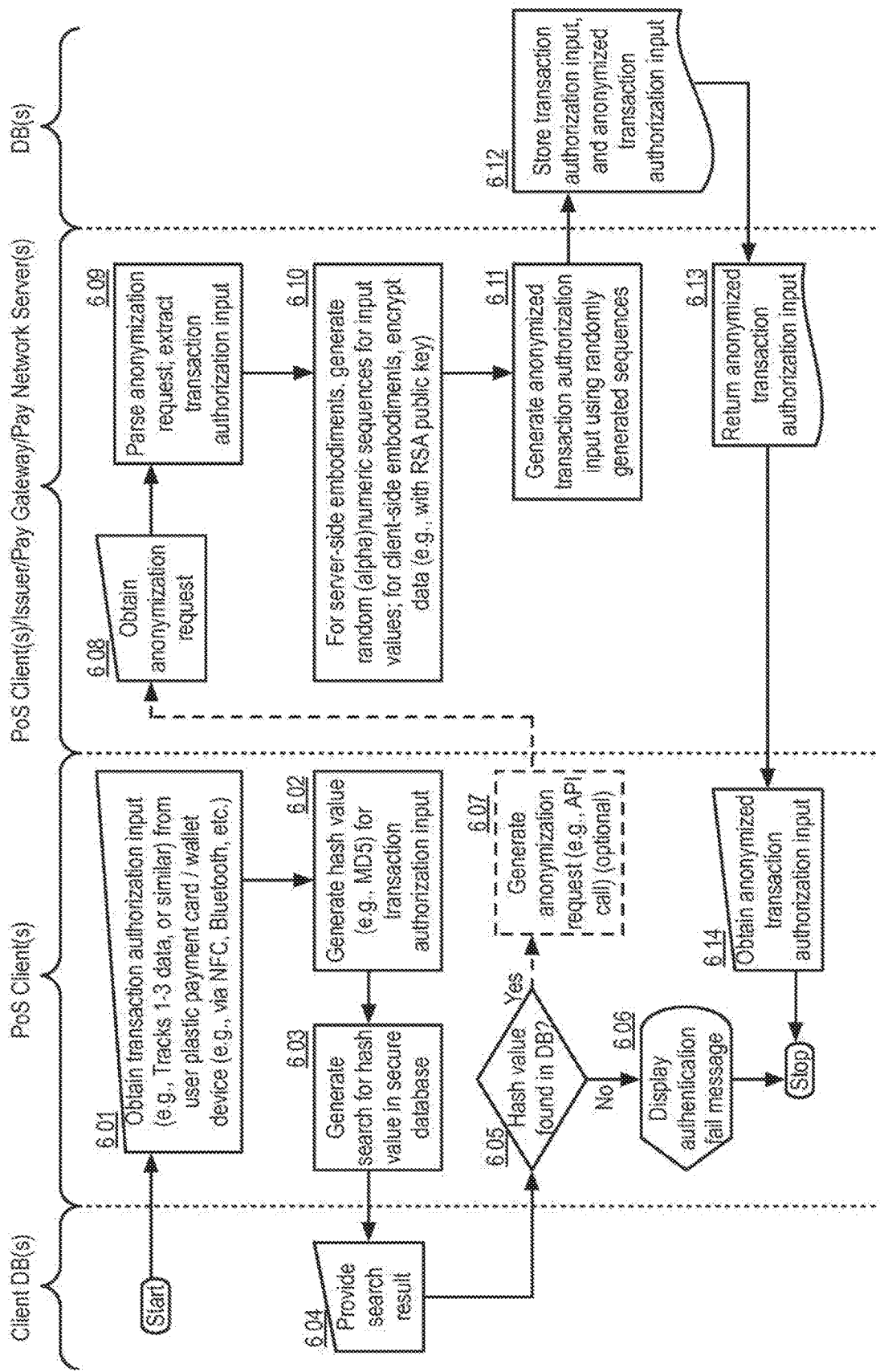

Example: Payment Input Resolution ("PIR") component 700

Example: Virtual Wallet Mobile App - Shopping Mode

Example: Virtual Wallet Mobile App - SocialPay Mode

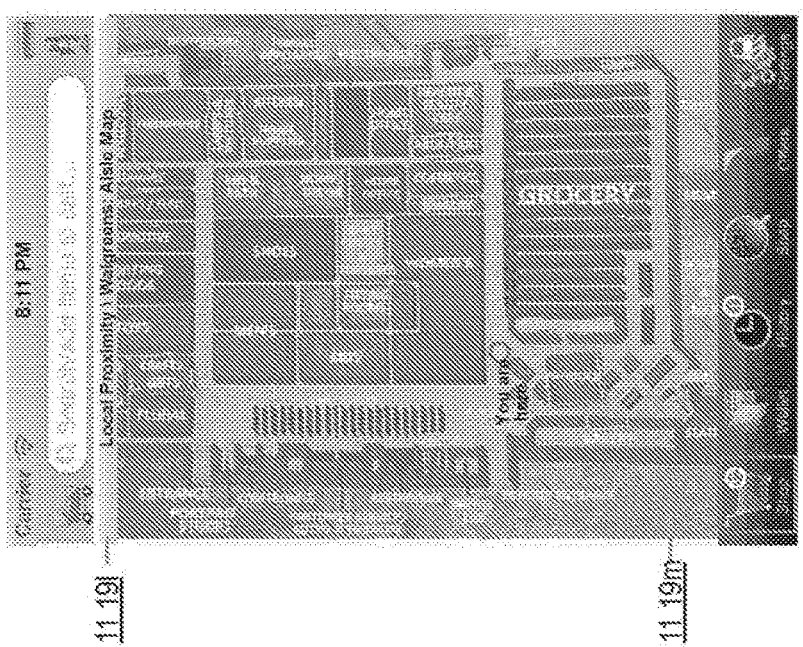
FIGURE 11G
Example: Virtual Wallet Mobile App - Shopping Mode

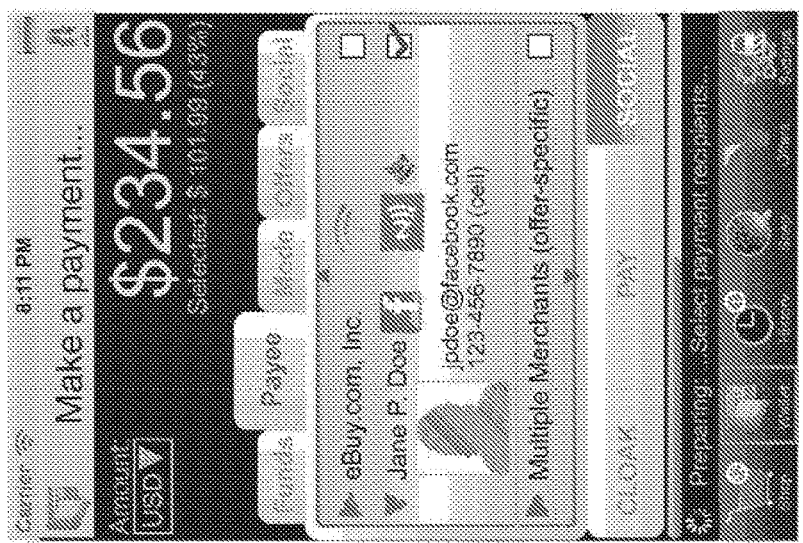
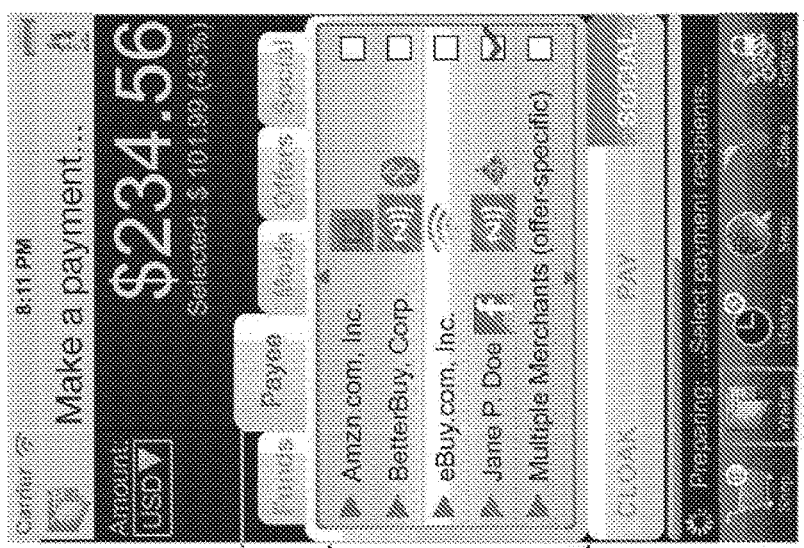
FIGURE 12C

SECURE ANONYMOUS TRANSACTION APPARATUSES, METHODS AND SYSTEMS

This application is a continuation of U.S. application Ser. No. 15/666,466 filed Aug. 1, 2017, which is a continuation of U.S. application Ser. No. 13/407,719, filed Feb. 28, 2012, which claims the benefit of U.S. Provisional Application No. 61/447,644, filed Feb. 28, 2011; U.S. Provisional Application No. 61/468,569, filed Mar. 28, 2011, and U.S. Provisional Application No. 61/469,063 filed Mar. 29, 2011, which is hereby incorporated by reference in its entirety for all purposes.

This patent for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

PRIORITY CLAIM

This application claims priority under 35 USC § 119 to: U.S. provisional patent application Ser. No. 61/447,644 filed Feb. 28, 2011, entitled "SECURE ANONYMOUS TRANSACTION APPARATUSES, METHODS AND SYSTEMS,"; U.S. provisional patent application Ser. No. 61/468,569 filed Mar. 28, 2011, entitled "WALLET TRANSACTION AUTHENTICATION APPARATUSES, METHODS AND SYSTEMS,"; and U.S. provisional patent application Ser. No. 61/469,063 filed Mar. 29, 2011, entitled "WALLET TRANSACTION AUTHENTICATION APPARATUSES, METHODS AND SYSTEMS,". The entire contents of the aforementioned applications are expressly incorporated by reference herein.

FIELD

The present innovations generally address apparatuses, methods, and systems for electronic commerce, and more particularly, include SECURE ANONYMOUS TRANSACTION APPARATUSES, METHODS AND SYSTEMS ("SAT").

BACKGROUND

Known consumer transactions require a customer to select a product from a store shelf or website, and then to check out at a checkout counter or webpage. Product information is selected from a webpage catalog or entered into a point-of-sale terminal, or the information is entered automatically by scanning an item barcode with an integrated barcode scanner at the point-of-sale terminal. The customer is usually provided with a number of payment options, such as cash, check, credit card or debit card. Once payment is made and approved, the point-of-sale terminal memorializes the transaction in the merchant's computer system, and a receipt is generated indicating the satisfactory consummation of the transaction. When consumers make purchases online with a merchant, the merchant will then address the purchased item to the consumer at the consumer's address.

BRIEF DESCRIPTION OF THE DRAWINGS

The accompanying appendices and/or drawings illustrate various non-limiting, example, inventive aspects in accordance with the present disclosure:

FIG. 6 shows a logic flow diagram illustrating example aspects of generating a one-time anonymous card in some embodiments of the SAT, e.g., a One-Time Anonymous Card Generation ("1T-ACG") component 600;

FIGS. 11A-G show user interface diagrams illustrating example features of virtual wallet applications in a shopping mode, in some embodiments of the SAT;

FIGS. 12A-F show user interface diagrams illustrating example features of virtual wallet applications in a payment mode, in some embodiments of the SAT;

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

Secure Anonymous Transaction (Sat)

Figure 1:
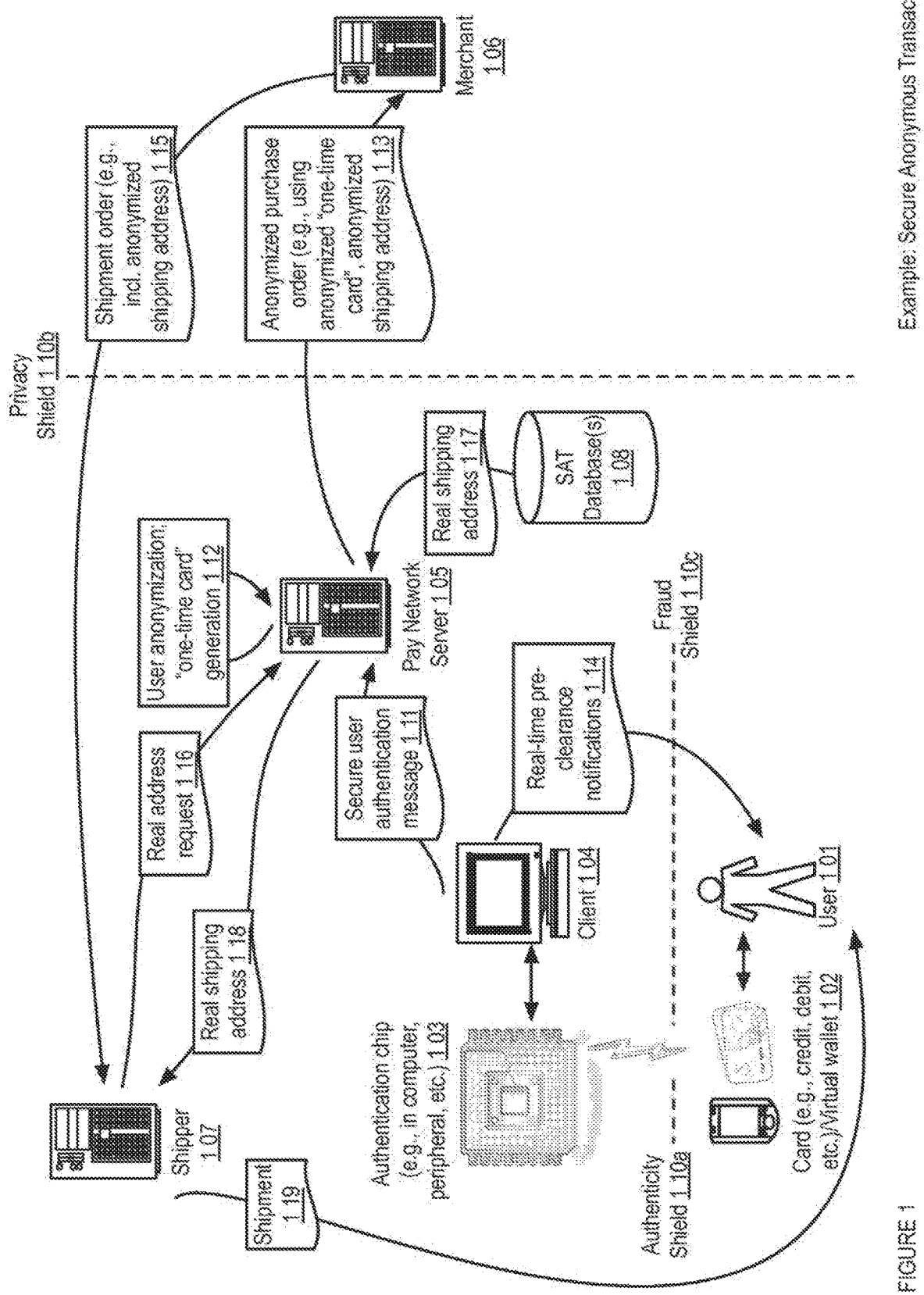
FIG. 1 shows a block diagram illustrating example aspects of executing secure anonymous transactions in some embodiments of the SAT.

The SECURE ANONYMOUS TRANSACTION APPARATUSES, METHODS AND SYSTEMS (hereinafter le;2q"SAT") transform hardware-verified user authentication requests, via SAT components, into secure transaction notifications. FIG. 1 shows a block diagram illustrating example aspects of executing secure anonymous transactions in some embodiments of the SAT. In some implementations, a user, e.g., 101, may desire to purchase a product, service and/or other offering ("product") from a merchant, e.g., 106. The user may desire to utilize a card, e.g., 102, such as a debit, credit, prepaid and/or other card, to pay for the transaction, or a wallet device (e.g., a smartphone, tablet computer, etc.) associated with a virtual wallet account of the user. However, the user may wish to maintain anonymity so that the merchant does not collect personal information of the user. As another example, the user may be wary of the user's card data being misused to conduct fraudulent transactions. In some implementations, the user may utilize a client, e.g., 104, to perform a purchase transaction. For example, the client may be a device that is used exclusively by the user, such as a smartphone, tablet computer, laptop computer, point-of-sale terminal, kiosk, and/or the like. In some to implementations, a custom hardware authentication chip, e.g., 10o3, may be disposed in communication with the client. A number of sources for the chip are contemplated. For example, a unique chip identifier in addition to the logic of FIG. 6 may be embodied into an FPGA, and/or the logic of FIG. 6 may be processed by the SAT processor CPU 1703 of FIG. 17, the SAT Cryptographic facilities 1726, 1727, 1720 of FIG. 17, and/or the like. In various implementations, the chip may be embedded into the client, come pre-installed in the client, attached as a periphery to the client, and/or the like. In some implementations, the user may perform an authentication procedure with the client and the user's card. For example, the authentication chip may be configured to recognize the user's card when the card is in the vicinity of the authentication chip. For example, the authentication chip and the card may communicate signals via Bluetooth™, Wi-Fi™, RFID tags, cellular connectivity (e.g., 3G, 4G), and/or the like. Thus, in order to make purchase with the card, in some implementations, the user must present the card to the authentication chip disposed in communication with the client before the user can make a purchase order using the card. Thus, the system may provide an authenticity shield preventing others who may know of the user's card details from utilizing the user's card details in a fraudulent transaction. Upon authentication, the client may provide a secure user authentication message 111 to SAT components and/or entities, to facilitate the purchase transaction in a secure manner.

Upon authentication of the user, the client may communicate with a pay network server, e.g., 105, which may be a part of the network of the provider of the card services for the user. The client may request the pay network server to act as an intermediary between the user and the merchant in such a manner that the user's personal information is shielded from the merchant. Upon providing the pay network server proof of the user's authentication and details of a purchase order, the pay network server may generate a "one-time" alias for the user, 112. For example, the pay network server may generate a one-time card, which may be used only for the purchase order requested by the authenticated user. Upon one-time use, the card number may be disabled, and a new card number generated the next time the same user wishes to make a purchase with the same card. As another example, the pay network server may generate one-time name, billing address, shipping address, contact information alias, and/or the like pseudo-personal information for the user. The pay network server may then communicate with a merchant on behalf of the user to execute the purchase transaction, e.g., 113. Thus, a privacy shield may be established between the merchant and the user to protect the user from, e.g., telemarketing programs, advertising programs, etc., as well as protecting the security of the user's card. In some implementations, other SAT entities and/or components may participate in the generation of one-time card data, including, but not limited to: the client, an issuer, a payment gateway, a payment network, a payment service provider, and/or the like.

In some implementations, a transaction may have been initiated without authorization by the user, e.g., a fraudulent transaction. The pay network server may notify in real-time anytime the card network receives a purchase request on behalf of the user, e.g., 114. Thus, before any transaction can clear, the user may be notified of the impending clearance of the transaction in real-time. Thus, the user can be made aware of any transactions not initiated by the user, and can take measures to prevent the transaction from completing. In another example, the pay network server may compare any notification of a purchase transaction on behalf of the user with its transaction data records to determine whether the transaction originated from a trusted source (e.g., the client disposed in communication with the authentication chip). The pay network server may notify, in real-time, the user of any transactions that have not originated from a trusted source. Thus, a fraud shield may be established on behalf of the user.

In, some instances, a user may wish to maintain privacy such that the merchant does not know who they are, where they live, etc. Thus, the pay network server may communicate an anonymized shipping address (e.g., anonymized identifier, anonymized transaction ID, anonymized transaction authorization request, anonymized address, etc.) to the merchant, e.g., 113, devoid of personally identifiable information of the user. For example, the anonymized personal information and/or anonymized shipping address information may take the form of an XML data structure, such as provided below:

```
<anonymized_data>
    <user_ID>ANONUSER_12345</user_ID>
    <PoS___details>
        <PoS_IP>000.000.00.000</client_IP>
        <PoS_type>hidden</client_type>
        <PoS_model>hidden</client_model>
        <OS>hidden</OS>
        <app_installed_flag>true</app_installed_flag>
    </PoS_details>
    <account_params>
```

```xml
<account>
    <ratio>100%</ratio>
    <account_name>ANONUSER_12345</account_name>
    <account_type>SECURE</account_type>
    <billing_add>123 Anonymous St., Anon, AN 99999</billing_add>
    <phone>000-000-0000</phone>
    <sign>/anon/</sign>
    <confirm_type>email</confirm_type>
    <contact_info>anonuser@securebuy.com</contact_info>
    <mode>NFC</mode>
</account>
</account_params>
<shipping_info>
    <shipping_adress>#ref-ANON-123-45-678</shipping_address>
    <ship_type>expedited</ship_type>
    <ship_carrier>FedEx</ship_carrier>
    <ship_account>ANON-123-45-678</ship_account>
    <tracking_flag>true</tracking_flag>
    <sign_flag>false</sign_flag>
    <alt_shipping_itype>digital download</alt_shipping_type>
    <alt_ship_url>http://www.mdwnld.com/anonuser_12345</alt_ship_url>
</shipping_info>
</anonymized_data>
```

In some implementations, the merchant 106 may issue an order, e.g., 115, to a shipper 107 to ship products purchase by the user, providing the shipper with the anonymized shipping address (e.g., anonymized identifier, anonymized transaction ID, anonymized transaction authorization request, anonymized address, etc.) to process the shipment. For example, the merchant may provide the shipper with a shipment order, such as the example shipment order provided below:

```
POST /shiprequest.php HTTP/1.1
Host: www.shipper.com
Content-Type: Application/XML
Content-Length: 667
<?XML version = "1.0" encoding = "UTF-8"?>
<shipment_request>
    <timestamp>2011-02-22 15:22:43</timestamp>
    <anon_ID>ANONUSER_1233456</anon_ID>
    <anon_transaction_ID>1234-567-790</anon_transaction_ID>
    <anon_auth_request_ID>NOHUI2134567</anon_auth_request_ID>
    <anon_adress>#ref-ANON-123-45-678</anon_address>
    <shipment_detail>
        <product>
            <product_ref>A213456</product_ref>
            <product_size>12"x10"8"</product_size>
            <product_weight>22lb</product_weight>
        </product>
        <product>
            <product_ref>A2134 57</product_ref>
            <url>http://www.download.com/ship.php?token=A213457</url>
        </product>
    </shipment_detail>
</shipment_request>
```

The shipper is not limited to a service provider facilitating the shipment of physical goods (e.g., FedEx, UPS, USPS, DHL, etc.). It contemplates other proxies, both physical and electronic; for example, the merchant may be a digital video download service that may cache purchased digital items as a proxy for a user to subsequently retrieve such purchased items. The shipper may provide a request, e.g., 116, to the pay network server for a real address corresponding to the anonymized shipping address provided by the merchant to the shipper. In one implementation, the shipper may have a uniquely identifiable security material that may be verified by the payment network server 105 (e.g., digital certificate, passcode, password, asymmetrical public-key encrypted request message, etc.). For example, the shipper may provide a HTTP(S) POST message including the request for the real shipping address 116 (e.g., including (e.g., anonymized identifier, anonymized transaction ID, anonymized transaction authorization request, anonymized address, etc.)), similar to the example below:

```
POST /addressrequest.php HTTP/1.1
Host: www.paynetwork.com
Content-Type: Application/XML
Content-Length: 667
<?XML version = "1.0" encoding = "UTF-8"?>
<address_request>
    <timestamp>2011-02-22 15:22:43</timestamp>
    <anon_ID>ANONUSER_1233456</anon_ID>
    <anon_transaction_ID>1234-567-790</anon_transaction_ID>
    <anon_auth_request_ID>NOHUI2134567</anon_auth_request_ID>
    <anon_adress>#ref-ANON-123-45-678</anon_address>
</address_request>
```

The pay network server may obtain such real shipping address, e.g., 117, for the user from a secure SAT database, e.g., 10o8. For example, the pay network server may utilize PUP/SQL commands to query the SAT database, using commands similar to the example below:

```
<?PHP
header('Content-Type: text/plain');
mysql_connect("254.93.179.112",$DBserver,$password); // access database server
mysql_select_db("SAT_DB.SQL"); // select database table to search
//create query
$query = "SELECT user_ID real_address FROM AnonTable WHERE anon_ID LIKE '%'
    $anonID";
$result = mysql_query($query); // perform the search query
mysql_close("SAT_DB.SQL"); // close database access
?>
```

The pay network server may provide the real shipping address to the shipper, e.g., 118, such that the merchant does not gain access to the real shipping address (or any other personal information of the user). The shipper may provide the shipment (e.g., physical goods, digital download, etc.) to the user 101, using the real shipping address obtained from the pay network server 105.

Figure 2:
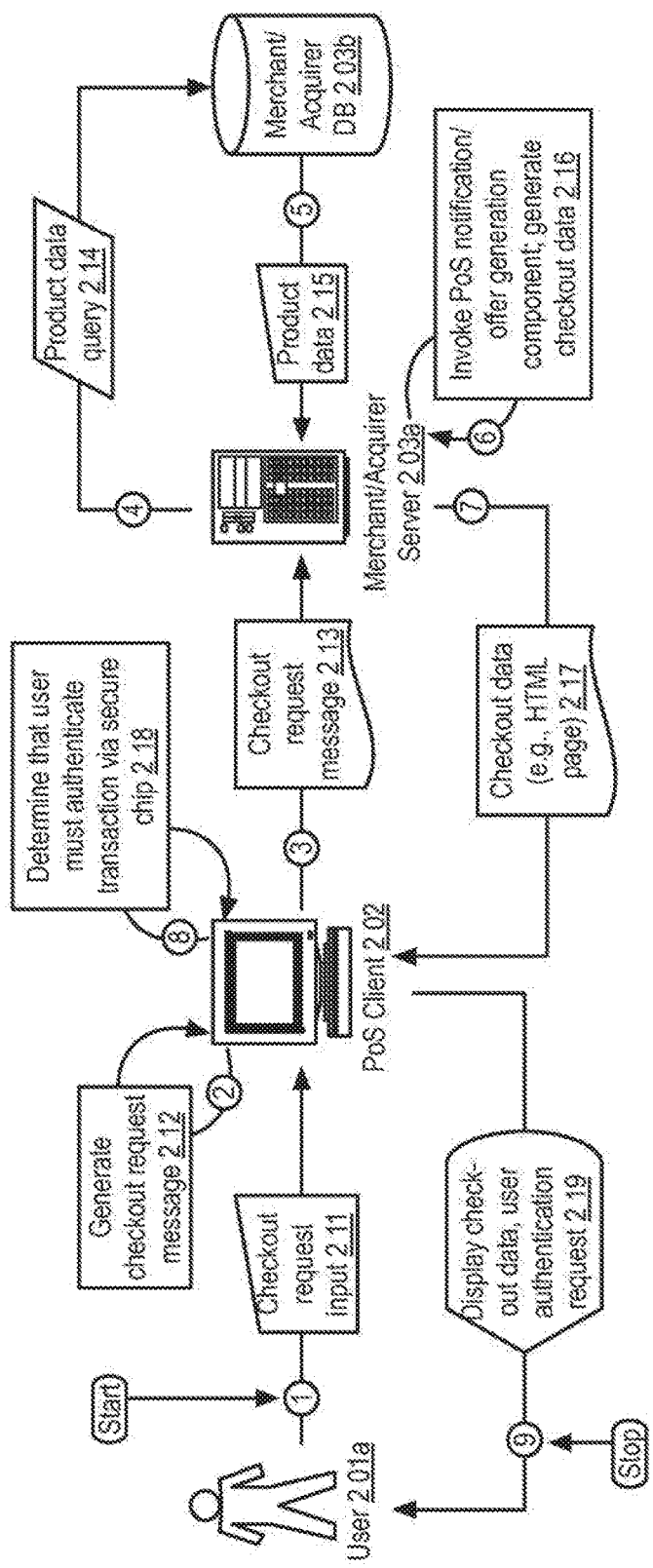
FIG. 2 shows a data flow diagram illustrating an example user purchase checkout procedure in some embodiments of the SAT.

FIG. 2 shows a data flow diagram illustrating an example user purchase checkout procedure in some embodiments of the SAT. In some embodiments, a user, e.g., 201a, may desire to purchase a product, service, offering, and/or the like ("product"), from a merchant via a merchant online site or in the merchant's store. The user may communicate with a merchant/acquirer ("merchant") server, e.g., 203a, via a client such as, but not limited to: a personal computer, mobile device, television, point-of-sale terminal, kiosk, ATM, and/or the like (e.g., 202). For example, the user may n provide user input, e.g., checkout input, into the client indicating the user's desire to purchase the product. In some instances, a user may wish to maintain their privacy such that the merchant does not know who they are, where they live, etc. As such, the user may have engaged a user interface providing indicia to maintain (e.g., "eloak") their identities (e.g., see 1222 of FIG. 2A). Such indicia may be set as a bit (e.g., TRUE/ON) in a discretionary field of a card authorization request message, such indicia may be sent via an out-of-band (e.g., Internet) communication, and/or the like. The out-of-band request may include an acquirer authorization number, authorization request, and/or like information to resolve the indicia with the purchase request at the SAT server. In various embodiments, the user input may include, but not be limited to: a single tap (e.g., a one-tap mobile app purchasing embodiment) of a touchscreen interface, keyboard entry, card swipe, activating a RFID/NFC enabled hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. As an example, a user in a merchant store may scan a product barcode of the product via a barcode scanner at a point-of-sale terminal. As another example, the user may select a product from a webpage catalog on the merchant's website, and add the product to a virtual shopping cart on the merchant's website. The user may then indicate the user's desire to checkout the items in the (virtual) shopping cart. For example, the user may activate a user interface element provided by the client to indicate the user's desire to complete the user purchase checkout. The client may generate a checkout request, e.g., 212, and provide the checkout request, e.g., 213, to the merchant server. For example, the client may provide a (Secure) Hypertext Transfer Protocol ("HTTP(S)") POST message including the product details for the merchant server in the form of data formatted according to the eXtensible Markup Language ("XML"). An example listing of a checkout request 212, substantially in the form of, a HTTP(S) POST message including, XML-formatted data, is provided below:

```
POST /checkoutrequest.php HTTP/1.1
Host: www.merchant.com
Content-Type: Application/XML
Content-Length: 667
<?XML version = "1.0" encoding = "UTF-8"?>
<checkout_request>
    <checkout_ID>4NFU4RG94</checkout_ID>
    <timestamp>2011-02-22 15:22:43</timestamp>
    <purchase_detail>
```

```
            <num_products>5</num_products>
            <product_ID>AE95049324</product_ID>
            <product_ID>MD09808755</product_ID>
            <product_ID>OC12345764</product_ID>
            <product_ID>KE76549043</product_ID>
            <product_ID>SP27674509</product_ID>
        </purchase_detail>
    <!--optional parameters-->
        <user_ID>john.q.public@gmail.com</user_ID>
        <PoS_client_detail>
            <client_IP>192.168.23.126</client_IP>
            <client_type>smartphone</client_type>
            <client_model>HTC Hero</client_model>
            <OS>Android 2.2</OS>
            <app_installed_flag>true</app_installed_flag>
        </PoS_client_detail>
    </checkout_request>
```

In same embodiments, the merchant sever may obtain the checkout request from the client, and extract the checkout detail (e.g., XML data) from the checkout request. For example, the merchant server may utilize a parser such as the example parsers described below in the discussion with reference to FIG. 17. Based on parsing the checkout request 212, the merchant server may extract product data (e.g., product identifiers), as well as available PoS client data, from the checkout request. In some embodiments, using the product data, the merchant server may query, e.g., 214, a merchant/acquirer ("merchant") database, e.g., 203b, to obtain product data, e.g., 215, such as product information, product pricing, sales tax, offers, discounts, rewards, and/or other information to process the purchase transaction and/or provide value-added services for the user. For example, the merchant database may be a relational database responsive to Structured Query Language ("SQL") commands. The merchant server may execute a hypertext preprocessor ("PHP") script including SQL commands to query a database table (such as FIG. 17, Products 1719l) for product data. An example product data query 214, substantially in the form of PHP/SQL commands, is provided below:

```
<?PHP
header('Content-Type: text/plain');
mysql_connect("254.93.179.112",$DBserver,$password); // access
database server
mysql_select_db("SAT_DB.SQL"); // select database table to search
//create query
$query = "SELECT product_title product_attributes_list product_price
    tax_info_list related_products_list offers_list discounts_list
    rewards_list merchants_list merchant_availability_list FROM
    ProductsTable WHERE product_ID LIKE '%' $prodID";
$result = mysql_query($query); // perform the search query
mysql_close("SAT_DB.SQL"); // close database access
?>
```

In some embodiments, in response to obtaining the product data, the merchant server may generate, e.g., 216, checkout data to provide for the PoS client. In some embodiments, such checkout data, e.g., 217, may be embodied, in part, in a HyperText Markup Language ("HTML") page including data for display, such as product detail, product pricing, total pricing, tax information, shipping information, offers, discounts, rewards, value-added service information, etc., and input fields to provide payment information to process the purchase transaction, such as account holder name, account number, billing address, shipping address, tip amount, etc. In some embodiments, the checkout data may be embodied, in part, in a Quick Response ("QR") code image that the PoS client can display, so that the user may capture the QR code using a user's device to obtain merchant and/or product data for generating a purchase transaction processing request. In some embodiments, a user alert mechanism may be built into the checkout data. For example, the merchant server may embed a URL specific to the transaction into the checkout data. In some embodiments, the alerts URL may further be embedded into optional level 3 data in card authorization requests, such as those discussed further below with reference to FIGS. 4-5. The URL may point to a webpage, data file, executable script, etc., stored on the merchant's server dedicated to the transaction that is the subject of the card authorization request. For example, the object pointed to by the URL may include details on the purchase transaction, e.g., products being purchased, purchase cost, time expiry, status of order processing, and/or the like. Thus, the merchant server may provide to the payment network the details of the transaction by passing the URL of the webpage to the payment network. In some embodiments, the payment network may provide notifications to the user, such as a payment receipt, transaction authorization confirmation message, shipping notification and/or the like. In such messages, the payment network may provide the URL to the user device. The user may navigate to the URL on the user's device to obtain alerts regarding the user's purchase, as well as other information such as offers, coupons, related products, rewards notifications, and/or the like. An example listing of a checkout data 217, substantially in the form of XML-formatted data, is provided below:

```
<?XML version = "1.0" encoding = "UTF-8"?>
<checkout_data>
        <session_ID>4NFU4RG94</session_ID>
        <timestamp>2011-02-22 15:22:43</timestamp>
        <expiry_lapse>00:00:30</expiry_lapse>
        <transaction_cost>$34.78</transaction_cost>
        <alerts_URL>www.merchant.com/shopcarts.php?sessionID=4NFU4RG94</alerts_URL>
        <!--optional data-->
        <user_ID>john.q.public@gmail.com</user_ID>
        <client_details>
            <client_IP>192.168.23.126</client_IP>
            <client_type>smartphone</client_type>
            <client_model>HTC Hero</client_model>
            <OS>Android 2.2</OS>
            <app_installed_flag>true</app_installed_flag>
        </client_details>
        <purchase_details>
            <num_products>1</num_products>
            <product>
```

```
            <product_type>book</product_type>
            <product_params>
                <product_title>XML for dummies</product_title>
                <ISBN>938-2-14-168710-0</ISBN>
                <edition>2nd ed.</edition>
                <cover>hardbound</cover>
                <seller>bestbuybooks</seller>
            </product_params>
            <quantity>1</quantity>
        </product>
    </purchase_details>
    <offers_details>
        <num_offers>1</num_offers>
        <product>
            <product_type>book</product_type>
            <product_params>
                <product_title>Here's more XML</product_title>
                <ISBN>922-7-14-165720-1</ISBN>
                <edition>1nd ed.</edition>
                <cover>hardbound</cover>
                <seller>digibooks</seller>
            </product_params>
            <quantity>1</quantity>
        </product>
    </offers_details>
    <secure_element>www.merchant.com/securedyn/0394733/123.png</secure_element>
    <merchant_params>
        <merchant_id>3FBCR4INC</merchant_id>
        <merchant_name>Books & Things, Inc.</merchant_name>
        <merchant_auth_key>1NNF484MCP59CHB27365</merchant_auth_key>
    </merchant_params>
<checkout_data>
```

Upon obtaining the checkout data, e.g., 217, the PoS client may render and display, e.g., 219, the checkout data for the user. In some embodiments, the PoS client may determine whether the user must provide hardware chip-based authentication before the transaction can be processed. In some implementations, the PoS client may require that every transaction must be authenticated using hardware chip-based authentication before the transaction can be processed. In alternate implementations, the PoS client may determine that hardware chip-based authentication is required based on a combination of: geographical location (e.g., via IP address; GPS coordinates) of the PoS client, value of the purchase transaction; currency of the transaction; source of the transaction payment input (e.g. plastic card, user virtual wallet device); source of funds for the transaction payment merchant identifier; merchant/shipping source location; and/or like factors.

Figure 3:
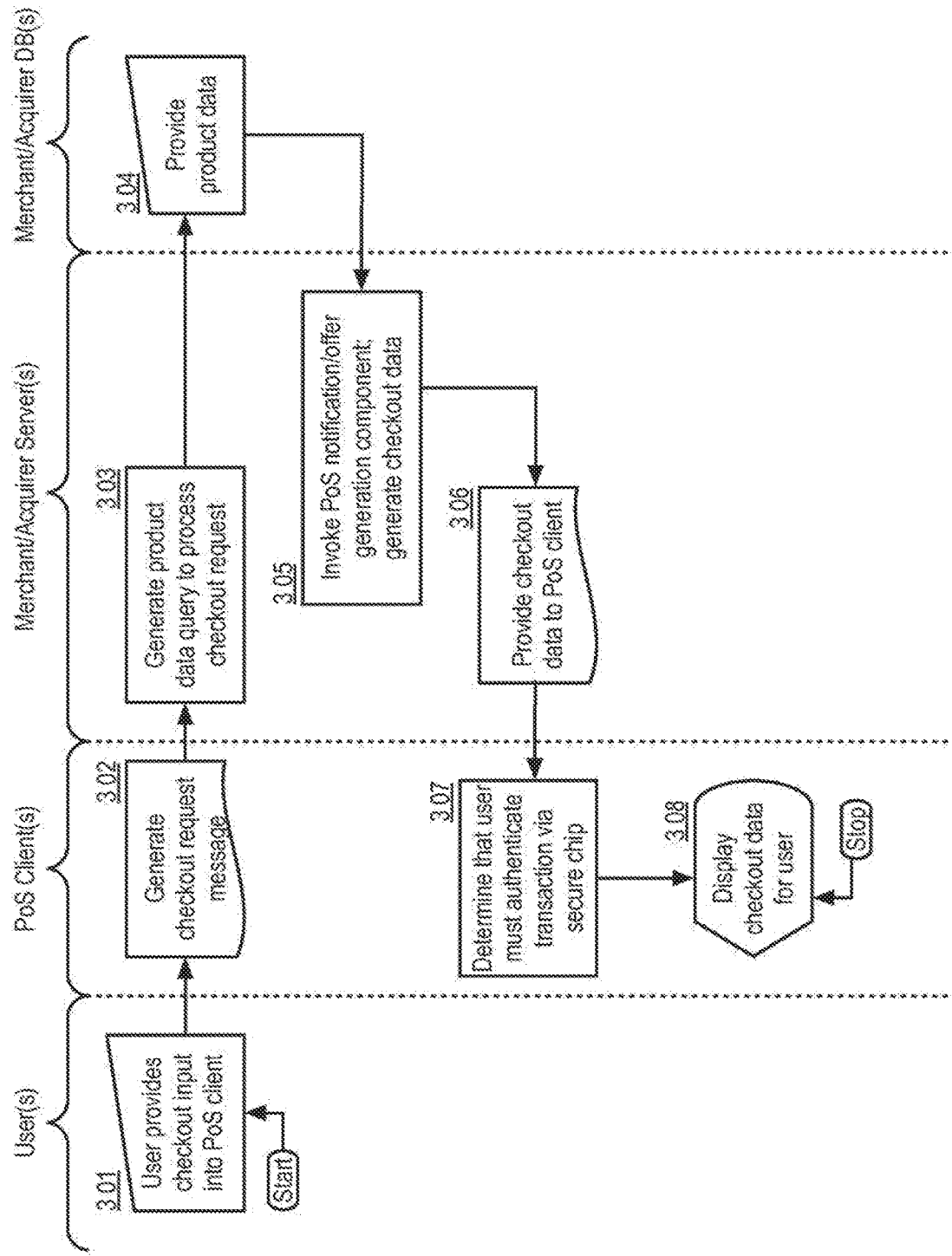
FIG. 3 shows a logic flow diagram illustrating example aspects of a user purchase checkout in some embodiments of the SAT, e.g., a User Purchase Checkout ("UPC") component 300.

FIG. 3 shows a logic flow diagram illustrating example aspects of a user purchase checkout in some embodiments of the SAT, e.g., a User Purchase Checkout ("UPC") component 300. In some embodiments, a user may desire to purchase a product, service, offering, and/or the like ("product"), from a merchant via a merchant online site or in the merchant's store. The user may communicate with a merchant/acquirer ("merchant") server via a PoS client. For example, the user may provide user input, e.g., 301, into the client indicating the user's desire to purchase the product. The client may generate a checkout request, e.g., 302, and provide the checkout request to the merchant server. In some embodiments, the merchant server may obtain the checkout request from the client, and extract the checkout detail (e.g., XML data) from the checkout request. For example, the merchant server may utilize a parser such as the example parsers described below in the discussion with reference to FIG. 17. Based on parsing the checkout request, the merchant server may extract product data (e.g., product identifiers), as well as available PoS client data, from the checkout request. In some embodiments, using the product data, the merchant server may query, e.g., 303, a merchant/acquirer ("merchant") database to obtain product data, e.g., 304, such as product information, product pricing, sales tax, offers, discounts, rewards, and/or other information to process the purchase transaction and/or provide value-added services for the user. In some embodiments, in response to obtaining the product data, the merchant server may generate, e.g., 305, checkout data to provide, e.g., 306, for the PoS client. Upon obtaining the checkout data, in some embodiments, the PoS client may determine whether the user must provide hardware chip-based authentication before the transaction can be processed, e.g., 307. In some implementations, the PoS client may require that every transaction must be authenticated using hardware chip-based authentication before the transaction can be processed. In alternate implementations, the PoS client may determine that hardware chip-based authentication is required based on a combination of: geographical location (e.g., via IP address; GPS coordinates) of the PoS client, value of the purchase transaction; currency of the transaction; source of the transaction payment input (e.g., plastic card, user virtual wallet device); source of funds for the transaction payment; merchant identifier; merchant/shipping source location; and/or like factors. The PoS client may render and display, e.g., 308, the checkout data, as well as a request for authentication of the transaction via hardware chip-based authentication.

Figure 4A:
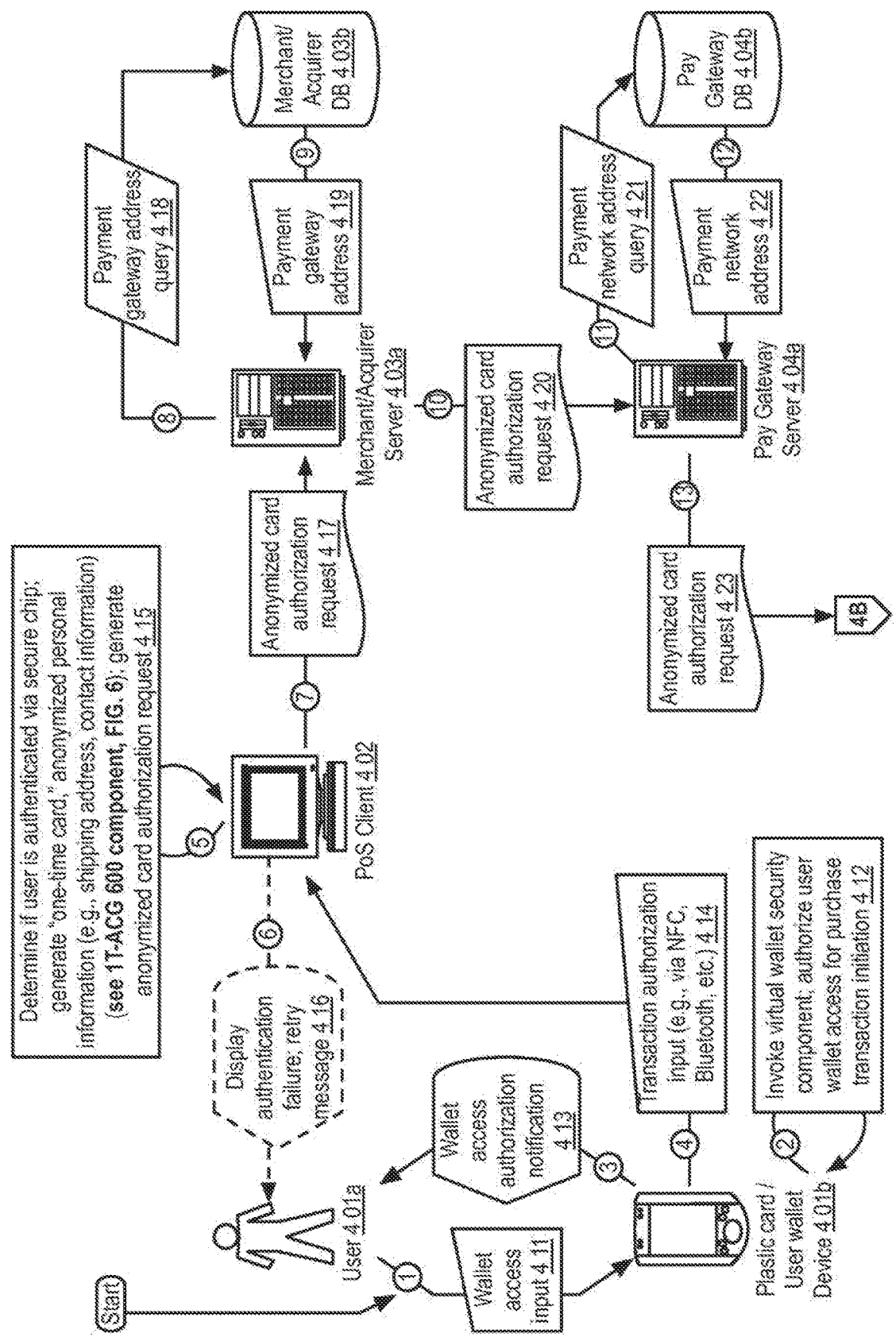
FIGS. 4A-B show data flow diagrams illustrating an example purchase transaction authorization procedure in some embodiments of the SAT.
Figure 4B:
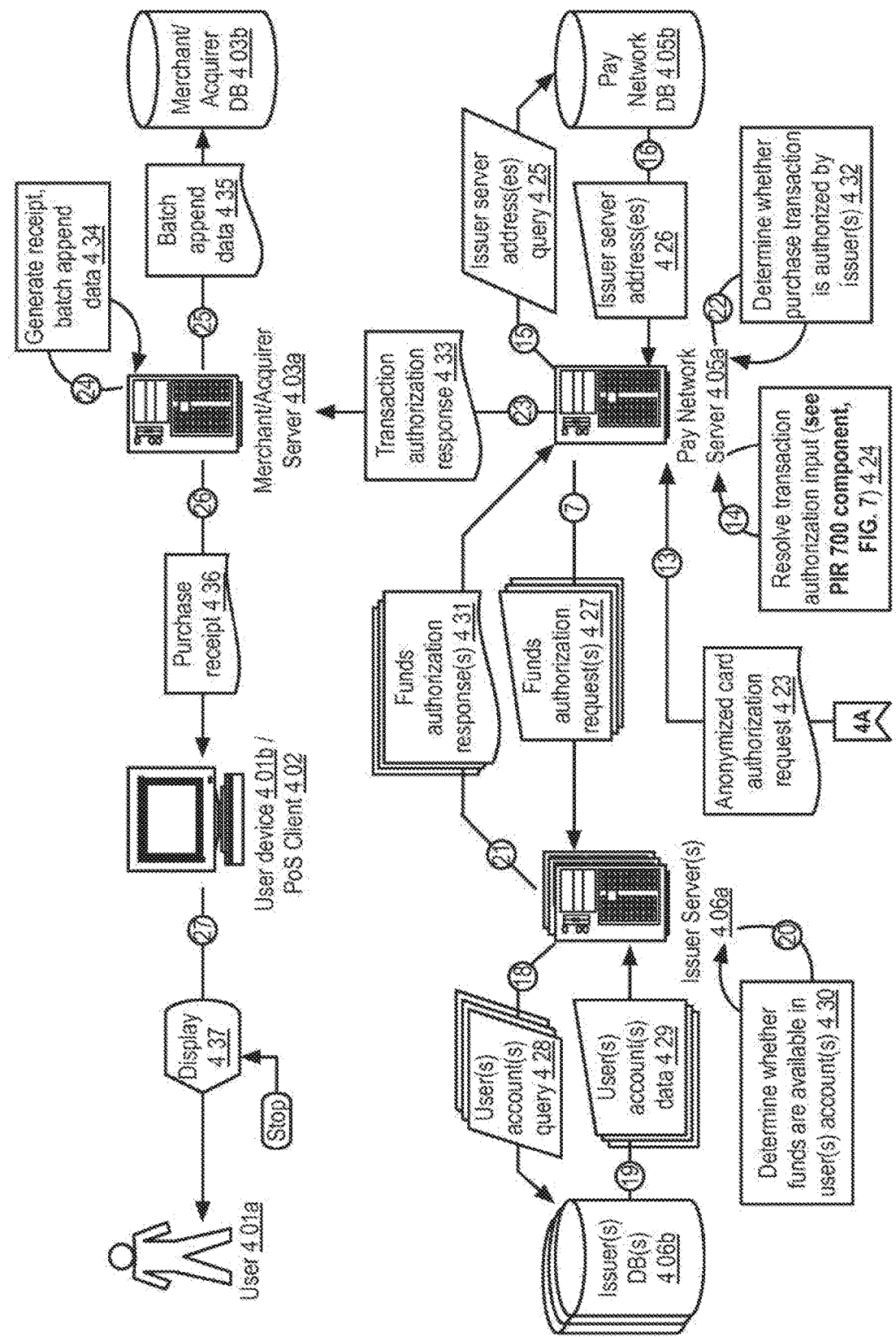

FIGS. 4A-B show data flow diagrams illustrating an example purchase transaction authorization procedure in some embodiments of the SAT. With reference to FIG. 4A, in some embodiments, a user, e.g., 401a, may wish to utilize a virtual wallet account to purchase a product, service, offering, and/or the like ("product"), from a merchant via a merchant online site or in the merchant's store. The user may utilize a physical card, or a user wallet device, e.g., 401b, to access the user's virtual wallet account. For example, the user wallet device may be a personal/laptop computer, cellular telephone, smartphone, tablet, eBook reader, netbook, gaming console, and/or the like. The user may provide a wallet access input, e.g., 411 into the user wallet device. In various embodiments, the user input may include, but not be limited to: a single tap (e.g., a one-tap mobile app purchasing embodiment) of a touchscreen interface, keyboard entry, card swipe, activating a RFID/NFC enabled hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. In some embodiments, the user wallet device may authenticate the user based on the user's wallet access input, and provide virtual wallet features for the user.

In some embodiments, upon authenticating the user for access to virtual wallet features, the user wallet device may provide a transaction authorization input, e.g., 414, to a point-of-sale ("PoS") client, e.g., 402. For example, the user wallet device may communicate with the PoS client via Bluetooth, Wi-Fi, cellular communication, one- or two-way near-field communication ("NFC"), and/or the like. In embodiments where the user utilizes a plastic card instead of the user wallet device, the user may swipe the plastic card at the PoS client to transfer information from the plastic card into the PoS client. For example, the PoS client may obtain, as transaction authorization input 414, track 1 data from the user's plastic card (e.g., credit card, debit card, prepaid card, charge card, etc.), such as the example track 1 data provided below:

```
%B123456789012345^PUBLIC/
J.Q.^99011200000000000000**901******?*
```

(wherein '123456789012345' is the card number of 'J.Q. Public' and has a CVV number of 901. '990112' is a service code, and *** represents decimal digits which change randomly each time the card is used.)

In embodiments where the user utilizes a user wallet device, the user wallet device may provide payment information to the PoS client, formatted according to a data formatting protocol appropriate to the communication mechanism employed in the communication between the user wallet device and the PoS client. An example listing of transaction authorization input 414, substantially in the form of XML-formatted data, is provided below:

```
<?XML version = "1.0" encoding = "UTF-8"?>
<transaction_authorization_input>
    <payment_data>
        <account>
            <charge_priority>1</charge_priority>
            <charge_ratio>40%</charge_ratio>
            <account_number>123456789012345</account_number>
            <account_name>John Q. Public</account_name>
            <bill_add>987 Green St #456, Chicago, IL 94652</bill_add>
            <ship_add>987 Green St #456, Chicago, IL 94652
            </ship_add>
            <CVV>123</CVV>
        </account>
```

-continued

```
        <account>
            <charge_priority>1</charge_priority>
            <charge_ratio>60%</charge_ratio>
            <account_number>234567890123456</account_number>
            <account_name>John Q. Public</account_name>
            <bill_add>987 Green St #456, Chicago, IL 94652</bill_add>
            <ship_add>987 Green St #456, Chicago, IL 94652
            </ship_add>
            <CVV>173</CVV>
        </account>
        <account>
            <charge_priority>2</charge_priority>
            <charge_ratio>100%</charge_ratio>
            <account_number>345678901234567</account_number>
            <account_name>John Q. Public</account_name>
            <bill_add>987 Green St #456, Chicago, IL 94652</bill_add>
            <ship_add>987 Green St #456, Chicago, IL 94652
            </ship_add>
            <CVV>695</CVV>
        </account>
    </payment_data>
    <!--optional data-->
    <timestamp>2011-02-22 15:22:43</timestamp>
    <expiry_lapse>00:00:30</expiry_lapse>
    <secure_key>0445329070598623487956543322</secure_key>
    <alerts_track_flag>TRUE</alerts_track_flag>
    <device_fingerprint>
        <device_IP>192.168.23.126</device_IP>
        <device_MAC>0123.4567.89ab</device_MAC>
        <device_serial>312456768798765432</device_serial>
        <device_ECID>00000AEBCDF12345</device_ECID>
        <device_identifier>jqp_air</device_identifier>
        <device_UDID>21343e34-14f4-8jn4-7yfe-124578632134
        </device_UDID>
        <device_browser>firefox 2.2</device_browser>
        <device_type>smartphone</device_type>
        <device_model>HTC Hero</device_model>
        <OS>Android 2.2</OS>
        <wallet_app_installed_flag>true</wallet_app_installed_flag>
    </device_fingerprint>
</transaction_authorization_input>
```

In some embodiments, the PoS client may determine whether a user is authenticated before initiating a purchase transaction on behalf of the user. For example, the PoS client may determine if the user is authenticated via a secure chip embedded within the PoS client. If the PoS client determines that the user is not authenticated, the PoS client may display an "authentication failure" message, e.g., 416, and a request to retry authentication of the user. If the PoS client determines that the user is authenticated, the PoS client may generate, e.g., 415, a "one-time card," including, without limitation: an anonymized one-time use card number, anonymized personal information (e.g., name, billing address, user ID, etc.), anonymized shipping to information; and/or the like. For example, the PoS client may utilize a component such as the example 1T-ACG component 600 described below in the discussion with reference to FIG. 6.

In some embodiments, upon authenticating the user via the secure hardware chip, the PoS client may generate a card authorization request, e.g., 417, using the anonymized one-time card data, and/or product/checkout data (see, e.g., FIG. 2, 215-217). An example listing of a card authorization request 417, substantially in the form of a HTTP(S) POST message including XML-formatted data, is provided below:

```
POST /authorizationrequests.php HTTP/1.1
Host: www.acquirer.com
Content-Type: Application/XML
Content-Length: 1306
<?XML version = "1.0" encoding = "UTF-8"?>
<card_authorization_request>
```

```xml
<session_ID>4NFU4RG94</order_ID>
<timestamp>2011-02-22 15:22:43</timestamp>
<expiry>00:00:30</expiry>
<alerts_URL>www.merchant.com/shopcarts.php?sessionID=AEBB4356</alerts_URL>
<!--optional data-->
<user_ID>ANONUSER_12345</user_ID>
<PoS_details>
    <PoS_IP>000.000.00.000</client_IP>
    <PoS_type>hidden</client_type>
    <PoS_model>hidden</client_model>
    <OS>hidden</OS>
    <app_installed_flag>true</app_installed_flag>
</PoS_details>
<purchase_details>
    <cart>
        <product>
            <merchant_params>
                <merchant_id>54TBRELF8</merchant_id>
                <merchant_name>BARNES, Inc.</merchant_name>
                <merchant_auth_key>TMN45GER98</merchant_auth_key>
            </merchant_params>
            <product_type>book</product_type>
            <product_params>
                <product_title>XML for dummies</product_title>
                <ISBN>938-2-14-168710-0</ISBN>
                <edition>2nd ed.</edition>
                <cover>hardbound</cover>
            </product_params>
            <quantity>2</quantity>
            <coupon_id>AY34567</coupon_id>
        <social_flag>SECURE</social_flag>
        </product>
        <product>
            <merchant_params>
                <merchant_id>3FBCR4INC</merchant_id>
                <merchant_name>Books, Inc.</merchant_name>
                <merchant_auth_key>1N484MCP</merchant_auth_key>
            </merchant_params>
            <product_type>book</product_type>
            <product_params>
                <product_title>Sophie's World</product_title>
                <ISBN>955-2-14-112310-0</ISBN>
                <edition>NULL</edition>
                <cover>hardbound</cover>
            </product_params>
            <quantity>1</quantity>
            <coupon_id>null</coupon_id>
        <social_flag>OFF</social_flag>
        </product>
    </cart>
    <cart>
        <product>
            <merchant_params>
                <merchant_id>RFH5IB4FT</merchant_id>
                <merchant_name>Amzn, Inc.</merchant_name>
                <merchant_auth_key>44543DSJFG</merchant_auth_key>
            </merchant_params>
            <product_type>book</product_type>
            <product_params>
                <product_title>XML - a primer</product_title>
                <ISBN>938-2-14-1436710-0</ISBN>
                <edition>2nd ed.</edition>
                <cover>hardbound</cover>
            </product_params>
            <quantity>2</quantity>
            <coupon_id>AY34567</coupon_id>
        <social_flag>SECURE2</social_flag>
        <social_message>Look what I bought today1</social_message>
        <social_networks>facebook twitter<social_networks>
        </product>
        <product>
            <merchant_params>
                <merchant_id>3FBCR4INC</merchant_id>
                <merchant_name>BestBooks, Inc.</merchant_name>
                <merchant_auth_key>1N484MCP</merchant_auth_key>
            </merchant_params>
            <product_type>book</product_type>
            <product_params>
                <product_title>Sophie's Choice</product_title>
```

```
            <ISBN>938-2-14-168710-0</ISBN>
            <edition>1st ed.</edition>
        </product_params>
        <quantity>1</quantity>
        <coupon_id>null</coupon_id>
        <social_flag>OFF</social_flag>
      </product>
    </cart>
  </purchase_details>
  <account_params>
    <account>
        <ratio>100%</ratio>
        <account_name>ANONUSER_12345</account_name>
        <account_type>SECURE</account_type>
        <billing_add>123 Anonymous St., Anon, AN 99999</billing_add>
        <phone>000-000-0000</phone>
        <sign>/anon/</sign>
        <confirm_type>email</confirm_type>
        <contact_info>anonuser@securebuy.com</contact_info>
        <mode>NFC</mode>
    </account>
  </account_params>
  <shipping_info>
      <shipping_adress>#ref-ANON-123-45-678</shipping_address>
      <ship_type>expedited</ship_type>
      <ship_carrier>FedEx</ship_carrier>
      <ship_account>ANON-123-45-678</ship_account>
      <tracking_flag>true</tracking_flag>
      <sign_flag>false</sign_flag>
  </shipping_info>
</card_authorization_request>
```

In some embodiments, the card authorization request generated by the user device may include a minimum of information required to process the purchase transaction. For example, this may improve the efficiency of communicating the purchase transaction request, and may also advantageously improve the privacy protections provided to the user and/or merchant. For example, in some embodiments, the card authorization request may include at least an anonymized session ID for the user's shopping session with the merchant. The session ID may be utilized by any component and/or entity having the appropriate access authority to access a secure site on the merchant server to obtain alerts, reminders, and/or other data about the transaction(s) within that shopping session between the user and the merchant In some embodiments, the PoS client may provide the generated card authorization request to the merchant server, e.g., 417. The merchant server may forward the card authorization request to a pay gateway server, e.g., 404a, for routing the card authorization request to the appropriate payment network for payment processing. For example, the pay gateway server may be able to select from payment networks, such as Visa, Mastercard, American Express, Paypal, etc., to process various types of transactions including, but not limited to: credit card, debit card, prepaid card, B2B and/or like transactions. In some embodiments, the merchant server may query a database, e.g., merchant/acquirer database 403b, for a network address of the payment gateway server, for example by using a portion of a user payment card number, or a user ID (such as an email address) as a keyword for the database query. For example, the merchant server may issue PHP/SQL commands to query a database table (such as FIG. 17, Pay Gateways 1719h) for a URL of the pay gateway server. An example payment gateway address query 418, substantially in the form of PHP/SQL commands, is provided below:

```
<?PHP
header('Content-Type: text/plain');
mysql_connect("254.93.179.112",$DBserver,$password); // access
database server
mysql_select_db("SAT_DB.SQL"); // select database table to search
//create query
$query = "SELECT paygate_id paygate_address
    paygate_URL paygate_name FROM PayGatewayTable
    WHERE card_num LIKE '%' $cardnum";
$result = mysql_query($query); // perform the search query
mysql_close("SAT_DB.SQL"); // close database access
?>
```

In response, the merchant/acquirer database may provide the requested payment gateway address, e.g., 419. The merchant server may forward the card authorization request to the pay gateway server using the provided address, e.g., 420. In some embodiments, upon receiving the card authorization request from the merchant server, the pay gateway server may invoke a component to provide one or more services associated with purchase transaction authorization. For example, the pay gateway server may invoke components for fraud prevention, loyalty and/or rewards, and/or other services for which the user-merchant combination is authorized. The pay gateway server may forward the card authorization request to a pay network server, e.g., 405a, for payment processing. For example, the pay gateway server may be able to select from payment networks, such as Visa, Mastercard, American Express, Paypal, etc., to process various types of transactions including, but not limited to: credit card, debit card, prepaid card, B2B and/or like transactions. In some embodiments, the pay gateway server may query a database, e.g., pay gateway database 404b, for a network address of the payment network server, for example by using a portion of a user payment card number, or a user ID (such as an email address) as a keyword for the database query. For example, the pay gateway server may issue PHP/SQL commands to query a database table (such as FIG. 17, Pay Gateways 1719h) for a URL of the pay network server. An example payment network address query 421, substantially in the form of PHP/SQL commands, is provided below:

```
<?PHP
header('Content-Type: text/plain');
mysql_connect("254.93.179.112",$DBserver,$password); // access
database server
mysql_select_db("SAT_DB.SQL"); // select database table to search
//create query
$query = "SELECT payNET_id payNET_address
    payNET_URL payNET_name FROM PayGatewayTable
    WHERE card_num LIKE '%' $cardnum";
$result = mysql_query($query); // perform the search query
mysql_close("SAT_DB.SQL"); // close database access
?>
```

In response, the payment gateway database may provide the requested payment network address, e.g., 422. The pay gateway server may forward the card authorization request to the pay network server using the provided address, e.g., 423.

With reference to FIG. 4B, in some embodiments, the pay network server may process the transaction so as to transfer funds for the purchase into an account stored on an acquirer of the merchant. For example, the acquirer may be a financial institution maintaining an account of the merchant. For example, the proceeds of transactions processed by the merchant may be deposited into an account maintained by at a server of the acquirer. In some implementations, the pay network server may obtain a card authorization request, and determine that the card authorization request is anonymized. The pay network server may resolve the actual transaction authorization input from the user to facilitate a purchase transaction authorization procedure. For example, the pay network server may utilize a component such as the example PIR 700 component described below in the discussion with reference to FIG. 7, e.g., 424.

Figure 17:
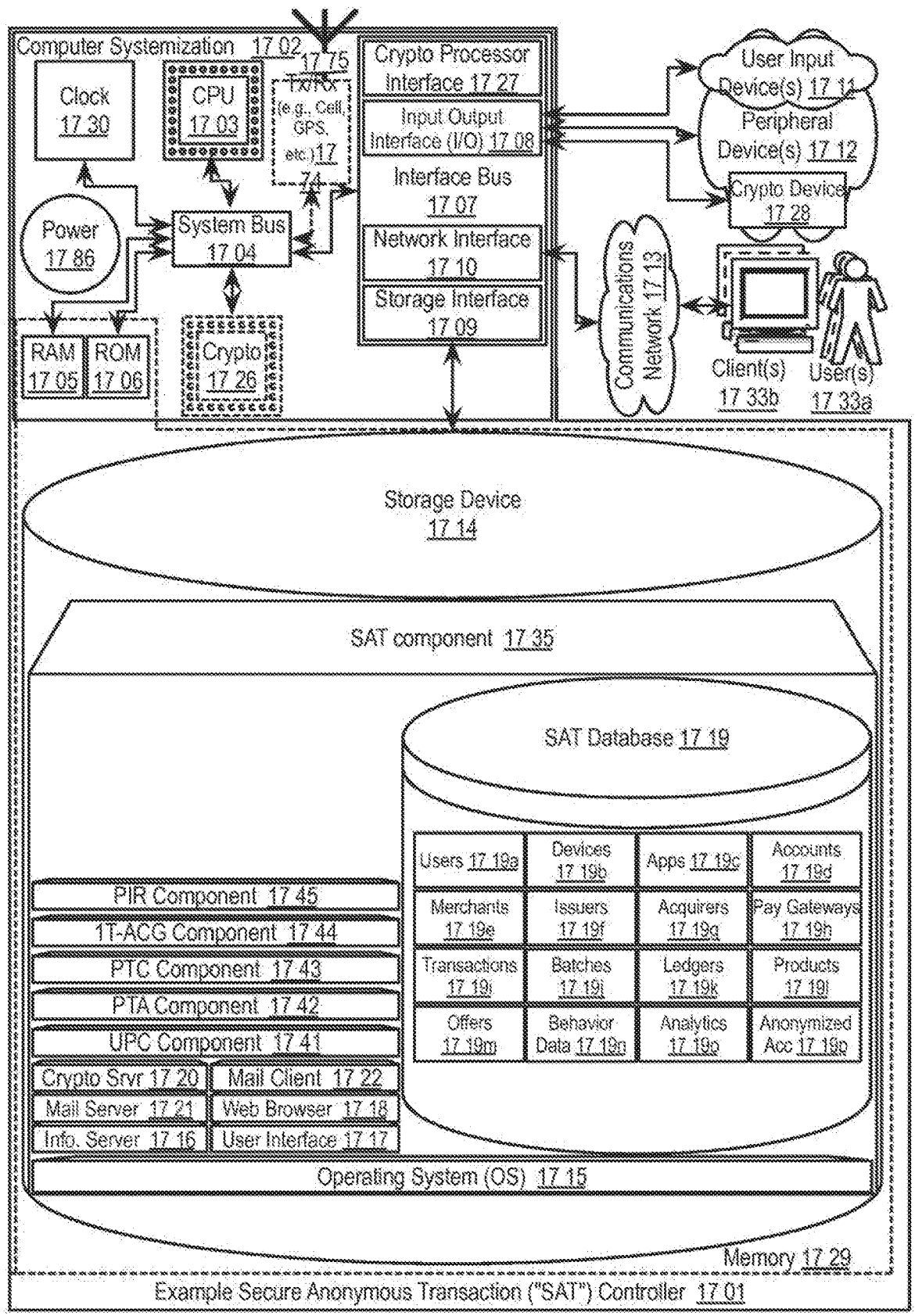
FIG. 17 shows a block diagram illustrating embodiments of a SAT controller.

In some embodiments, the pay network server may generate a query, e.g., 425, for issuer server(s) corresponding to the user-selected payment options. For example, the user's account may be linked to one or more issuer financial institutions ("issuers"), such as banking institutions, which issued the account(s) for the user. For example, such accounts may include, but not be limited to: credit card, debit card, prepaid card, checking, savings, money market, certificates of deposit, stored (cash) value accounts and/or the like. Issuer server(s), e.g., 406a, of the issuer(s) may maintain details of the user's account(s). In some embodiments, a database, e.g., pay network database 405b, may store details of the issuer server(s) associated with the issuer(s). In some embodiments, the pay network server may query a database, e.g., pay network database 405b, for a network address of the issuer(s) server(s), for example by using a portion of a user payment card number, or a user ID (such as an email address) as a keyword for the database query. For example, the merchant server may issue PHP/SQL commands to query a database table (such as FIG. 17, Issuers 1719f) for network address(es) of the issuer(s) server(s). An example issuer server address(es) query 425, substantially in the form of PH P/SQL commands, is provided below:

```
<?PHP
header('Content-Type: text/plain');
mysql_connect("254.93.179.112",$DBserver,$password); // access
database server
mysql_select_db("SAT_DB.SQL"); // select database table to search
//create query
$query = "SELECT issuer_id issuer_address
    issuer_URL issuer_name FROM IssuersTable
    WHERE card_num LIKE '%' $cardnum";
$result = mysql_query($query); // perform the search query
mysql_close("SAT_DB.SQL"); // close database access
?>
```

In response to obtaining the issuer server query, e.g., 425, the pay network database may provide, e.g., 426, the requested issuer server data to the pay network server. In some embodiments, the pay network server may utilize the issuer server data n to generate funds authorization request(s), e.g., 427, for each of the issuer server(s) selected based on the pre-defined payment settings associated with the user's virtual wallet, and/or the user's payment options input, and provide the funds authorization request(s) to the issuer server(s). In some embodiments, the funds authorization request(s) may include details such as, but not limited to: the costs to the user involved in the transaction, card account details of the user, user billing and/or shipping information, and/or the like. An example listing of a funds authorization request 427, substantially in the form of a HTTP(S) POST message including XML-formatted data, is provided below:

```
POST /fundsauthorizationrequest.php HTTP/1.1
Host: www.issuer.com
Content-Type: Application/XML
Content-Length: 624
<?XML version = "1.0" encoding = "UTF-8"?>
<funds_authorization_request>
    <query_ID>VNEI39FK</query_ID>
    <timestamp>2011-02-22 15:22:44</timestamp>
    <transaction_cost>$22.61</transaction_cost>
    <account_params>
        <account_type>checking</account_type>
        <account_num>1234567890123456</account_num>
    </account_params>
    <!--optional parameters-->
    <purchase_summary>
        <num_products>1</num_products>
        <product>
            <product_summary>Book - XML for dummies
            </product_summary>
            <product_quantity>1</product_quantity?
        </product>
    </purchase_summary>
    <merchant_params>
        <merchant_id>3FBCR4INC</merchant_id>
```

-continued

```
    <merchant_name>Books & Things, Inc.</merchant_name>
    <merchant_auth_key>1NNF484MCP59CHB27365
    </merchant_auth_key>
  </merchant_params>
</funds_authorization_request>
```

In some embodiments, an issuer server may parse the authorization request(s), and based on the request details may query a database, e.g., user profile database 406b, for data associated with an account linked to the user. For example, the merchant server may issue PHP/SQL, commands to query a database table (such as FIG. 17, Accounts 1719d) for user account(s) data. An example user account(s) query 428, substantially in the form of PHP/SQL commands, is provided below:

```
<?PHP
header('Content-Type: text/plain');
mysql_connect("254.93.179.112",$DBserver,$password); // access
database server
mysql_select_db("SAT_DB.SQL"); // select database table to search
//create query
$query = "SELECT issuer user_id user_name
  user_balance account_type FROM AccountsTable
  WHERE account_num LIKE '%' $accountnum";
$result = mysql_query($query); // perform the search query
mysql_close("SAT_DB.SQL"); // close database access
?>
```

In some embodiments, on obtaining the user account(s) data, e.g., 429, the issuer server may determine whether the user can pay for the transaction using funds available in the account, 430. For example, the issuer server may determine whether the user has a sufficient balance remaining in the account, sufficient credit associated with the account, and/or the like. Based on the determination, the issuer server(s) may provide a funds authorization response, e.g., 431, to the pay network server. For example, the issuer server(s) may provide a HTTP(S) POST message similar to the examples above. In some embodiments, if at least one issuer server determines that the user cannot pay for the transaction using the funds available in the account, the pay network server may request payment options again from the user (e.g., by providing an authorization fail message to the user device and requesting the user device to provide new payment options), and re-attempt authorization for the purchase transaction. In some embodiments, if the number of failed authorization attempts exceeds a threshold, the pay network server may abort the authorization process, and provide an "authorization fail" message to the merchant server, user device and/or client.

In some embodiments, the pay network server may obtain the funds authorization response including a notification of successful authorization, and parse the message to extract authorization details. Upon determining that the user possesses sufficient funds for the transaction, e.g., 432, the pay network server may invoke a component to provide value-add services for the user.

In some embodiments, the pay network server may generate a transaction data record from the authorization request and/or authorization response, and store the details of the transaction and authorization relating to the transaction in a transactions database. For example, the pay network server may issue PHP/SQL commands to store the data to a database table (such as FIG. 17, Transactions 1719i). An example transaction store command, substantially in the form of PHP/SQL commands, is provided below:

```
<?PHP
header('Content-Type: text/plain');
mysql_connect("254.92.185.103",$DBserver,$password); // access database server
mysql_select("SAT_DB.SQL"); // select database to append
mysql_query("INSERT INTO TransactionsTable (PurchasesTable (timestamp,
    purchase_summary_list, num_products, product_summary, product_quantity,
    transaction_cost, account_params_list, account_name, account_type,
    account_num, billing_addres, zipcode, phone, sign, merchant_params_list,
    merchant_id, merchant_name, merchant_auth_key)
VALUES (time( ), $purchase_summary_list, $num_products, $product_summary,
    $product_quantity, $transaction_cost, $account_params_list, $account_name,
    $account_type, $account_num, $billing_addres, $zipcode, $phone, $sign,
    $merchant_params_list, $merchant_id, $merchant_name, $merchant_auth_key)");
    // add data to table in database
mysql_close("SAT_DB.SQL"); // close connection to database
?>
```

In some embodiments, the pay network server may forward a transaction authorization response, e.g., 433, to the user wallet device, PoS client, and/or merchant so server. The merchant may obtain the transaction authorization response, and determine from it that the user possesses sufficient funds in the card account to conduct the transaction. The merchant server may add a record of the transaction for the user to a batch of transaction data relating to authorized transactions. For example, the merchant may append the XML data pertaining to the user transaction to an XML data file comprising XML data for transactions that have been authorized for various users, e.g., 434, and store the XML data file, e.g., 435, in a database, e.g., merchant database 404. For example, a batch XML data file may be structured similar to the example XML data structure template provided below:

```
<?XML version = "1.0" encoding = "UTF-8"?>
<merchant_data>
    <merchant_id>3FBCR4INC</merchant_id>
    <merchant_name>Books & Things, Inc.</merchant_name>
    <merchant_auth_key>1NNF484MCP59CHB27365
    </merchant_auth_key>
    <account_number>123456789</account_number>
</merchant_data>
<transaction_data>
    <transaction 1>
        ...
    </transaction 1>
    <transaction 2>
        ....
    </transaction 2>
    .
    .
    .
    <transaction n>
        ...
    </transaction n>
</transaction_data>
```

In some embodiments, the server may also generate a purchase receipt, e.g., 434, and provide the purchase receipt to the client, e.g., 436. The client may render and display, e.g., 437, the purchase receipt for the user. In some embodiments, the user's wallet device may also provide a notification of successful authorization to the user. For example, the PoS client/user device may render a webpage, electronic message, text/SMS message, buffer a voicemail, emit a ring tone, and/or play an audio message, etc., and provide output including, but not limited to: sounds, music, audio, video, images, tactile feedback, vibration alerts (e.g., on vibration-capable client devices such as a smartphone etc.), and/or the like.

In some implementations, the pay network server may obtain the funds authorization responses, match the responses to an anonymized purchase order, determine the actual user that requested the authenticated purchase order corresponding to the authorized purchase order, and generate a pre-clearance notification for the user in real-time. Thus, a user can be notified in real-time if any transaction has been commissioned on behalf of the user. Thus, in some implementations, if the purchase has not been authorized by the user (e.g., the purchase receipt from the merchant server is being sent to a fraudster), the user will be notified at a trusted client device (e.g., a wallet device, and/or one disposed in communication with the authentication chip) of the fraudulent transaction, and the user can take steps to stop the transaction even before it clears. One the other hand, if the transaction was authorized by the user, the pre-clearance notification may serve as a purchase receipt for the user. The client may obtain the pre-clearance notification, and may render and display the pre-clearance notification for the user. For example, the client may render a webpage, electronic message, text/SMS message, buffer a voicemail, emit a ring tone, and/or play an audio message, etc., and provide output including, but not limited to: sounds, music, audio, video, images, tactile feedback, vibration alerts (e.g., on vibration-capable client devices such as a smartphone etc.), and/or the like.

Figure 5A:
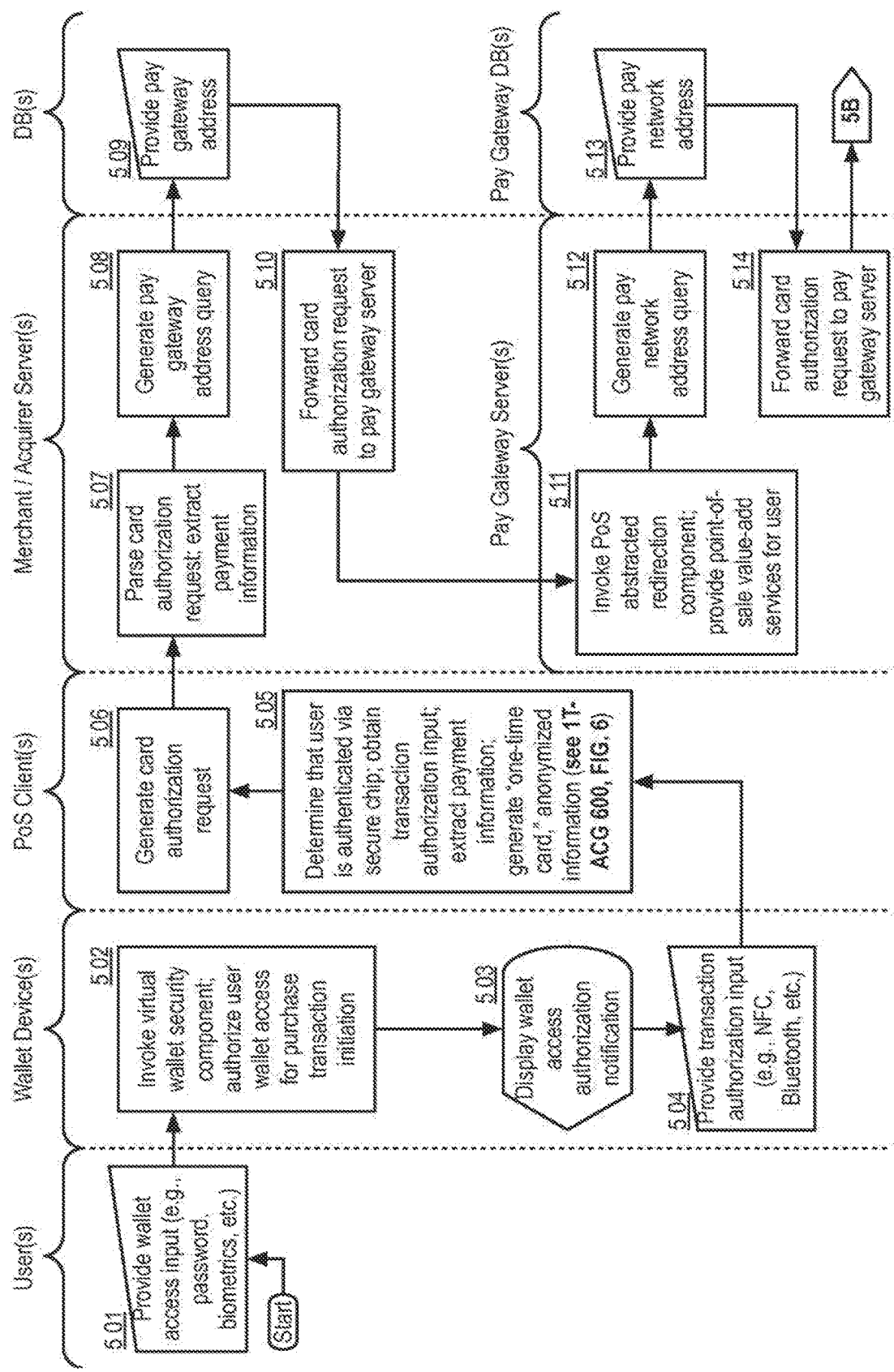
FIGS. 5A-B show logic flow diagrams illustrating example aspects of purchase transaction authorization in some embodiments of the SAT, e.g., a Purchase Transaction Authorization ("PTA") component 500.
Figure 5B:
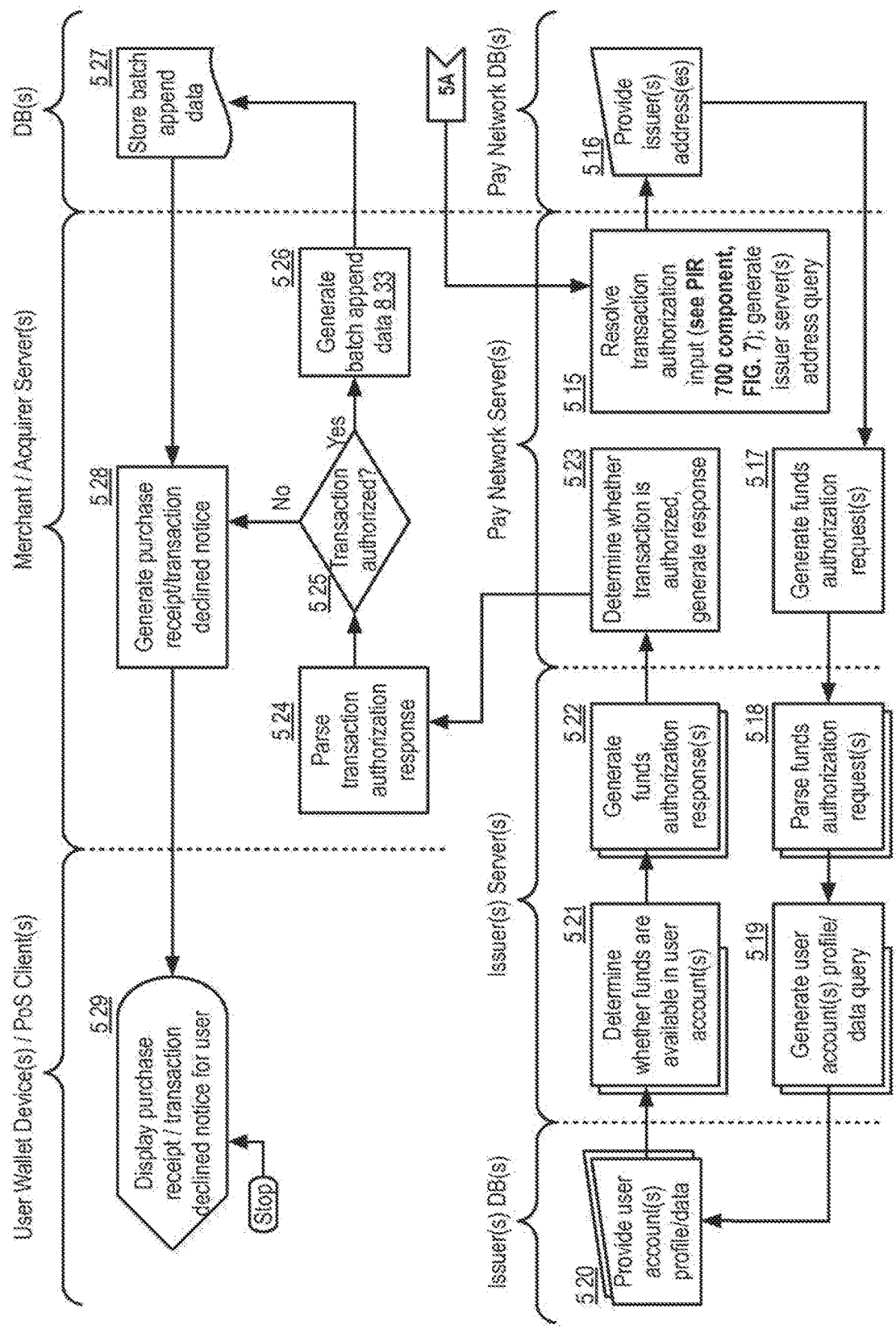

FIGS. 5A-B show logic flow diagrams illustrating example aspects of purchase transaction authorization in some embodiments of the SAT, e.g., a Purchase Transaction Authorization ("PTA") component 500. With reference to FIG. 5A, in some embodiments, a user may wish to utilize a virtual wallet account to purchase a product, service, offering, and/or the like ("product"), from a merchant via a merchant online site or in the merchant's store. The user may utilize a physical card, or a user wallet device to access the user's virtual wallet account. For example, the user wallet device may be a personal/laptop computer, cellular telephone, smartphone, tablet, eBook reader, netbook, gaming console, and/or the like. The user may provide a wallet access input, e.g., 501, into the user wallet device. In various embodiments, the user input may include, but not be limited to: a single tap (e.g., a one-tap mobile app purchasing embodiment) of a touchscreen interface, keyboard entry, card swipe, activating a RFID/NFC enabled hardware device (e.g., electronic card having multiple accounts, smartphone, tablet, etc.) within the user device, mouse clicks, depressing buttons on a joystick/game console, voice commands, single/multi-touch gestures on a touch-sensitive interface, touching user interface elements on a touch-sensitive display, and/or the like. In some embodiments, the user wallet device may authenticate the user based on the user's wallet access input, and provide virtual wallet features for the user, e.g., 502-503.

In some embodiments, upon authenticating the user for access to virtual wallet features, the user wallet device may provide a transaction authorization input, e.g., 504, to a point-of-sale ("PoS") client. For example, the user wallet device may communicate with the PoS client via Bluetooth, Wi-Fi cellular communication, one- or two-way near-field communication ("NFC"), and/or the like In embodiments here the user utilizes a plastic card instead of the user wallet device, the user may swipe the plastic card at the PoS client to transfer information from the plastic card into the PoS client. In embodiments where the user utilizes a user wallet device, the user wallet device may provide payment information to the PoS client, formatted according to a data formatting protocol appropriate to the communication mechanism employed in the communication between the user wallet device and the PoS client.

In some embodiments, the PoS client may determine whether a user is authenticated before initiating a purchase transaction on behalf of the user, e.g., 505. For example, the PoS client may determine if the user is authenticated via a secure chip embedded within the PoS client. If the PoS client determines that the user is authenticated, the PoS client may generate a "one-time card," including, without limitation: an anonymized one-time use card number, anonymized personal information (e.g., name, billing address, user ID, etc.), anonymized shipping information; and/or the like. For example, the PoS client may utilize a component such as the example 1T-ACG component 600 described below in the discussion with reference to FIG. 6.

In some embodiments, the PoS client may obtain the transaction authorization input, and parse the input to extract payment information from the transaction authorization input, e.g., 505. For example, the PoS client may utilize a parser, such as the example parsers provided below in the discussion with reference to FIG. 17. The PoS client may generate a card authorization request, e.g., 50o6, using the obtained transaction authorization input from the user wallet device, and/or product/checkout data (see, e.g., FIG. 2, 215-217).

In some embodiments, the PoS client may provide the generated card authorization request to the merchant server. The merchant server may forward the card authorization request to a pay gateway server, for routing the card authorization request to the appropriate payment network for payment processing. For example, the pay gateway server may be able to select from payment networks, such as Visa, Mastercard, American Express, Paypal, etc., to process various types of transactions including, but not limited to: credit card, debit card, prepaid card, B2B and/or like transactions. In some embodiments, the merchant server may query a database, e.g., 508, for a network address of the payment gateway server, for example by using a portion of a user payment card number, or a user ID (such as an email address) as a keyword for the database query. In response, the merchant/acquirer database may provide the requested payment gateway address, e.g., 510. The merchant server may forward the card authorization request to the pay gateway server using the provided address. In some embodiments, upon receiving the card authorization request from the merchant server, the pay gateway server may invoke a component to provide one or more service associated with purchase transaction authorization, e.g., 511. For example, the pay gateway server may invoke components for fraud prevention (see e.g., VerifyChat, FIG. 3E), loyalty ti and/or rewards, and/or other services for which the user-merchant combination is authorized.

The pay gateway server may forward the card authorization request to a pay network server for payment processing, e.g., 514. For example, the pay gateway server may be able to select from payment networks, such as Visa, Mastercard, American Express, Paypal, etc., to process various types of transactions including, but not limited to: credit card, debit card, prepaid card, B2B and/or like transactions. In some embodiments, the pay gateway server may query a database, e.g., 512, for a network address of the payment network server, for example by using a portion of a user payment card number, or a user ID (such as an email address) as a keyword for the database query. In response, the payment gateway database may provide the requested payment network address, e.g., 513. The pay gateway server may forward the card authorization request to the pay network server using the provided address, e.g., 514.

With reference to FIG. 5B, in some embodiments, the pay network server may process the transaction so as to transfer funds for the purchase into an account stored on an acquirer of the merchant. For example, the acquirer may be a financial institution maintaining an account of the merchant. For example, the proceeds of transactions processed by the merchant may be deposited into an account maintained by at a server of the acquirer. In some implementations, the pay network server may determine that the card authorization request is anonymized, and may resolve the actual transaction authorization input provided by the user (via the user's plastic card, wallet device, etc.). For example, the pay network server may utilize a component such as the example PIR 700 component described below in the discussion with reference to FIG. 7, e.g., 515. In some embodiments, the pay network server may generate a query, e.g., 515, for issuer server(s) corresponding to the user-selected payment options. For example, the user's account may be linked to one or more issuer financial institutions ("issuers"), such as banking institutions, which issued the account(s) for the user. For example, such accounts may include, but not be limited to: credit card, debit card, prepaid card, checking, savings, money market, certificates of deposit, stored (cash) value accounts and/or the like. Issuer server(s) of the issuer(s) may maintain details of the user's account(s). In some embodiments, a database, e.g., a pay network database, may store details of the issuer server(s) associated with the issuer(s). In some embodiments, the pay network server may query a database, e.g., 515, for a network address of the issuer(s) server(s), for example by using a portion of a user payment card number, or a user ID (such as an email address) as a keyword for the database query.

In response to obtaining the issuer server query, the pay network database may provide, e.g., 516, the requested issuer server data to the pay network server. In some embodiments, the pay network server may utilize the issuer server data to generate funds authorization request(s), e.g., 517, for each of the issuer server(s) selected based on the pre-defined payment settings associated with the user's virtual wallet, and/or the user's payment options input, and provide the funds authorization request(s) to the issuer server(s). In some embodiments, the funds authorization request(s) may include details such as, but not limited to: the costs to the user involved in the transaction, card account details of the user, user billing and/or shipping information, and/or the like. In some embodiments, an issuer server may parse the authorization request(s), e.g., 518, and based on the request details may query a database, e.g., 519, for data associated with an account linked to the user.

In some embodiments, on obtaining the user account(s) data, e.g., 520, the issuer server may determine whether the user can pay for the transaction using funds available in the account, e.g., 521. For example, the issuer server may determine whether the user has a sufficient balance remaining in the account, sufficient credit associated with the account, and/or the like. Based on the determination, the issuer server(s) may provide a funds authorization response, e.g., 522, to the pay network server. In some embodiments, if at least one issuer server determines that the user cannot pay for the transaction using the funds available in the account, the pay network server may request payment options again from the user (e.g., by providing an authorization fail message to the user device and requesting the user device to provide new payment options), and re-attempt authorization for the purchase transaction. In some embodiments, if the number of failed authorization attempts exceeds a threshold, the pay network server may abort the authorization process, and provide an "authorization fail" message to the merchant server, user device and/or client.

In some embodiments, the pay network server may obtain the funds authorization response including a notification of successful authorization, and parse the message to extract authorization details. Upon determining that the user possesses sufficient funds for the transaction, e.g., 523, the pay network server may invoke a component to provide value-add services for the user, e.g., 523.

In some embodiments, the pay network server may forward a transaction authorization response to the user wallet device, PoS client, and/or merchant server. The merchant may parse, e.g., 524, the transaction authorization response, and determine from it that the user possesses sufficient funds in the card account to conduct the transaction, e.g., 525, option "Yes." The merchant server may add a record of the transaction for the user to a batch of transaction data relating to authorized transactions. For example, the merchant may append the XML data pertaining to the user transaction to an XML data file comprising XML data for transactions that have been authorized for various users, e.g., 526, and store the XML data file, e.g., 527, in a database. In some embodiments, the server may also generate a purchase receipt, e.g., 528, and provide the purchase receipt to the client. The client may render and display, e.g., 529, the purchase receipt for the user. In some embodiments, the user's wallet device may also provide a notification of successful authorization to the user. For example, the PoS client/user device may render a webpage, electronic message, text/SMS message, buffer a voicemail, emit a ring tone, and/or play an audio message, etc., and provide output including, but not limited to: sounds, music, audio, video, images, tactile feedback, vibration alerts (e.g., on vibration-capable client devices such as a smartphone etc.), and/or the like.

FIG. 6 shows a logic flow diagram illustrating example aspects of generating a one-time anonymous card in some embodiments of the SAT, e.g., a One-Time Anonymous Card Generation ("1T-ACG") component 600. In some implementations, a PoS client may obtain a transaction authorization input from a plastic card of a user, and/or a user wallet device (e.g., via NFC from a smartphone) executing a virtual wallet application for the user, 601. For example, the PoS client may obtain Track 1, 2 and/or 3 data (or similar data). In some implementations, the PoS client may be wallet device of the user. The PoS client may generate a hash value (e.g., via MD5 one-way hash algorithm) of the transaction authentication input of the user, 602. In some implementations, the hash value generation may be 'irreversible' in that the input into the hash value generation procedure may not be deciphered easily from the output of the procedure. The PoS client may search for the generated hash value in a secure database, 603. In response, the secure database may provide a search result indicative of whether the hash value was found in the secure database. In some implementations, the hash value may be provided as an input into a (e.g., pre-configured, reprogrammable) hardware circuit, and the output from the hardware (e.g., hard-coded) circuit may be indicative of whether the hash value is correct for authenticating the user. If the hash value is not authenticated, 605, option "No," the PoS client may generate an "authentication fail" message, 606, and display it for the user. If the hash value is authenticated, 605, option "Yes," the PoS client may, optionally (e.g., in implementations where one-time card generation is performed by a server), generate an anonymization request, 607. For example, the PoS client may utilize an API call to a server including details of the anonymization request. For example, the anonymization request may take the form of a HTTP(S) POST message including XML data in a message body, comprising, without limitation: user information, payment data, billing address, shipping address, and/or the like.

In some implementations, the PoS client or server (e.g., issuer, pay gateway, pay network, etc.) may obtain, 608, the anonymization request, and parse the anonymization request (if required) to extract the transaction authorization input, 609. In some implementations wherein a server generates one-time anonymized card data, the server may generate randon numeric or alphanumeric sequences for each of the fields included in the anonymization request, 610. In implementations wherein the PoS client generates one-time anonymized card data, the PoS client may encrypt the data using a key to produce encrypted data that can only be decrypted by a particular server (e.g., pay gateway server, pay network server, issuer server, etc.), 610. For example, the PoS client may utilize a public RSA key obtained from a public-private key pair. Thus, only the server having access to the private key of the private-public key pair may be able to decrypt the original transaction authorization input data encrypted into the one-time anonymized card data. In some implementations, the PoS client may include a timestamp or other time/session-specific data, so that for each purchase transaction, the encrypted data generated will vary even if the same key is used more than once for the encryption process. Using the random and/or encrypted data, the PoS client or server may generate anonymized transaction authorization input, 611, and store the original transaction authorization input and anonymized transaction authorization input in a database, 612. The PoS client or server may return the anonymized data for transaction processing (see 613-614).

Figure 7:
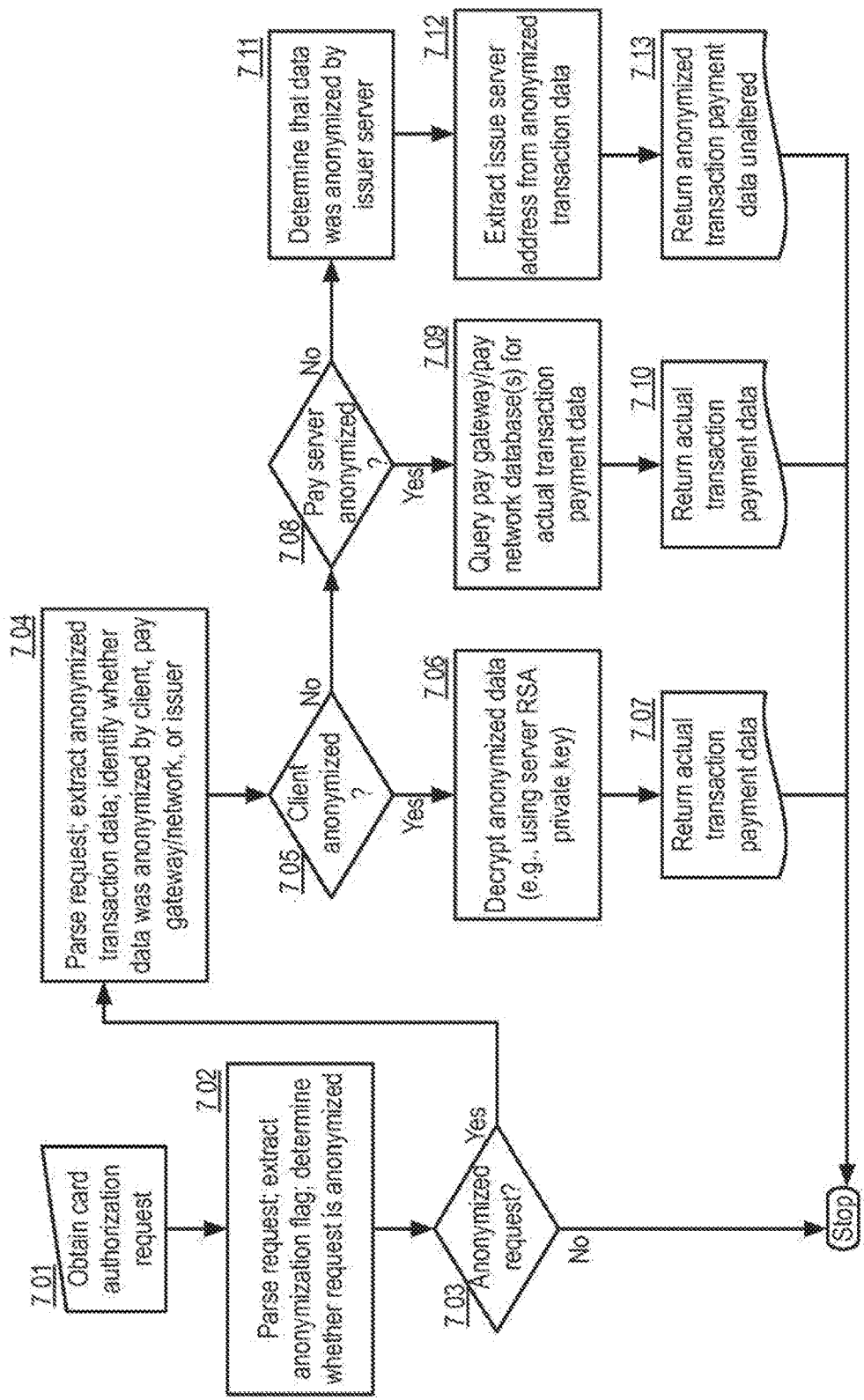
FIG. 7 shows a logic flow diagram illustrating example aspects of resolving user payment input from anonymized card data in some embodiments of the SAT, e.g., a Payment Input Resolution ("PIR") component 700.

FIG. 7 shows a logic flow diagram illustrating example aspects of resolving user payment input from anonymized card data in some embodiments of the SAT, e.g., a Payment Input Resolution ("PIR") component 700. In some implementations, a pay network server may obtain a card authorization request including anonymized card data, for processing a purchase transaction, 701. The pay network server may parse the card authorization request, and extract a flag indicative of whether the card authorization request is anonymized, 702. If the card authorization request is anonymized, 703, option "Yes," the pay network server may parse the card authorization request, and extract the anonymized transaction data, 704. The pay network server may determine whether the anonymization was performed by the PoS client or by a pay gateway server, a pay network server, an issuer server, or another server, 704. If the anonymization was performed by a PoS client, 705, option "Yes," the pay network server may utilize it private key to decrypt the data encrypted by the client (e.g., using the complementary public key, in RSA algorithm), 706, and return the actual transaction authorization input data for transaction processing, 707. If the anonymization was performed by a pay server (e.g., pay gateway, pay network), the pay network server may generate a query for the actual transaction data, using the anonymized data as a search keyword, 709, and return the actual transaction authorization input data for transaction processing, 710. If the anonymization was performed by an Issuer server, the pay network server may extract an issuer server identifier (e.g., an IP address for the issuer server), and return the anonymized data, unaltered, for transmission to the issuer server.

Figure 8A:
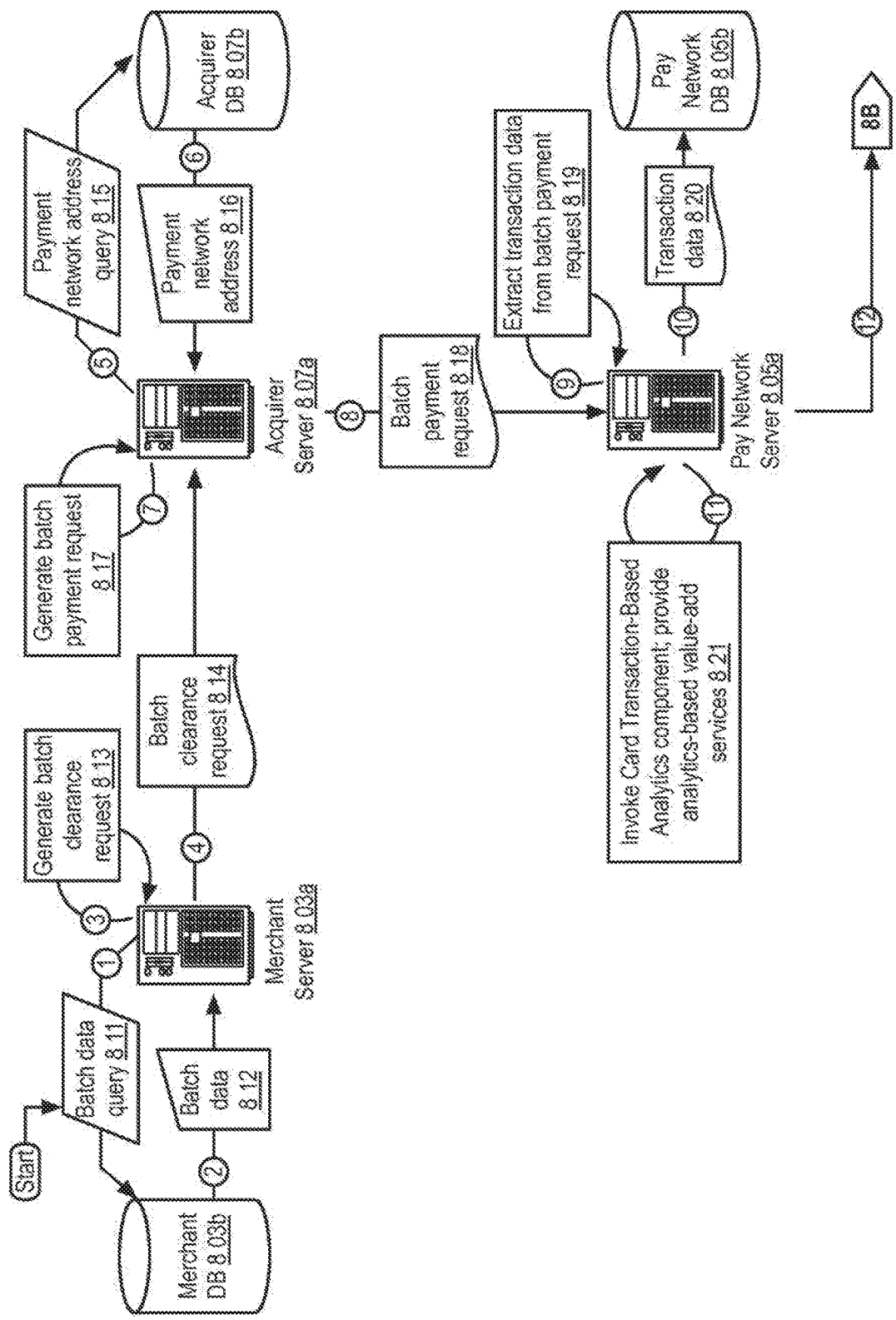
FIGS. 8A-B show data flow diagrams illustrating an example purchase transaction clearance procedure in some embodiments of the SAT.
Figure 8B:
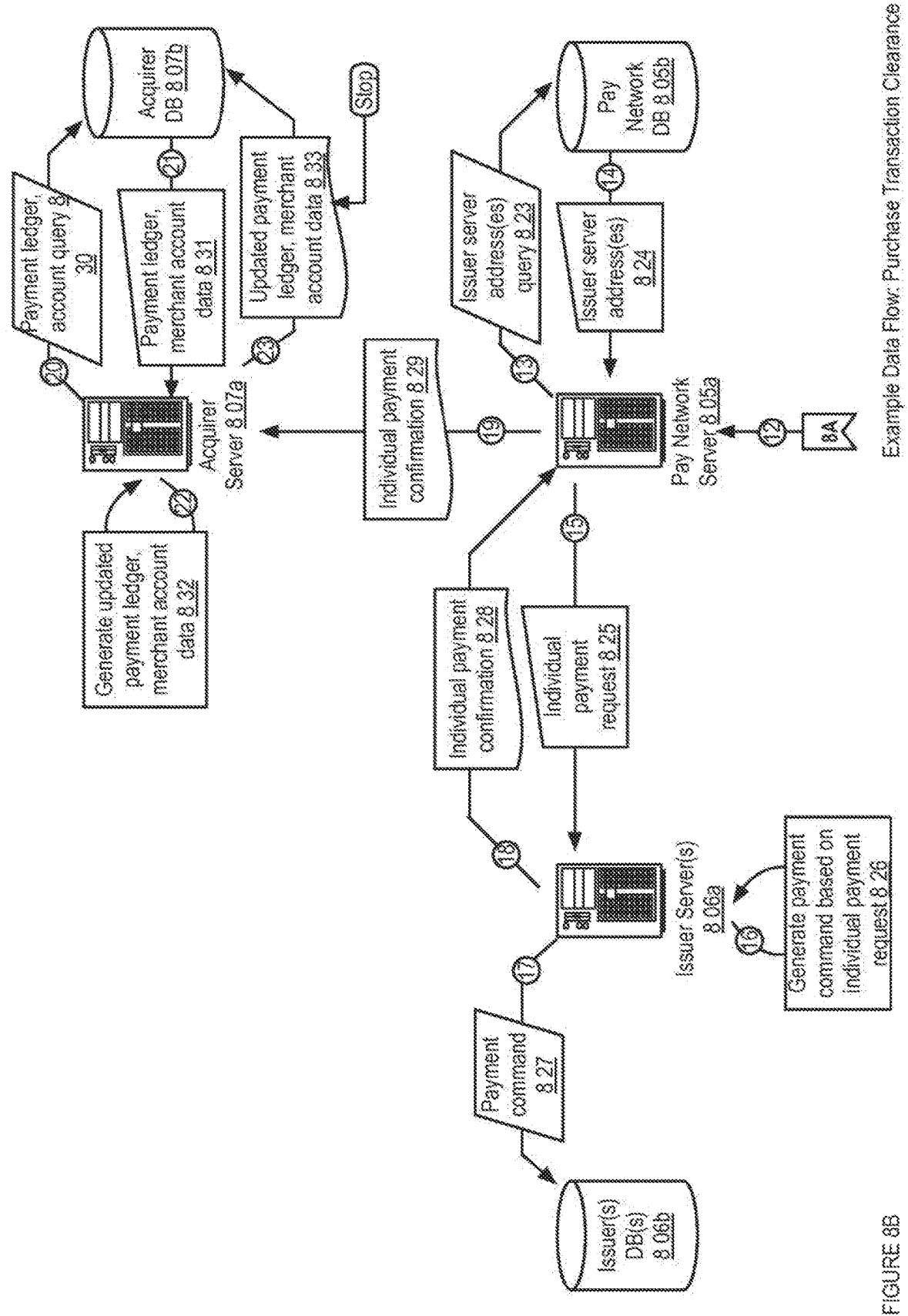

FIGS. 8A-B show data flow diagrams illustrating an example purchase transaction clearance procedure in some embodiments of the SAT. With reference to FIG. 8A, in some embodiments, a merchant server, e.g., 803a, may initiate clearance of a batch of authorized transactions. For example, the merchant server may generate a batch data request, e.g., 811, and provide the request, to a merchant database, e.g., 803b. For example, the merchant server may utilize PHP/SQL commands similar to the examples provided above to query a relational database. In response to the batch data request, the database may provide the requested batch data, e.g., 812. The server may generate a batch clearance request, e.g., 813, using the batch data obtained from the database, and provide, e.g., 814, the batch clearance request to an acquirer server, e.g., 807a. For example, the merchant server may provide a HTTP(S) POST message including XML-formatted batch data in the message body for the acquirer server. The acquirer server may generate, e.g., 815, a batch payment request using the obtained batch clearance request, and provide, e.g., 818, the batch payment request to the pay network server, e.g., 805a. The pay network server may parse the batch payment request, and extract the transaction data for each transaction stored in the batch payment request, e.g., 819. The pay network server may store the transaction data, e.g., 820, for each transaction in a database, e.g., pay network database 805b. In some embodiments, the pay network server may invoke a component to provide value-add analytics services based on analysis of the transactions of the merchant for whom the SAT is clearing purchase transactions. Thus, in some embodiments, the pay network server may provide analytics-based value-added services for the merchant and/or the merchant's users.

With reference to FIG. 8B, in some embodiments, for each extracted transaction, the pay network server may query, e.g., 8z3, a database e.g., pay network database 805b, for an address of an issuer server. For example, the pay network server may utilize PHP/SQL commands similar to the examples provided above. The pay network server may generate an individual payment request, e.g., 825, for each transaction for which it has extracted transaction data, and provide the individual payment request, e.g., 825, to the issuer server, e.g., 8o6a. For example, the pay network server may provide an individual payment request to the issuer server(s) as a HTTP(S) POST message including XML-formatted data. An example listing of an individual payment request 825, substantially in the form of a HTTP(S) POST message including XML-formatted data, is provided below:

```
POST /paymentrequest.php HTTP/1.1
Host: www.issuer.com
Content-Type: Application/XML
Content-Length: 788
<?XML version = "1.0" encoding = "UTF-8"?>
<pay_request>
    <request_ID>CNI4ICNW2</request_ID>
    <timestamp>2011-02-22 17:00:01</timestamp>
    <pay_amount>$34.78</pay_amount>
    <account_params>
        <account_name>John Q. Public</account_name>
        <account_type>credit</account_type>
        <account_num>123456789012345</account_num>
        <billing_address>123 Green St., Norman, OK 98765
        </billing_address>
        <phone>123-456-7809</phone>
        <sign>/jqp/</sign>
    </account_params>
    <merchant_params>
        <merchant_id>3FBCR4INC</merchant_id>
        <merchant_name>Books & Things, Inc.</merchant_name>
        <merchant_auth_key>1NNF484MCP59CHB27365
        </merchant_auth_key>
    </merchant_params>
    <purchase_summary>
        <num_products>1</num_products>
        <product>
            <product_summary>Book - XML for dummies
            </product_summary>
            <product_quantity>1</product_quantity?
        </product>
    </purchase_summary>
</pay_request>
```

In some embodiments, the issuer server may generate a payment command, e.g., 827. For example, the issuer server may issue a command to deduct funds from the user's account (or add a charge to the user's credit card account). The issuer server may issue a payment command, e.g., 827, to a database storing the user's account information, e.g., user profile database 8o6b. The issuer server may provide an individual payment confirmation, e.g., 828, to the pay network server, which may forward, e.g., 829, the funds transfer message to the acquirer server. An example listing of an individual payment confirmation 828, substantially in the form of a HTTP(S) POST message including XML-formatted data, is provided below:

```
POST /clearance.php HTTP/1.1
Host: www.acquirer.com
Content-Type: Application/XML
Content-Length: 206
<?XML version = "1.0" encoding = "UTF-8"?>
<deposit_ack>
    <request_ID>CNI4ICNW2</request_ID>
    <clear_flag>true</clear_flag>
    <timestamp>2011-02-22 17:00:02</timestamp>
    <deposit_amount>$34.78</deposit_amount>
</deposit_ack>
```

In some embodiment, the acquirer server may parse the individual payment confirmation, and correlate the transaction (e.g., using the request_ID field in the example above) to the merchant. The acquirer server may then transfer the funds specified in the funds transfer message to an account of the merchant. For example, the acquirer server may query, e.g. 830, an acquirer database 807b for payment ledger and/or merchant account data, e.g., 831. The acquirer server may utilize payment ledger and/or merchant account data from the acquirer database, along with the individual payment confirmation, to generate updated payment ledger and/or merchant account data, e.g., 832. The acquirer server may then store, e.g., 833, the updated payment ledger and/or merchant account data to the acquire database.

Figure 9A:
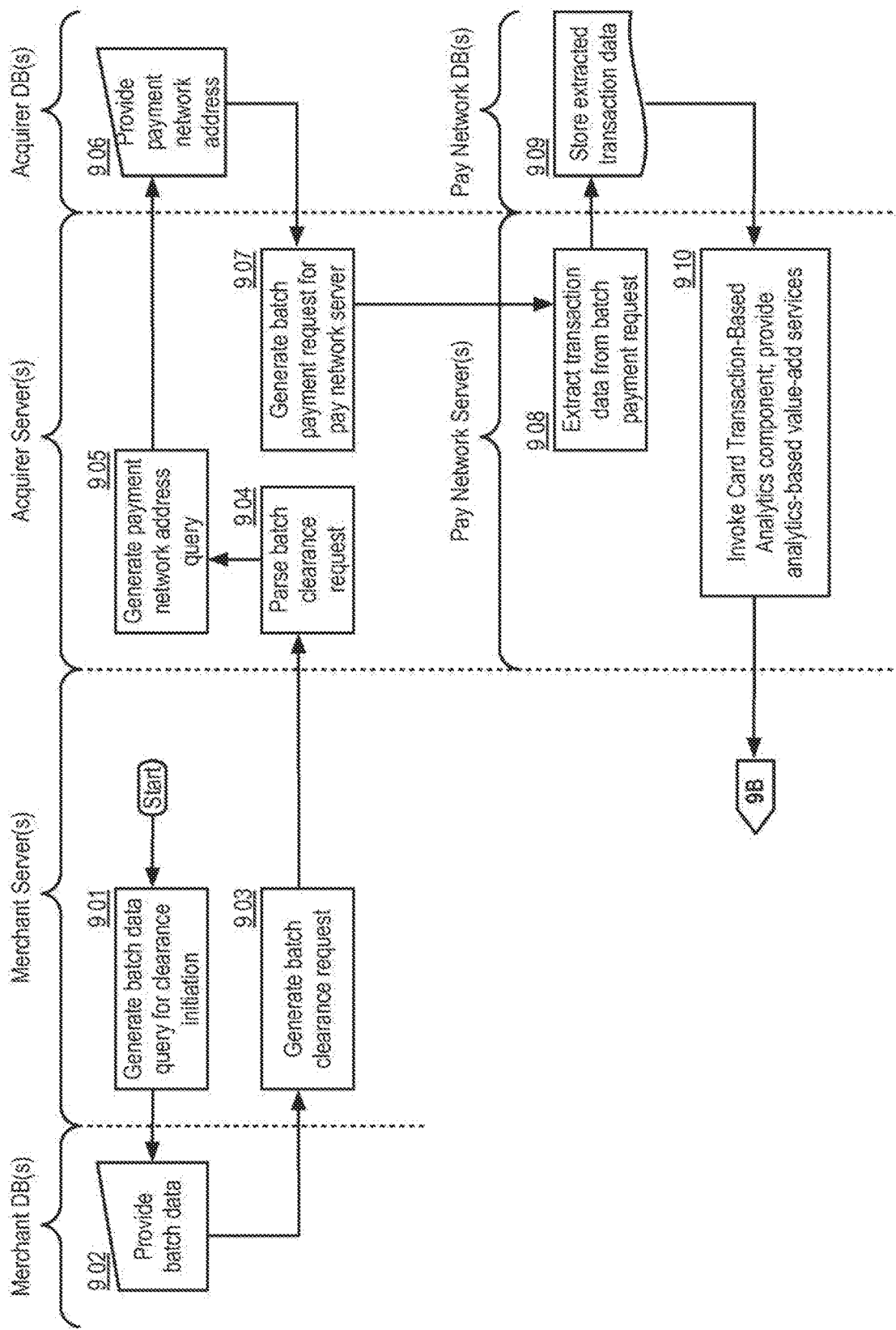
FIGS. 9A-B show logic flow diagrams illustrating example aspects of purchase transaction clearance in some embodiments of the SAT, e.g., a Purchase Transaction Clearance ("PTC") component goo.
Figure 9B:
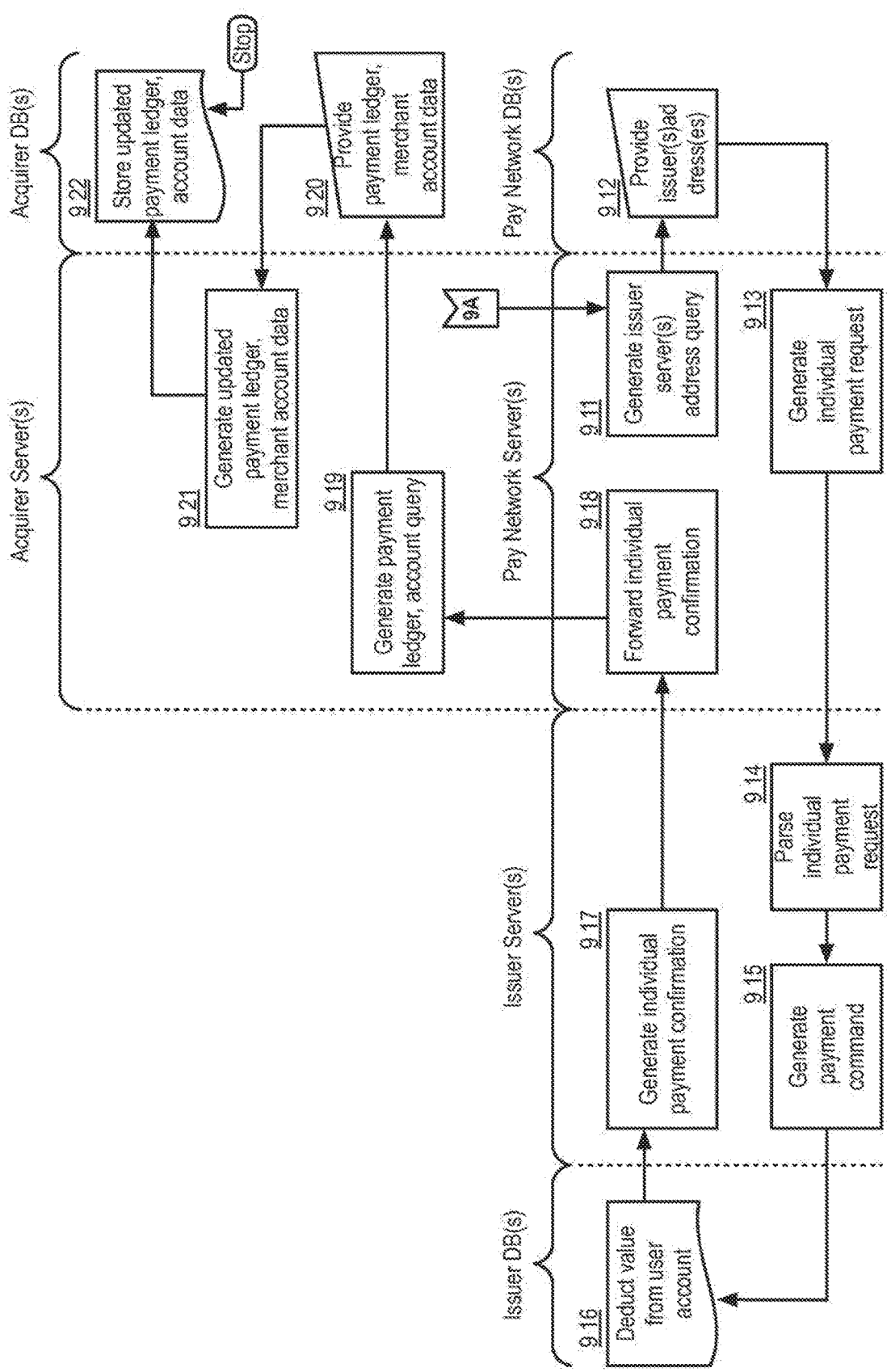

FIGS. 9A-B show logic flow diagrams illustrating example aspects of purchase transaction clearance in some embodiments of the SAT, e.g., a Purchase Transaction Clearance ("PTC") component goo. With reference to FIG. 9A, in some embodiments, a merchant server may initiate clearance of a batch of authorized transactions. For example, the merchant server may generate a batch data request, e.g., 901, and provide the request to a merchant database. In response to the batch data request, the database may provide the requested batch data, e.g., 902. The server may generate a batch clearance request, e.g., 903, using the batch data obtained from the database, and provide the batch clearance request to an acquirer server. The acquirer server may parse, e.g., 90o4, the obtained batch clearance request, and generate, e.g., 907, a batch payment request using the obtained batch clearance request to provide, the batch payment request to a pay network server. For example, the acquirer server may query, e.g., 905, an acquirer database for an address of a payment network server, and utilize the obtained address, e.g. 906, to forward the generated batch payment request to the pay network server.

The pay network server may parse the batch payment request obtained from the acquirer server, and extract the transaction data for each transaction stored in the batch payment request, e.g., 908. The pay network server may store the transaction data, e.g., 909, for each transaction in a pay network database. In some embodiments, the pay network server may invoke a component, e.g., 910, to provide analytics based on the transactions of the merchant for whom purchase transaction are being cleared.

With reference to FIG. 9B, in some embodiments, for each extracted transaction, the pay network server may query, e.g., 911, a pay network database for an address of an issuer server. The pay network server may generate an individual payment request, e.g., 913, for each transaction for which it has extracted transaction data, and provide the individual payment request to the issuer server. In some embodiments, the issuer server may parse the individual payment request, e.g., 914, and generate a payment command, e.g., 915, based on the parsed individual payment request. For example, the issuer server may issue a command to deduct funds from the user's account (or add a charge to the user's credit card account). The issuer server may issue a payment command, e.g., 915, to a database storing the user's account information, e.g., a user profile database. The issuer server may provide an individual payment confirmation, e.g., 917, to the pay network server, which may forward, e.g., 918, the individual payment confirmation to the acquirer server.

In some embodiments, the acquirer server may parse the individual payment confirmation, and correlate the transaction (e.g., using the request_ID field in the example above) to the merchant. The acquirer saver nay then transfer the funds specified in the funds transfer message to an account of the merchant. For example, the acquirer server may query, e.g. 919, an acquirer database for payment ledger and/or merchant account data, e.g., 920. The acquirer server may utilize payment ledger and/or merchant account data from the acquirer database, along with the individual payment confirmation, to generate updated payment ledger and/or merchant account data, e.g., 921. The acquirer server may then store, e.g., 922, the updated payment ledger and/or merchant account data to the acquire database.

Figure 10:
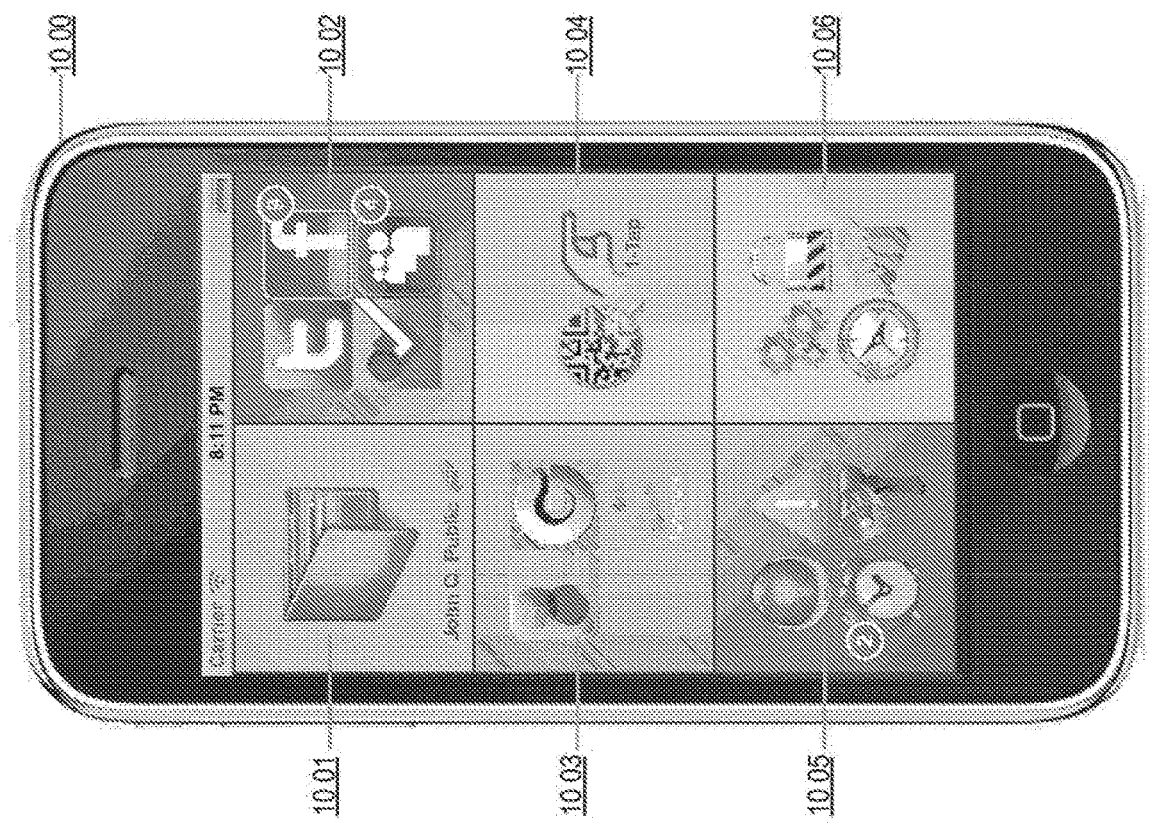
FIG. 10 shows a user interface diagram illustrating an overview of example features of virtual wallet applications in some embodiments of the SAT.

FIG. 10 shows a user interface diagram illustrating an overview of example features of virtual wallet applications in some embodiments of the SAT. FIG. 10 shows an illustration of various exemplary features of a virtual wallet mobile application 1000. Some of the features displayed include a wallet 1001, social integration via TWITTER, FACEBOOK, etc., offers and loyalty 1003, snap mobile purchase 1004, alerts 1005 and security, setting and analytics 1096. These features are explored in further detail below.

Figure 11A:
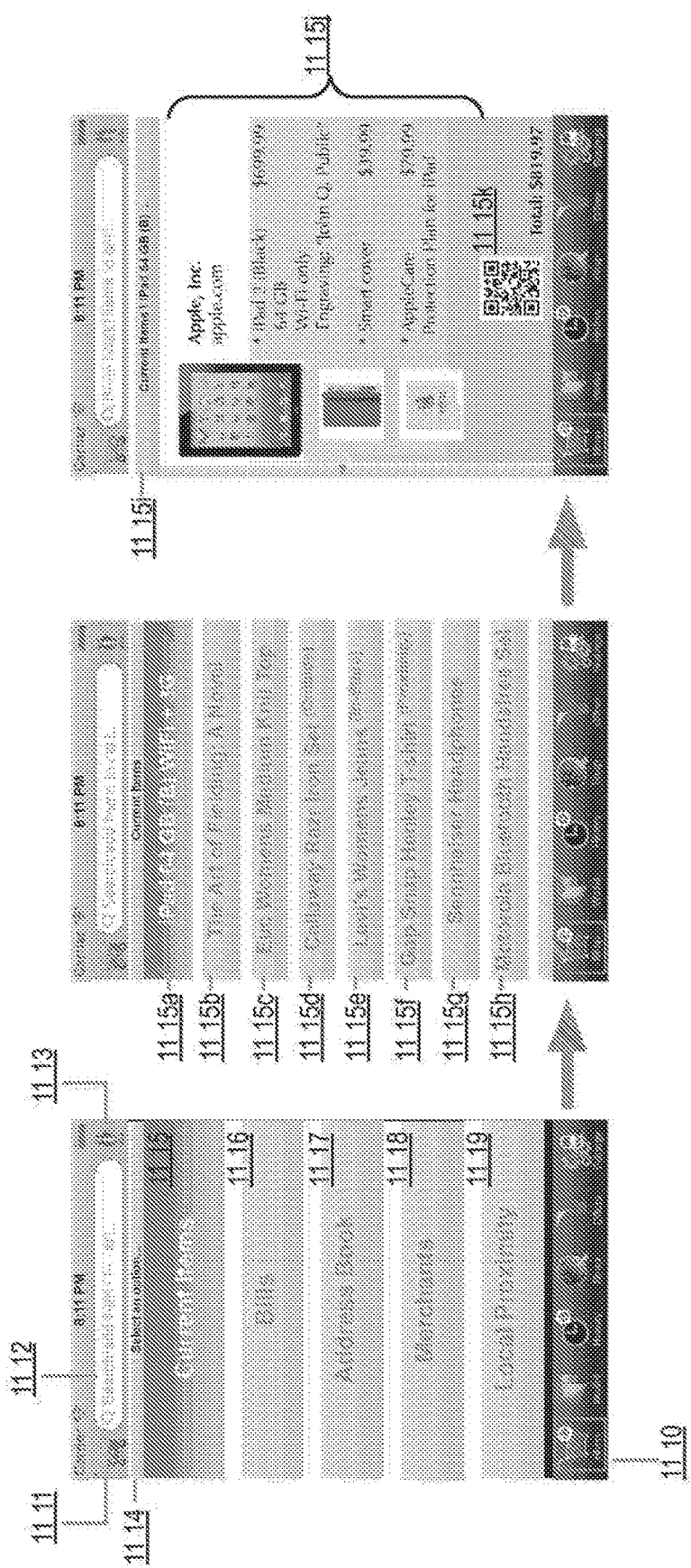

FIGS. 11A-G show user interface diagrams illustrating example features of virtual wallet applications in a shopping mode, in some embodiments of the SAT. With reference to FIG. 11A, some embodiments of the virtual wallet mobile app facilitate and greatly enhance the shopping experience of consumers. A variety of shopping modes, as shown in FIG. 11A, may be available for a consumer to peruse. In one implementation, for example, a user may launch the shopping mode by selecting the shop icon 1100 at the bottom of the user interface. A user may type in an item in the search field 1112 to search and/or add an item to a cart 1111. A user may also use a voice activated shopping mode by saying the name or description of an item to be searched and/or added to the cart into a microphone 1113. In a further implementation, a user may also select other shopping options 1114 such as current items 1115, bills 1116, address book 1117, merchants 1118 and local proximity 1119.

In one embodiment, for example, a user may select the option current items 1115, as shown in the left most user interface of FIG. 11A. When the current items 1115 option is selected, the middle user interface may be displayed. As shown, the middle user interface may provide a current list of items 1115a-h in a user's shopping cart 1111. A user may select an item, for example item 1115a, to view product description 115j of the selected item and/or other items from the same merchant. The price and total payable information may also be displayed, along with a QR code 1115k that captures the information necessary to effect a snap mobile purchase transaction.

Figure 11B:
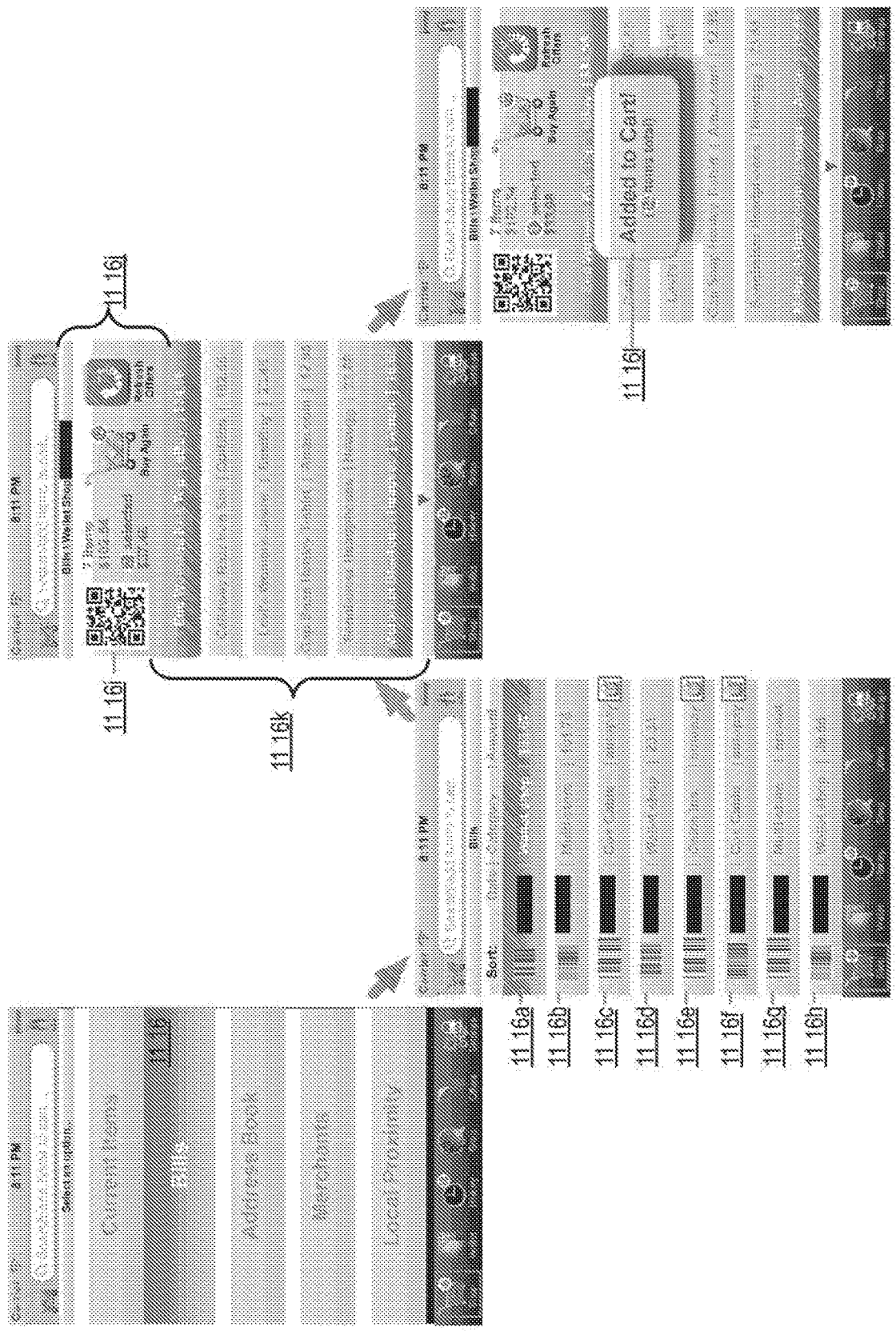

With reference to FIG. 11B, in another embodiment, a user may select the bills 1116 option. Upon selecting the bills 116 option, the user interface may display a list of bills and/or receipts 1116a-h from one or more merchants. Next to each of the bills, additional information such as date of visit, whether items from multiple stores are present, last bill payment date, auto-payment, number of items, and/or the like may be displayed. In one example, the wallet shop bill 1116a dated Jan. 20, 2011 may be selected. The wallet shop bill selection may display a user interface that provides a variety of information regarding the selected bill. For example, the user interface may display a list of items 1116k purchased, <<1116i>>, a total number of items and the corresponding value. For example, 7 items worth $102.54 were in the selected wallet shop bill. A user may now select any of the items and select buy again to add purchase the items. The user may also refresh offers 1116j to clear any invalid offers from last time and/or search for new offers that may be applicable for the current purchase. As shown in FIG. 11B, a user may select two items for repeat purchase. Upon addition, a message 1116l may be displayed to confirm the addition of the two items, which makes the total number of items in the cart 14.

Figure 11C:
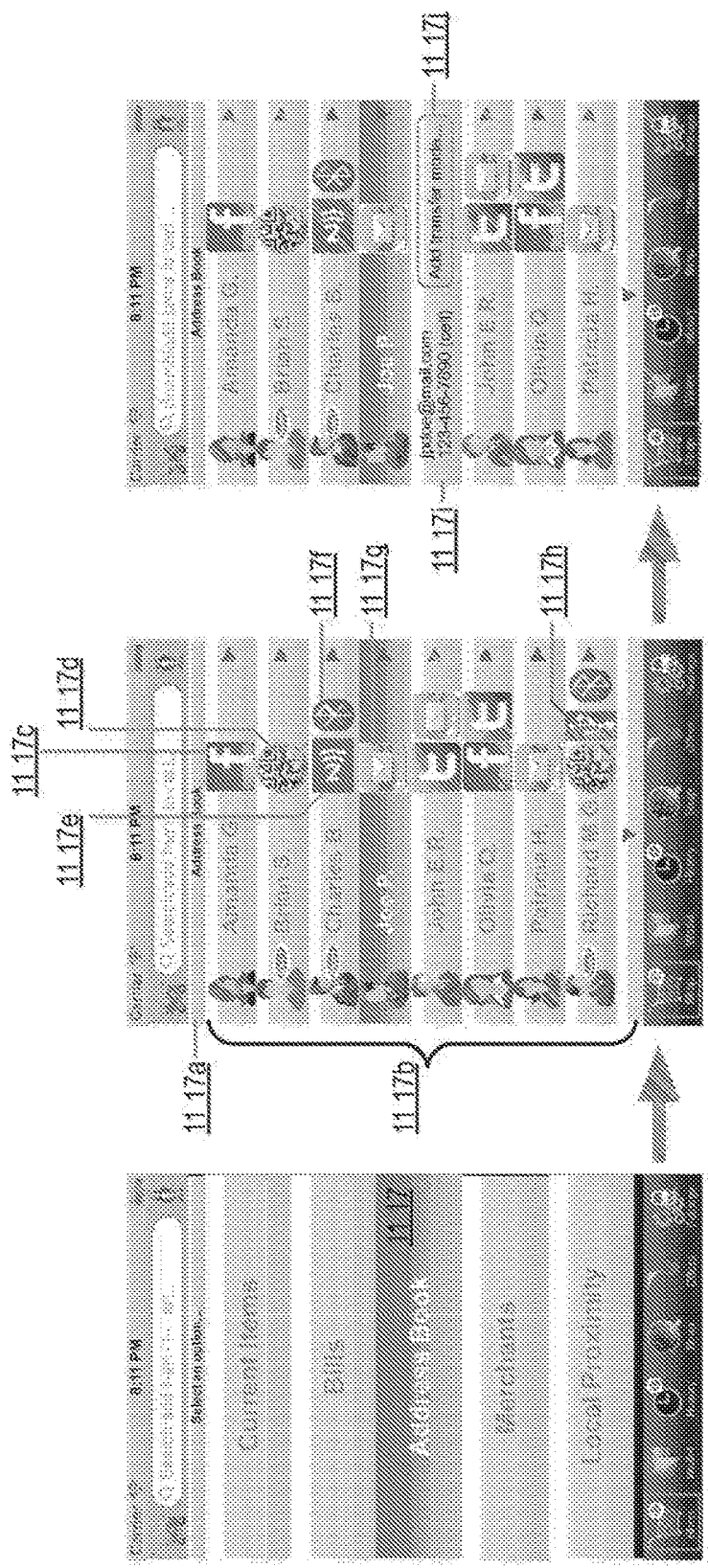

With reference to FIG. 11C in yet another embodiment a user may select the address book option 117 to view the address book 1117a which includes a list of contacts 1117b and make any money transfers or payments. In one embodiment, the address book may identify each contact using their names and available and/or preferred modes of payment. For example, a contact Amanda G. may be paid via social pay (e.g., via FACEBOOK) as indicated by the icon 1117c. In another example, money may be transferred to Brian S. via QR code as indicated by the QR code icon 1117d. In yet another example, Charles B. may accept payment via near field communication 1117e, Bluetooth 1117f and email 1117g. Payment may also be made via USB 1117h (e.g., by physically connecting two mobile devices) as well as other social channels such as TWITTER.

Figure 11D:
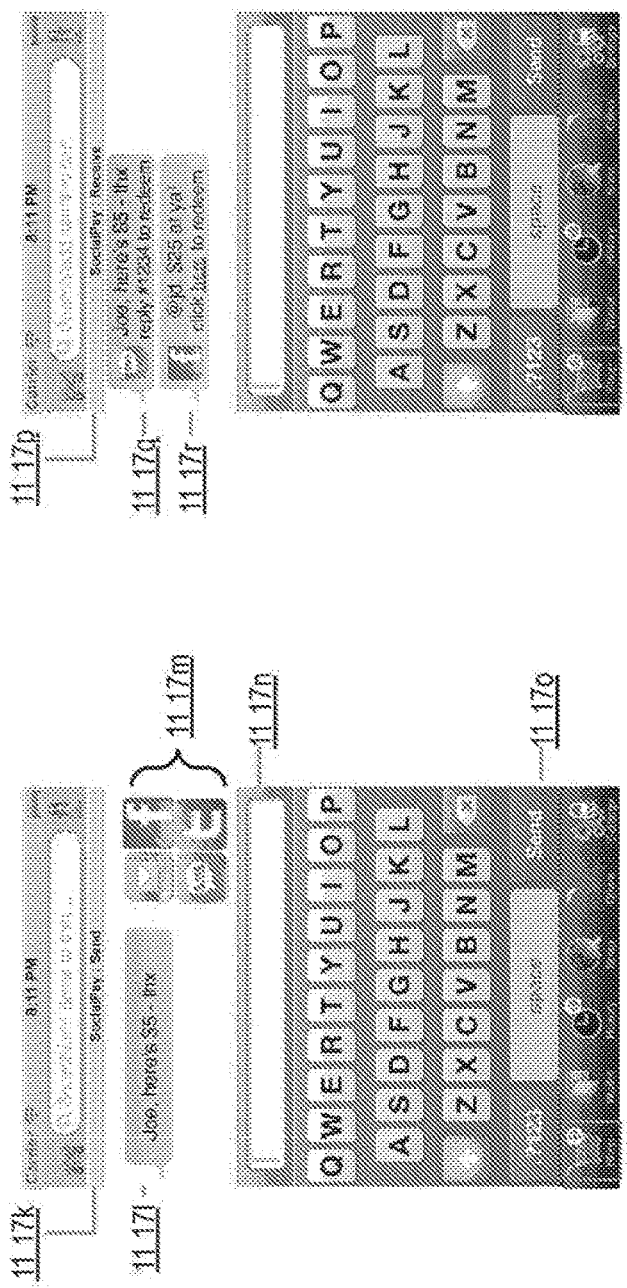

In one implementation, a user may select Joe P. for payment Joe P., as shown in the user interface, has an email icon 1117g next to his name indicating that Joe P. accepts payment via email. When his name is selected, the user interface may display his contact information such as email, phone, etc. If a user wishes to make a payment to Joe P. by a method other than email, the user may add another transfer mode 1117j to his contact information and make a payment transfer. With reference to FIG. 11D, the user may be provided with a screen 1117k where the user can enter an amount to send Joe, as well as add other text to provide Joe with context for the payment transaction 1117l. The user can choose modes (e.g., SMS, email, social networking) via which Joe may be contacted via graphical user interface elements, 1117m. As the user types, the text entered may be provided for review within a GUI element 1117n. When the user has completed entering in the necessary information, the user can press the send button 1117o to send the social message to Joe. If Joe also has a virtual wallet application, Joe may be able to review 1117p social pay message within the app, or directly at the website of the social network (e.g., for Twitter™, Facebook®, etc.). Messages may be aggregated from the various social networks and other sources (e.g., SMS, email). The method of redemption appropriate for each messaging mode may be indicated along with the social pay message. In the illustration in FIG. 11D, the SMS 1117q Joe received indicates that Joe can redeem the $5 obtained via SMS by replying to the SMS and entering the hash tag value '#1234'. In the same illustration, Joe has also received a message 117r via Facebook®, which includes a URL link that Joe can activate to initiate redemption of the $25 payment.

Figure 11E:
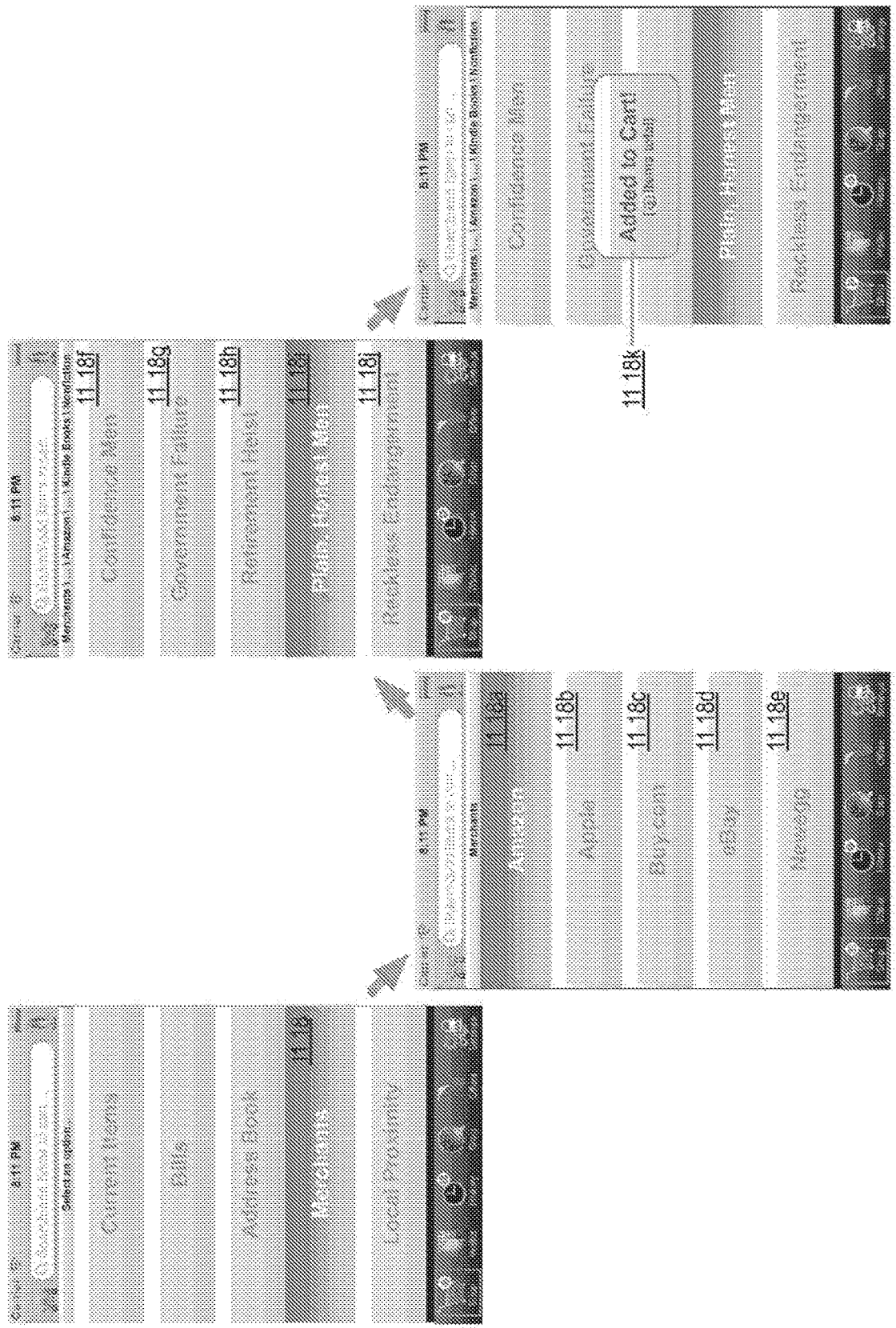

With reference to FIG. 11E, in some other embodiments, a user may select merchants 1118 from the list of options in the shopping mode to view a select list of merchants 1118a-e. In one implementation, the merchants in the list may be affiliated to the wallet, or have affinity relationship with the wallet. In another implementation, the merchants may include a list of merchants meeting a user-defined or other criteria. For example, the list may be one that is curated by the user, merchants where the user most frequently shops or spends more than an x amount of sum or shopped for three consecutive months, and/or the like. In one implementation, the user may further select one of the merchants, Amazon 1118*a* for example. The user may then navigate through the merchant's listings to find items of interest such as 1118*f-j*. Directly through the wallet and without visiting the merchant site from a separate page, the user may make a selection of an item 1118*j* from the catalog of Amazon 1118*a*. As shown in the right most user interface of FIG. 11D, the selected item may then be added to cart. The message 1118*k* indicates that the selected item has been added to the cart, and updated number of items in the cart is now 13.

Figure 11F:

With reference to FIG. 11F, in one embodiment, there may be a local proximity option 1119 which may be selected by a user to view a list of merchants that are geographically in close proximity to the user. For example, the list of merchants 1119*a-e* may be the merchants that are located close to the user. In one implementation, the mobile application may further identify when the user in a store based on the user's location. For example, position icon 1119*d* may be displayed next to a store (e.g., Walgreens) when the user is in close proximity to the store. In one implementation, the mobile application may refresh its location periodically in case the user moved away from the store (e.g., Walgreens). In a further implementation, the user may navigate the offerings of the selected Walgreens store through the mobile application. For example, the user may navigate, using the mobile application, to items 1119*f-j* available on aisle 5 of Walgreens. In one implementation, the user may select corn 1119*i* from his or her mobile application to add to cart 1119*k*.

Figure 12A:
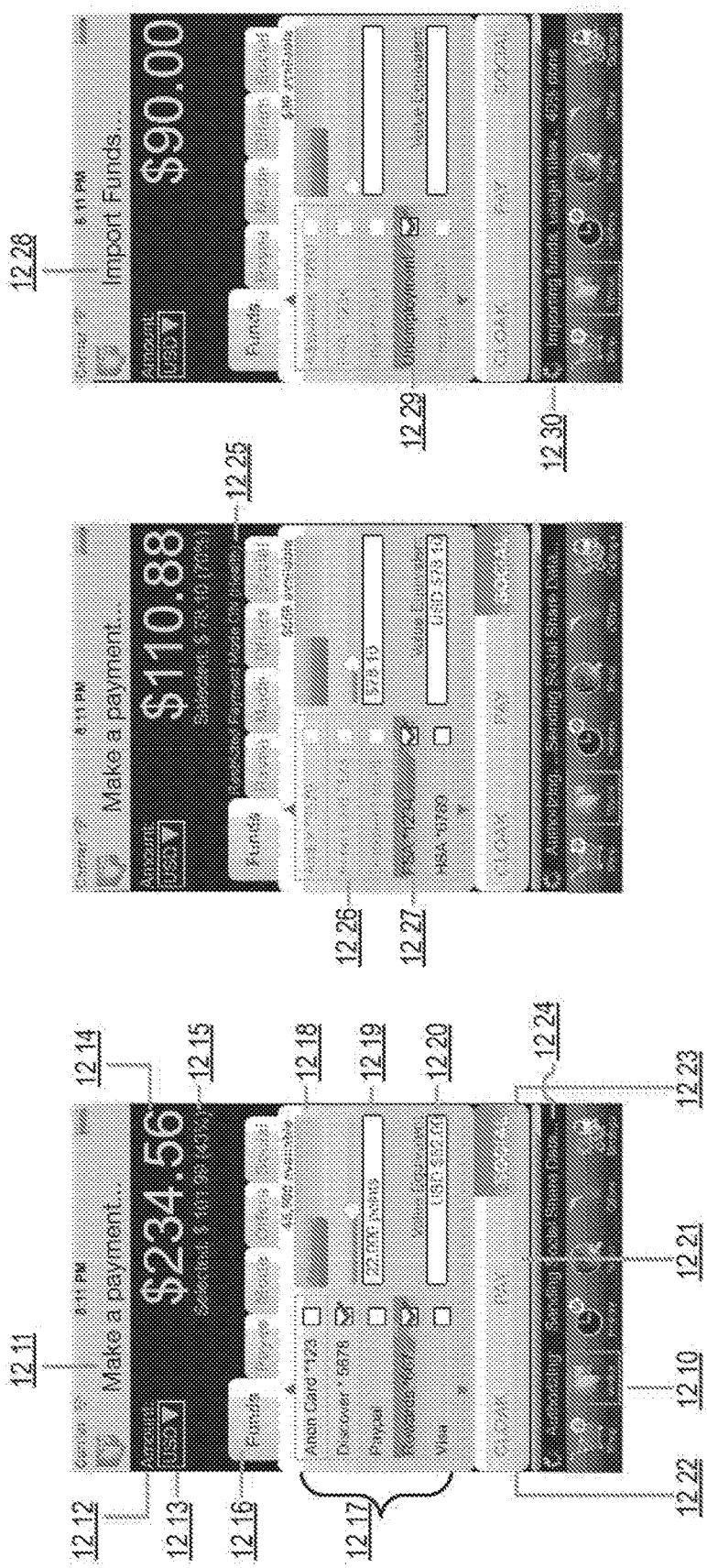
Figure 12B:
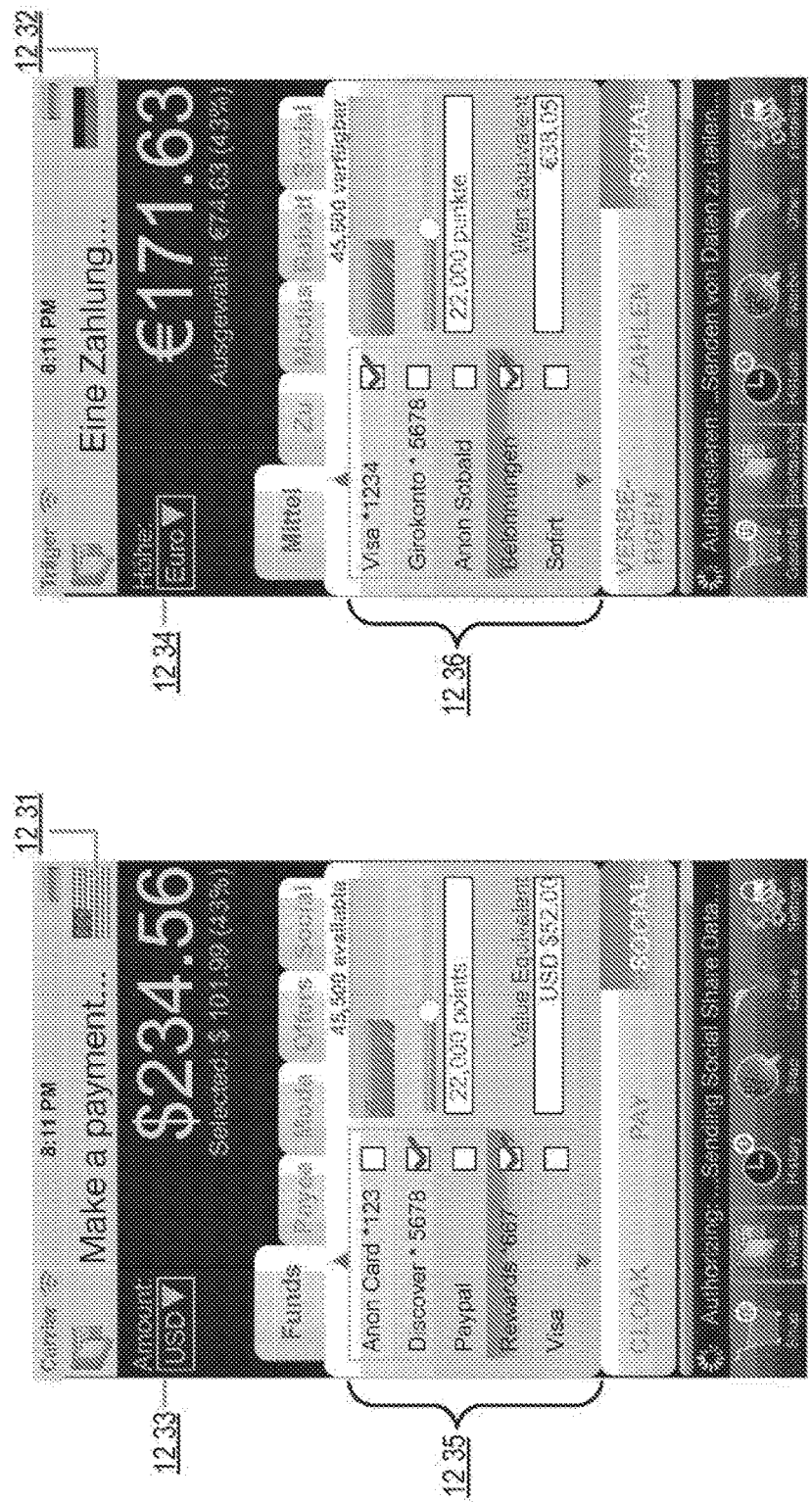

With reference to FIG. 11G, in another embodiment, the local proximity option 1119 may include a store map and a real time map features among others. For example, upon selecting the Walgreens store, the user may launch an aisle map 1119*l* which displays a map 1119*m* showing the organization of the store and the position of the user (indicated by a yellow circle). In one implementation, the user may easily configure the map to add one or more other users (e.g., user's kids) to share each other's location within the store. In another implementation, the user may have the option to launch a "store view" similar to street views in maps. The store view 1119*n* may display images/video of the user's surrounding. For example, if the user is about to enter aisle 5, the store view map may show the view of aisle 5. Further the user may manipulate the orientation of the map using the navigation tool 1119*o* to move the store view forwards, backwards, right, left as well clockwise and counterclockwise rotation FIGS. 12A-F show user interface diagrams illustrating example features of virtual wallet applications in a payment mode, in some embodiments of the SAT. With reference to FIG. 12A, in one embodiment, the wallet mobile application may provide a user with a number of options for paying for a transaction via the wallet mode 1210. In one implementation, an example user interface for making a payment is shown. The user interface may clearly identify the amount 1212 and the currency 1213 for the transaction. The amount may be the amount payable and the currency may include real currencies such as dollars and euros, as well as virtual currencies such as reward points. The amount of the transaction 1214 may also be prominently displayed on the user interface. The user may select the funds tab 1216 to select one or more forms of payment 1217, which may include various credit, debit, gift, rewards and/or prepaid cards. The user may also have the option of paying, wholly or in part, with reward points. For example, the graphical indicator 1218 on the user interface shows the number of points available, the graphical indicator 1219 shows the number of points to be used towards the amount due 234.56 and the equivalent 1220 of the number of points in a selected currency (USD, for example).

In one implementation, the user may combine funds from multiple sources to pay for the transaction. The amount 1215 displayed on the user interface may provide an indication of the amount of total funds covered so far by the selected forms of payment (e.g., Discover card and rewards points). The user may choose another form of payment or adjust the amount to be debited from one or more forms of payment until the amount 1215 matches the amount payable 1214. Once the amounts to be debited from one or more forms of payment are finalized by the user, payment authorization may begin.

In one implementation, the user may select a secure authorization of the transaction by selecting the cloak button 1222 to effectively cloak or anonymize some (e.g., preconfigured) or all identifying information such that when the user selects pay button 1221, the transaction authorization is conducted in a secure and anonymous manner. In another implementation, the user may select the pay button 1221 which may use standard authorization techniques for transaction processing. In yet another implementation, when the user selects the social button 1223, a message regarding the transaction may be communicated to one of more social networks (set up by the user) which may post or announce the purchase transaction in a social forum such as a wall post or a tweet. In one implementation, the user may select a social payment processing option 1223. The indicator 1224 may show the authorizing and sending social share data in progress.

In another implementation, a restricted payment mode 1225 may be activated for certain purchase activities such as prescription purchases. The mode may be activated in accordance with rules defined by issuers, insurers, merchants, payment processor and/or other entities to facilitate processing of specialized goods and service. In this mode, the user may scroll down the list of forms of payments 1226 under the funds tab to select specialized accounts such as a flexible spending account (FSA) 1227, health savings account (HAS), and/or the like and amounts to be debited to the selected accounts. In one implementation, such restricted payment mode 1225 processing may disable social sharing of purchase information.

In one embodiment, the wallet mobile application may facilitate importing of funds via the import funds user interface 1228. For example, a user who is unemployed may obtain unemployment benefit fund 1229 via the wallet mobile application. In one implementation, the entity providing the funds may also configure rules for using the fund as shown by the processing indicator message 1230. The wallet may read and apply the rules prior, and may reject any purchases with the unemployment funds that fail to meet the criteria set by the rules. Example criteria may include, for example, merchant category code (MCC), time of transaction, location of transaction, and/or the like. As an example, a transaction with a grocery merchant having MCC 5411 may be approved, while a transaction with a bar merchant having an MCC 5813 may be refused.

With reference to FIG. 12I, in one embodiment, the wallet mobile application may facilitate dynamic payment optimization based on factors such as user location, preferences and currency value preferences among others. For example, when a user is in the United States, the country indicator 1231 may display a flag of the United States and may set the currency 1233 to the United States. In a further implementation, the wallet mobile application may automatically rearrange the order in which the forms of payments 1235 are listed to reflect the popularity or acceptability of various forms of payment. In one implementation, the arrangement may reflect the user's preference, which may not be changed by the wallet mobile application.

Similarly, when a German user operates a wallet in Germany, the mobile wallet application user interface may be dynamically updated to reflect the country of operation 1232 and the currency 1234. In a further implementation, the wallet r application may rearrange the order in which different forms of payment 1236 are listed based on their acceptance level in that country. Of course, the order of these forms of payments may be modified by the user to suit his or her own preferences.

With reference to FIG. 12C, in one embodiment, the payee tab 1237 in the wallet mobile application user interface may facilitate user selection of one or more payees receiving the funds selected in the funds tab. In one implementation, the user interface may show a list of all payees 1238 with whom the user has previously transacted or available to transact. The user may then select one or more payees. The payees 1238 may include larger merchants such as Amazon.com Inc., and individuals such as Jane P. Doe. Next to each payee name, a list of accepted payment modes for the payee may be displayed. In one implementation, the user may select the payee Jane P. Doe 1239 for receiving payment. Upon selection, the user interface may display additional identifying information relating to the payee.

Figure 12D:
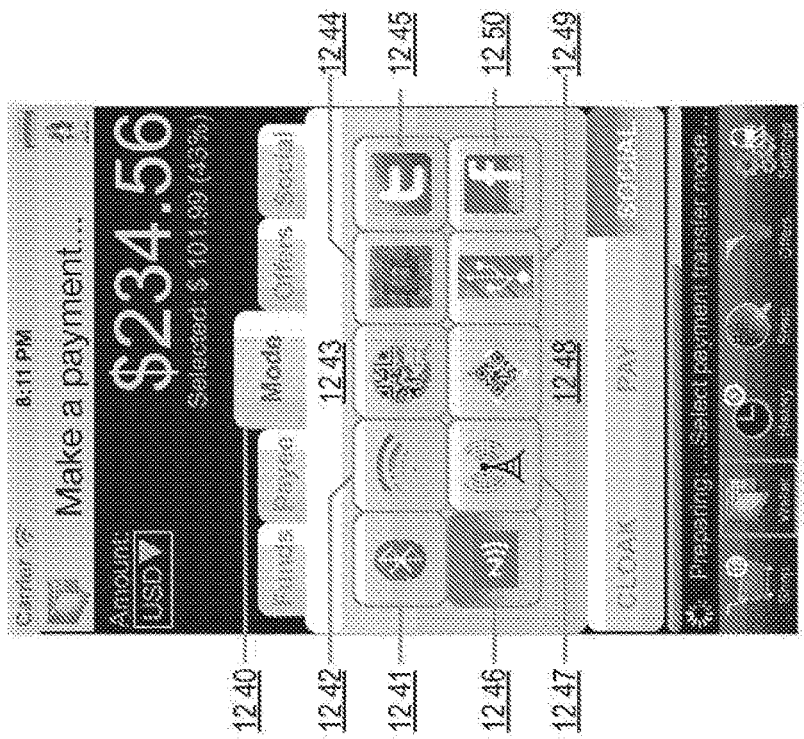

With reference to FIG. 12D, in one embodiment, the mode tab 1240 may facilitate selection of a payment mode accepted by the payee. A number of payment n modes may be available for selection. Example modes include, blue tooth 1241, wireless 1242, snap mobile by user-obtained QR code 1243, secure chip 1244, TWITTER 1245, near-field communication (NFC) 1246, cellular 1247, snap mobile by user-provided QR code 1248, USB 1249 and FACEBOOK 1250, among others. In one implementation, only the payment modes that are accepted by the payee may be selectable by the user. Other non-accepted payment modes may be disabled.

Figure 12E:
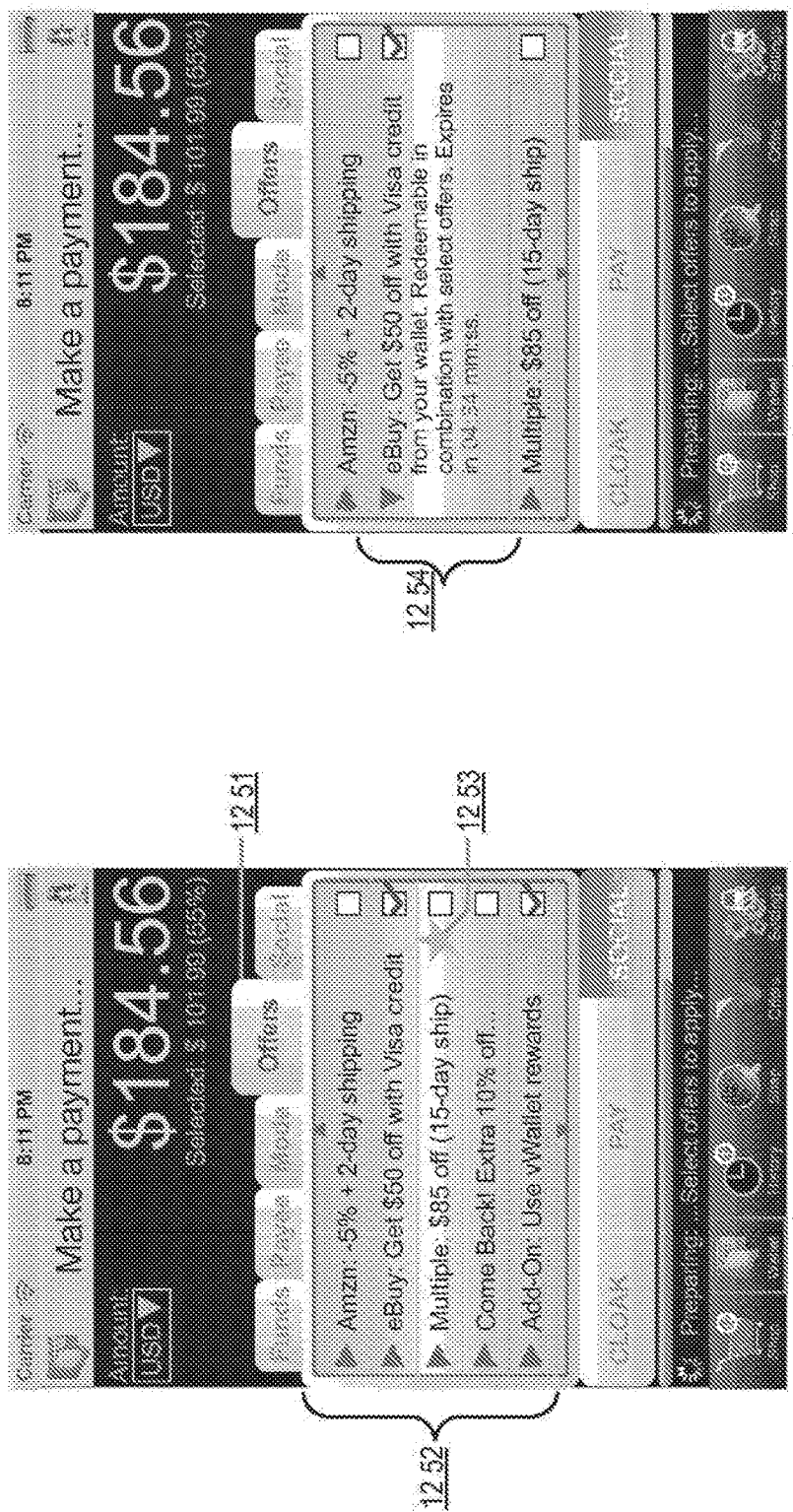

With reference to FIG. 12E, in one embodiment, the offers tab 1251 may provide real-time offers that are relevant to items in a user's cart for selection by the user. The user may select one or more offers from the list of applicable offers 1252 for redemption. In one implementation, some offers may be combined, while others may not. When the user selects an offer that may not be combined with another offer, the unselected offers may be disabled. In a further implementation, offers that are recommended by the wallet application's recommendation engine may be identified by an indicator, such as the one shown by 1253. In a further implementation, the user may read the details of the offer by expanding the offer row as shown by 1254 in the user interface.

Figure 12F:
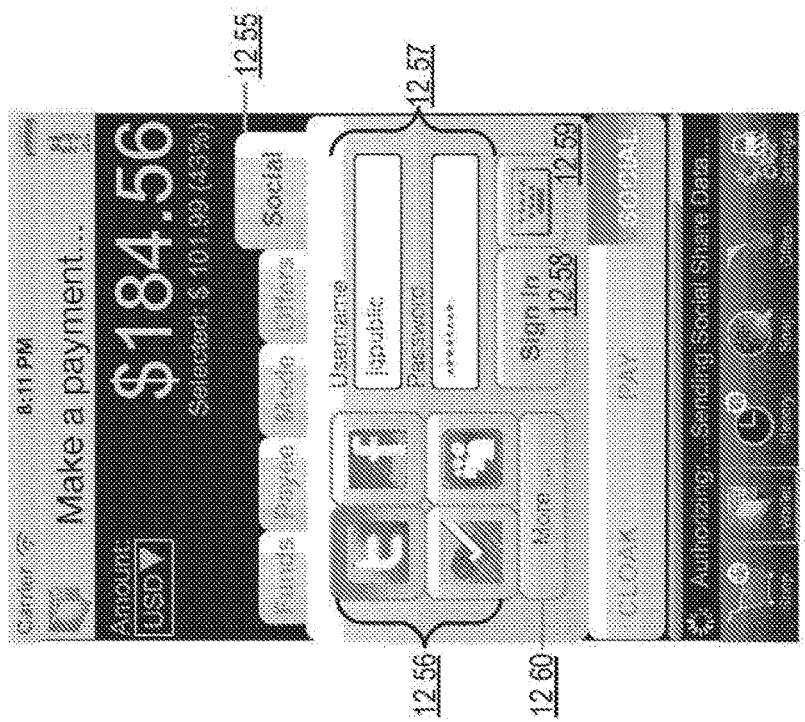

With reference to FIG. 12F, in one embodiment, the social tab 1255 may facilitate integration of the wallet application with social channels 1256. In one implementation, a user may select one or more social channels 1256 and may sign in to the selected social channel from the wallet application by providing to the wallet application the social channel user name and password 1257 and signing in 1258. The user may then use the social button 1259 to send or receive money through the integrated social channels. In a further implementation, the user may send social share data such as purchase information or links through integrated social channels. In another embodiment, the user supplied login credentials may allow SAT to engage in interception parsing.

Figure 13:
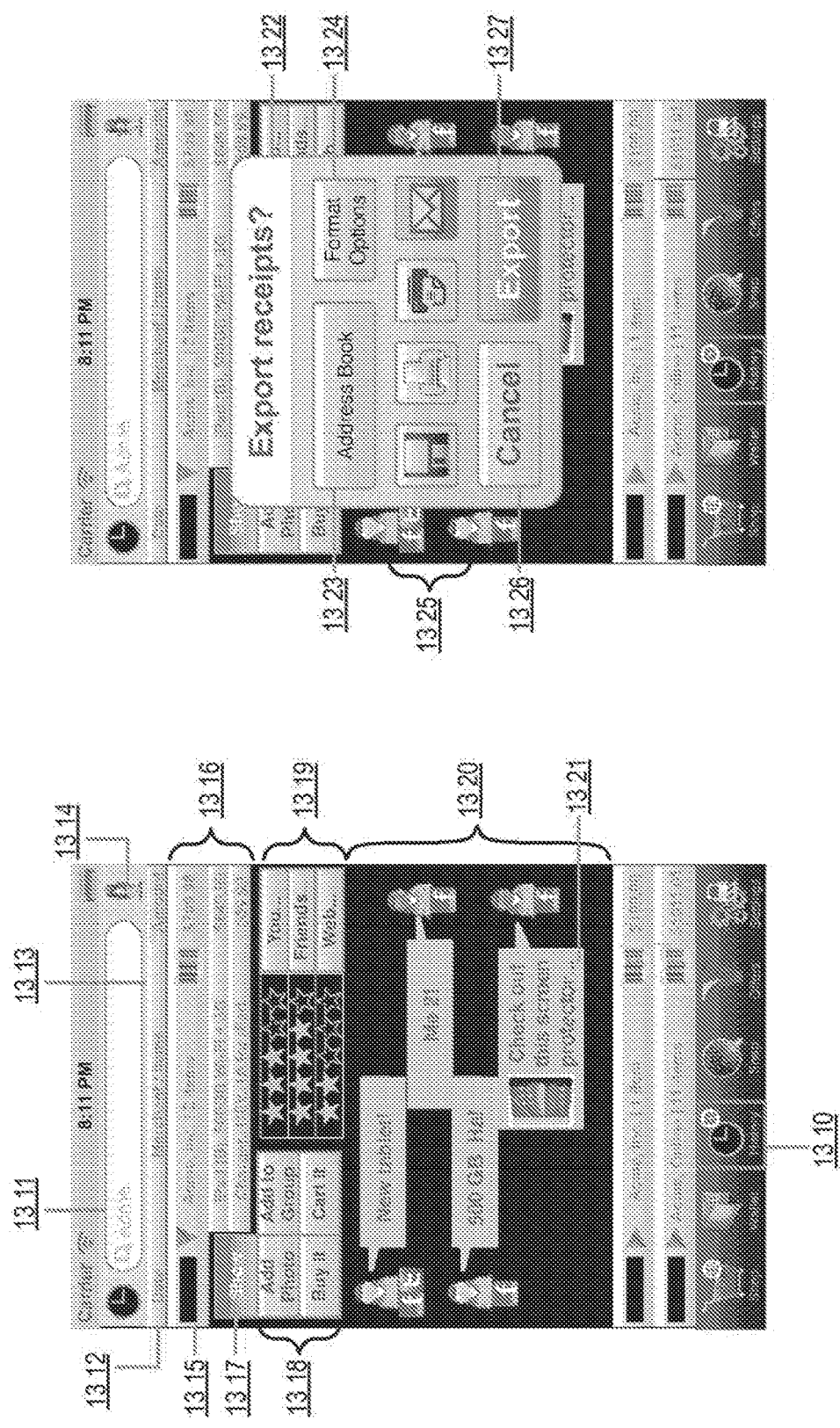
FIG. 13 shows a user interface diagram illustrating example features of virtual wallet applications, in a history mode, in some embodiments of the SAT.

FIG. 13 shows a user interface diagram illustrating example features of virtual wallet applications, in a history mode, in some embodiments of the SAT. In one embodiment, a user may select the history mode 1310 to view a history of prior purchases and perform various actions on those prior purchases. For example, a user may enter a merchant identifying information such as name, product, MCC, and/or the like in the search bar 1311. In another implementation, the user may use voice activated search feature by clicking on the microphone icon 1314. The wallet application may query the storage areas in the mobile device or elsewhere (e.g., one or more databases and/or tables remote from the mobile device) for transactions matching the search keywords. The user interface may then display the results of the query such as transaction 1315. The user interface may also identify the date 1312 of the transaction, the merchants and items 1313 relating to the transaction, a barcode of the receipt confirming that a transaction was made, the amount of the transaction and any other relevant information.

In one implementation, the user may select a transaction, for example transaction 1315, to view the details of the transaction. For example, the user may view the details of the items associated with the transaction and the amounts 1316 of each item. In a further implementation, the user may select the show option 1317 to view actions 1318 that the user may take in regards to the transaction or the items in the transaction. For example, the user may add a photo to the transaction (e.g., a picture of the user and the iPad the user bought). In a further implementation, if the user previously shared the purchase via social channels, a pot including the photo may be generated and sent to the social channels for publishing. In one implementation, any sharing may be optional, and the user, who did not share the purchase via social channels, may still share the photo through one or more social channels of his or her choice directly from the history mode of the wallet application. In another implementation, the user may add the transaction to a group such as company expense, home expense, travel expense or other categories set up by the user. Such grouping may facilitate year-end accounting of expenses, submission of work expense reports, submission for value added tax (VAT) refunds, personal expenses, and/or the like. In yet another implementation, the user may buy one or more items purchased in the transaction. The user may then execute a transaction without going to the merchant catalog or site to find the items. In a further implementation, the user may also cart one or more items in the transaction for later purchase.

The history mode, in another embodiment, may offer facilities for obtaining and displaying ratings 1319 of the items in the transaction. The source of the ratings may be the user, the user's friends (e.g., from social channels, contacts, etc.), reviews aggregated from the web, and/or the like. The user interface in some implementations may also allow the user to post messages to other users of social channels (e.g., TWITTER or FACEBOOK). For example, the display area 1320 shows FACEBOOK message exchanges between two users. In one implementation, a user may share a link via a message 1321. Selection of such a message having embedded link to a product may allow the user to view a description of the product and/or purchase the product directly from the history mode.

In one embodiment, the history mode may also include facilities for exporting receipts. The export receipts pop up 1322 may provide a number of options for exporting the receipts of transactions in the history. For example, a user may use one or more of the options 1325, which include save (to local mobile memory, to server, to a cloud account, and/or the like), print to a printer, fax, email, and/or the like. The user may utilize his or her address book 1323 to look up email or fax number for exporting. The user may also specify format options 1324 for exporting receipts. Example format options may include, without limitation, text files (.doc, .txt, .rtf, iif, etc.), spreadsheet (.csv, .xls, etc.), image files (.jpg, .tff, .png, etc.), portable document format (.pdf), postscript (.ps), and/or the like. The user may then click or tap the export button 1327 to initiate export of receipts.

Figure 14A:
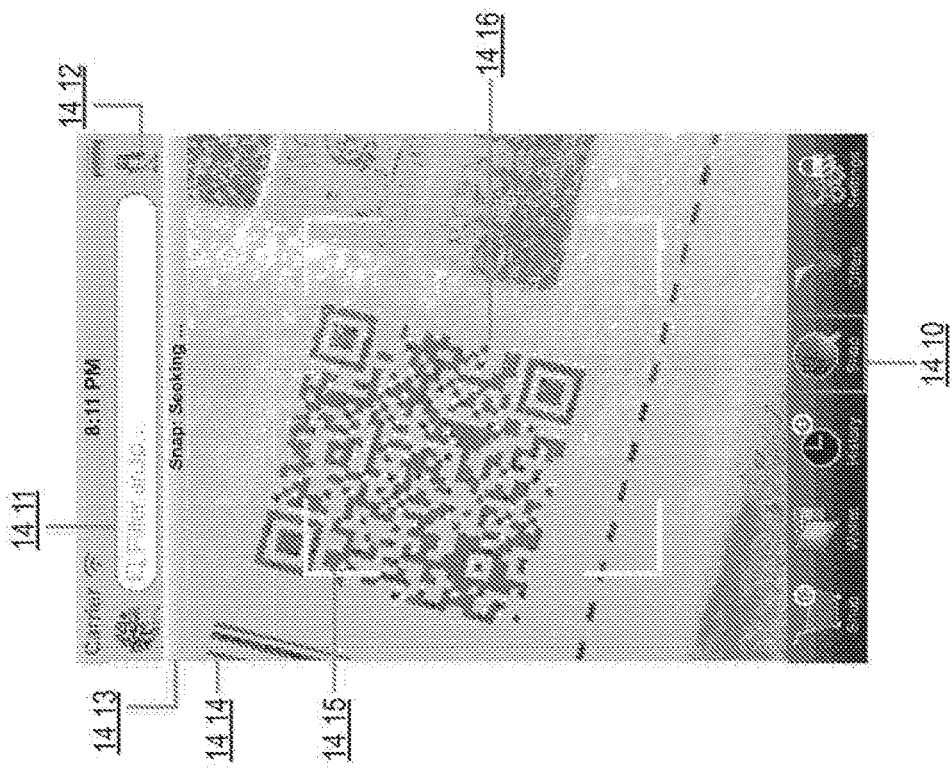
FIGS. 14A-E show user interface diagrams illustrating example features of virtual wallet applications in a snap mode, in some embodiments of the SAT.

FIGS. 14A-E show user interface diagrams illustrating example features of virtual wallet applications in a snap mode, in some embodiments of the SAT. With reference to FIG. 14A, in one embodiment, a user may select the snap mode to access its snap features. The snap mode may handle any machine-readable representation of data. Examples of such data may include linear and 2D bar codes such as UPC code and QR codes. These codes may be found on receipts, product packaging, and/or the like. The snap mode may also process and handle pictures of receipts, products, offers, credit cards or other payment devices, and/or the like. An example user interface in snap mode is shown in FIG. 14A. A user may use his or her mobile phone to take a picture of a QR code 1415 and/or a barcode 1414. In one implementation, the bar 1413 and snap frame 1415 may assist the user in snapping codes properly. For example, the snap frame 1415, as shown, does not capture the entirety of the code 1416. As such, the code captured in this view may not be resolvable as information: in the code may be incomplete. This is indicated by the message on the bar 1413 that indicates that the snap mode is still seeking the code. When the code 1416 is completely framed by the snap frame 1415, the bar message may be updated to, for example, "snap found." Upon finding the code, in one implementation, the user may initiate code capture using the mobile device camera. In another implementation, the snap mode may automatically snap the code using the mobile device camera.

Figure 14B:
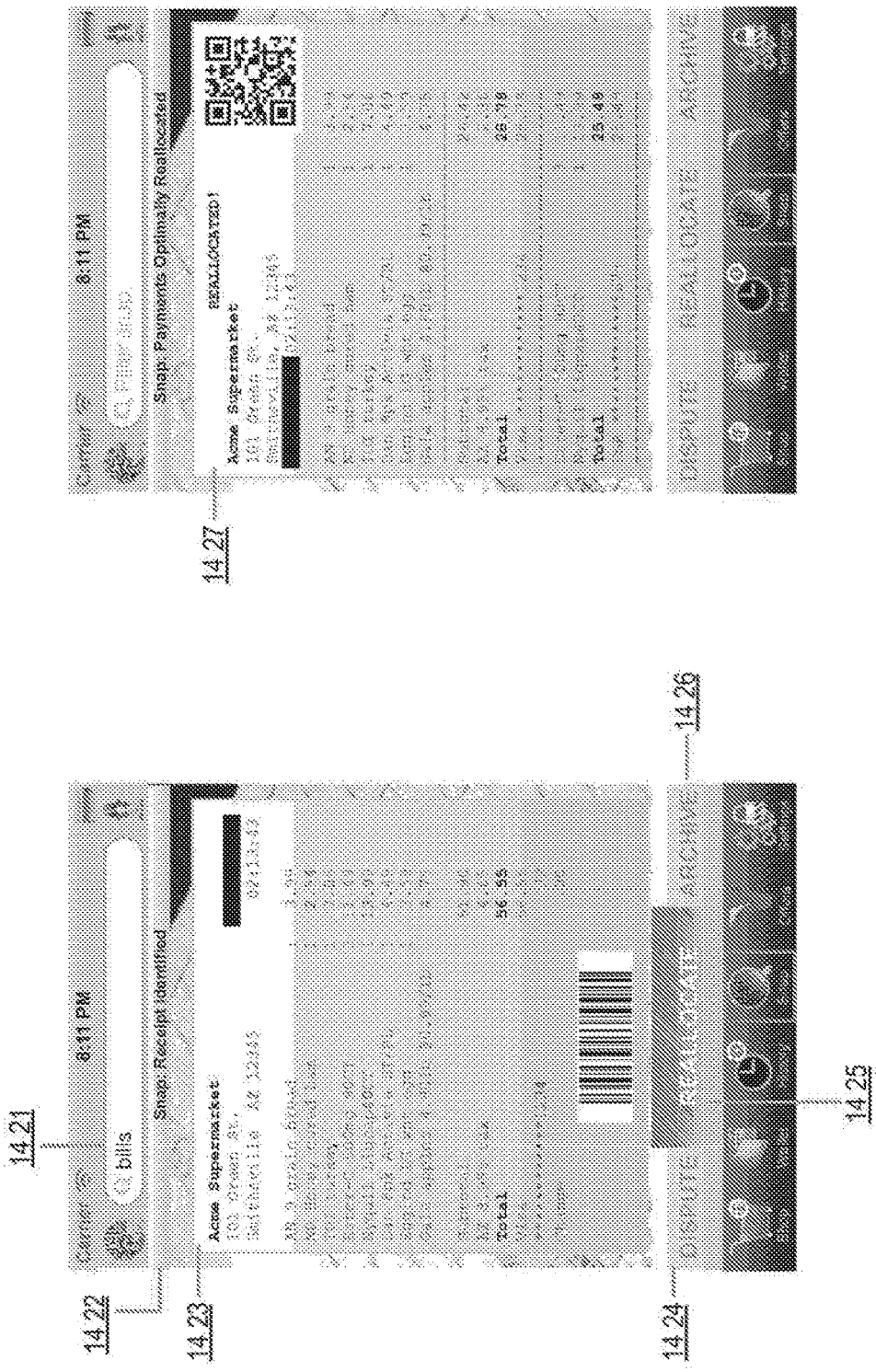

With reference to FIG. 14B, in one embodiment, the snap mode may facilitate payment reallocation post transaction. For example, a user may buy grocery and prescription items from a retailer Acme Supermarket. The user may, inadvertently or for ease of checkout for example, use his or her Visa card to pay for both grocery and prescription items. However, the user may have an FSA account that could be used to pay for prescription items, and which would provide the user tax benefits. In such a situation, the user may use the snap mode to initiate transaction reallocation.

As shown, the user may enter a search term (e.g., bills) in the search bar 2121. The user may then identify in the tab 1422 the receipt 1423 the user wants to reallocate. Alternatively, the user may directly snap a picture of a barcode on a receipt, and the snap mode may generate and display a receipt 1423 using information from the barcode. The user may now reallocate 1425. In some implementations, the user may also dispute the transaction 1424 or archive the receipt 1426.

In one implementation, when the reallocate button 1425 is selected, the wallet application may perform optical character recognition (OCR) of the receipt. Each of the items in the receipt may then be examined to identify one or more items which could be charged to which payment device or account for tax or other benefits such as cash back, reward points, etc. In this example, there is a tax benefit if the prescription medication charged to the user's Visa card is charged to the user's FSA. The wallet application may then perform the reallocation as the back end. The reallocation process may include the wallet contacting the payment processor to credit the amount of the prescription medication to the Visa card and debit the same amount to the user's FSA account. In an alternate implementation, the payment processor (e.g., Visa or MasterCard) may obtain and OCR the receipt, identify items and payment accounts for reallocation and perform the reallocation. In one implementation, the wallet application may request the user to confirm reallocation of charges for the selected items to another payment account. The receipt 1427 may be generated after the completion of the reallocation process. As discussed, the receipt shows that some charges have been moved from the Visa account to the FSA.

Figure 14C:
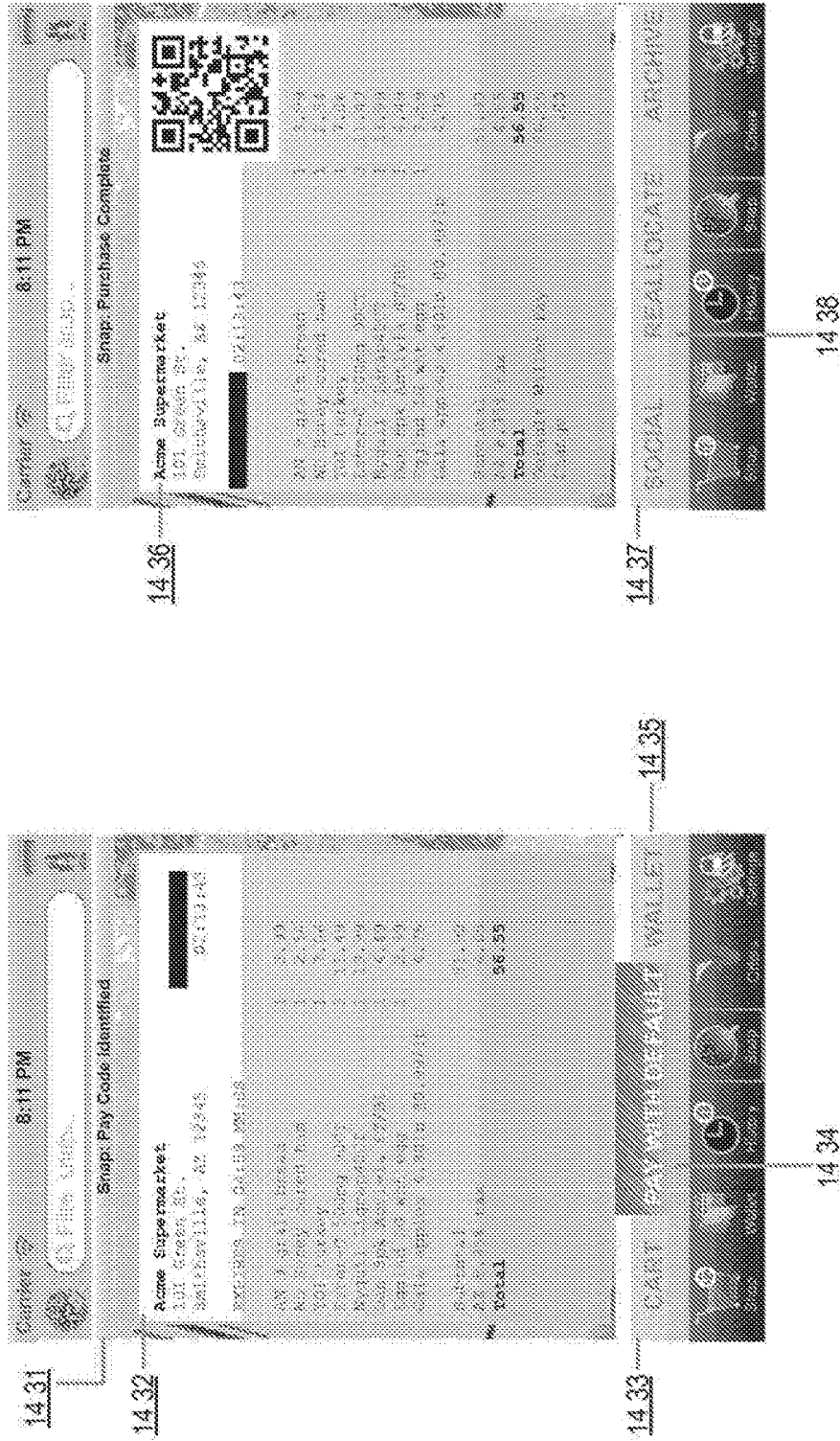

With reference to FIG. 14C, in one embodiment, the snap mode may facilitate payment via pay code such as barcodes or QR codes. For example, a user may snap a QR code of a transaction that is not yet complete. The QR code may be displayed at a merchant POS terminal, a web site, or a web application and may be encoded with information identifying items for purchase, merchant details and other relevant information. When the user snaps such as a QR code, the snap mode may decode the information in the QR code and may use the decoded information to generate a receipt 1432. Once the QR code is identified, the navigation bar 1431 may indicate that the pay code is identified. The user may now have an option to add to cart 1433, pay with a default payment account 1434 or pay with wallet 1435.

In one implementation, the user may decide to pay with default 1434. The wallet application may then use the user's default method of payment, in this example the wallet, to complete the purchase transaction. Upon completion of the transaction, a receipt may be automatically generated for proof of purchase. The user interface may also be updated to provide other options for handling a completed transaction. Example options include social 1437 to share purchase information with others, reallocate 1438 as discussed with regard to FIG. 14B, and archive 1439 to store the receipt.

Figure 14D:
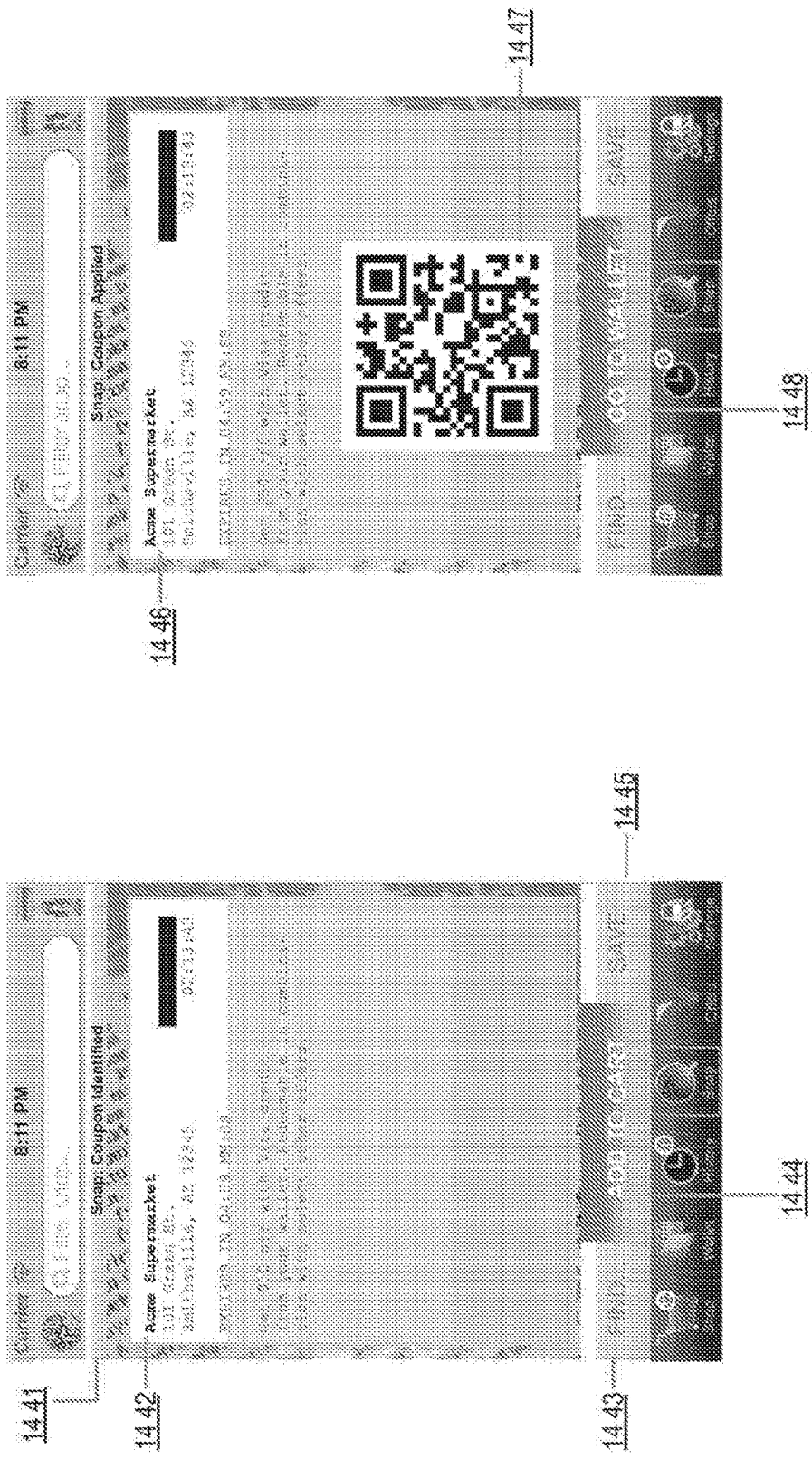
Figure 14E:
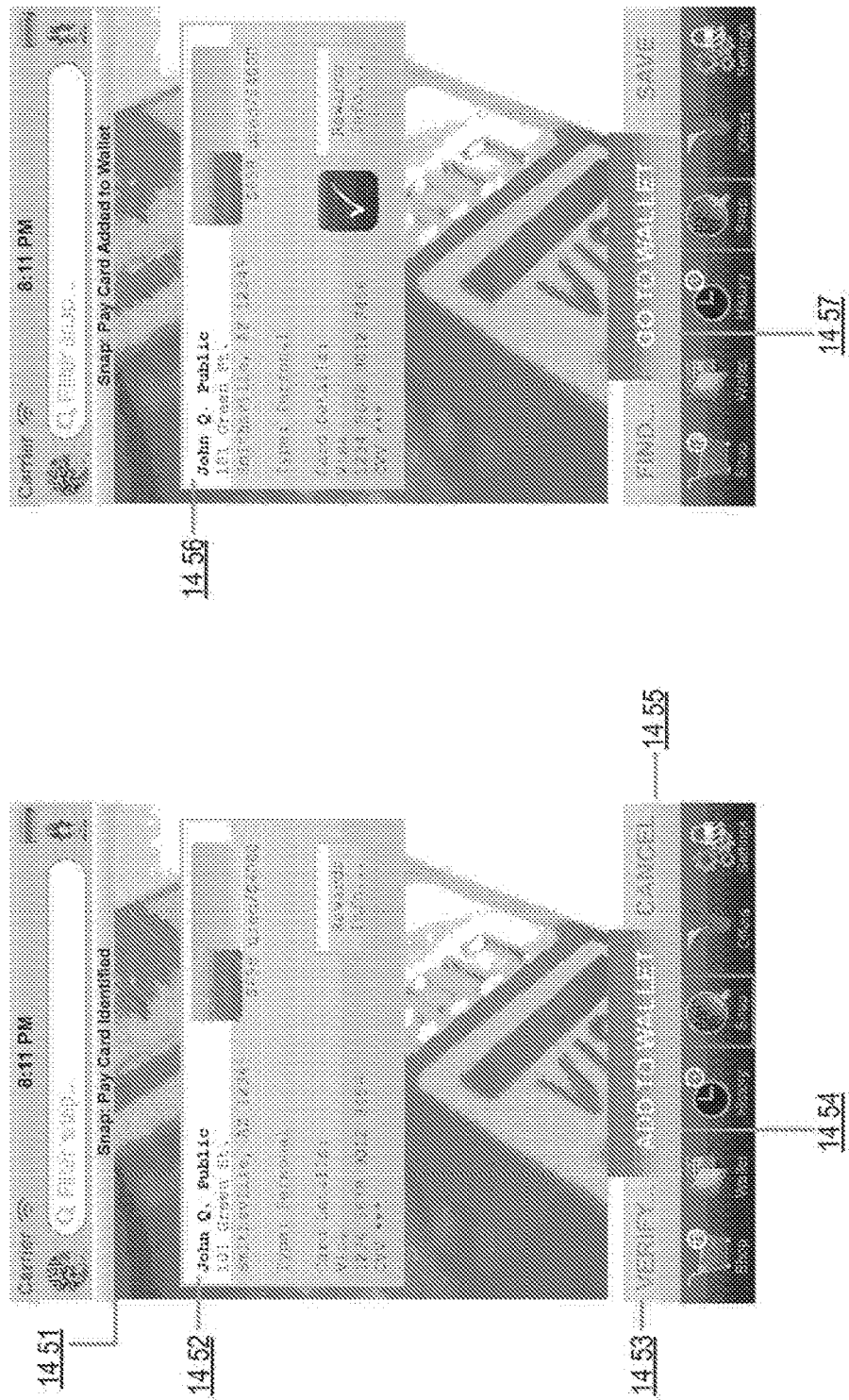

With reference to FIG. 14D, in one embodiment, the snap mode may also facilitate offer identification, application and storage for future use. For example, in one implementation, a user may snap an offer code 1441 (e.g., a bar code, a QR code, and/or the like). The wallet application may then generate an offer text 1442 from the information encoded in the offer code. The user may perform a number of actions on the offer code. For example, the user use the find button 1443 to find all merchants who accept the offer code, merchants in the proximity who accept the offer code, products from merchants that qualify for the offer code, and/or the like. The user may also apply the offer code to items that are currently in the cart using the add to cart button 1444. Furthermore, the user may also save the offer for future use by selecting the save button 1445.

In one implementation, after the offer or coupon 1446 is applied, the user may have the option to find qualifying merchants and/or products using find, the user may go to the wallet using 1448, and the user may also save the offer or coupon 446 for later use.

With reference to FIG. 4E, in one embodiment, the snap mode may also offer facilities for adding a funding source to the wallet application. In one implementation, a pay card such as a credit card, debit card, pre-paid card, smart card and other pay accounts may have an associated code such as a bar code or QR code. Such a code may have encoded therein pay card information including, but not limited to, name, address, pay card type, pay card account details, balance amount, spending limit, rewards balance, and/or the like. In one implementation, the code may be found on a face of the physical pay card. In another implementation, the code may be obtained by accessing an associated online account or another secure location. In yet another implementation, the code may be printed on a letter accompanying the pay card. A user, in one implementation, may snap a picture of the code. The wallet application may identify the pay card 1451 and may display the textual information 1452 encoded in the pay card. The user may then perform verification of the information 1452 by selecting the verify button 1453. In one implementation, the verification may include contacting the issuer of the pay card for confirmation of the decoded information 1452 and any other relevant information. In one implementation, the user may add the pay card to the wallet by selecting the 'add to wallet' button 1454. The instruction to add the pay card to the wallet may cause the pay card to appear as one of the forms of payment under the funds tab 1216 discussed in FIG. 12A. The user may also cancel importing of the pay card as a funding source by selecting the cancel button 1455. When the pay card has been added to the wallet, the user interface may be updated to indicate that the importing is complete via the notification display 1456. The user may then access the wallet 1457 to begin using the added pay card as a funding source.

Figure 15:
FIG. 15 shows a user interface diagram illustrating example features of virtual wallet applications, in an offers mode, in some embodiments of the SAT.

FIG. 15 shows a user interface diagram illustrating example features of virtual wallet applications, in an offers mode, in some embodiments of the SAT. In some implementations, the SAT may allow a user to search for offers for products and/or services from within the virtual wallet mobile application. For example, the user may enter text into a graphical user interface ("GUI") element 1511, or issue voice commands by activating GUI element 1512 and speaking commands into the device. In some implementations, the SAT may provide offers based on the user's prior behavior, demographics, current location, current cart selection or purchase items, and/or the like. For example, if a user is in a brick-and-mortar store, or an online shopping website, and leaves the (virtual) store, then the merchant associated with the store may desire to provide a sweetener deal to entice the consumer back into the (virtual) store. The merchant may provide such an offer 1513. For example, the offer may provide a discount, and may include an expiry time. In some implementations, other users may provide gifts (e.g., 1514) to the user, which the user may redeem. In some implementations, the offers section may include alerts as to payment of funds outstanding to other users (e.g., 15.5). In some implementations, the offers section may include alerts as to requesting receipt of funds from other users (e.g., 1516). For example, such a feature may identify funds receivable from other applications (e.g., mail, calendar, tasks, notes, reminder programs, alarm, etc.), or by a manual entry by the user into the virtual wallet application. In some implementations, the offers section may provide offers from participating merchants in the SAT, e.g., 1517-1519, 1520. These offers may sometimes be assembled using a combination of participating merchants, e.g., 1517. In some implementations, the SAT itself may provide offers for users contingent on the user utilizing particular payment forms from within the virtual wallet application, e.g., 1520.

Figure 16A:
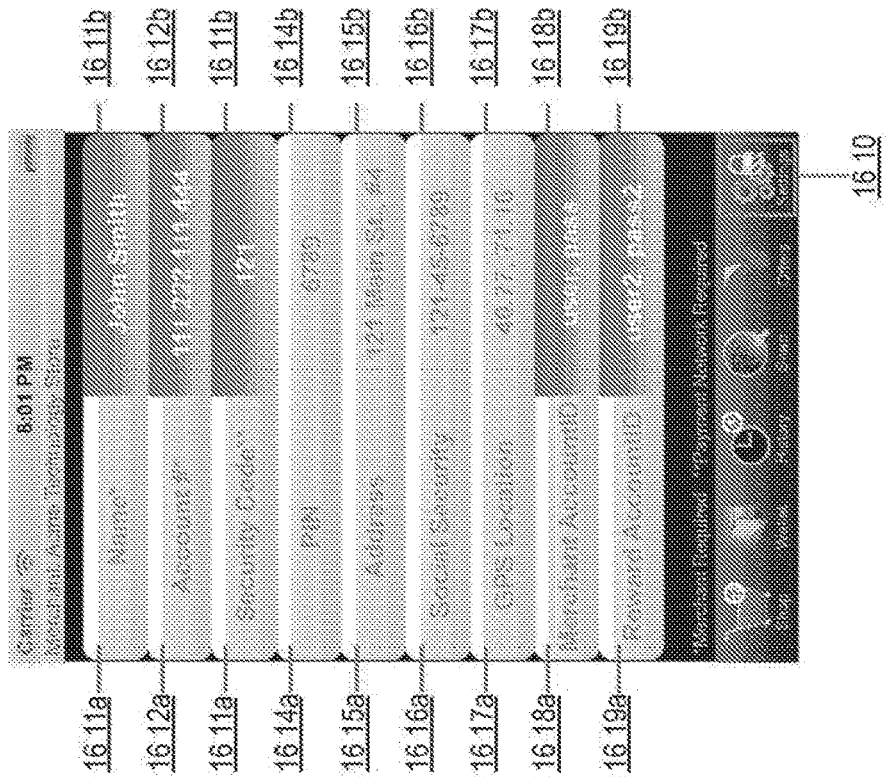
FIGS. 16A-B show user interface diagrams illustrating example features of virtual wallet applications, in a security and privacy mode, in some embodiments of the SAT.
Figure 16B:
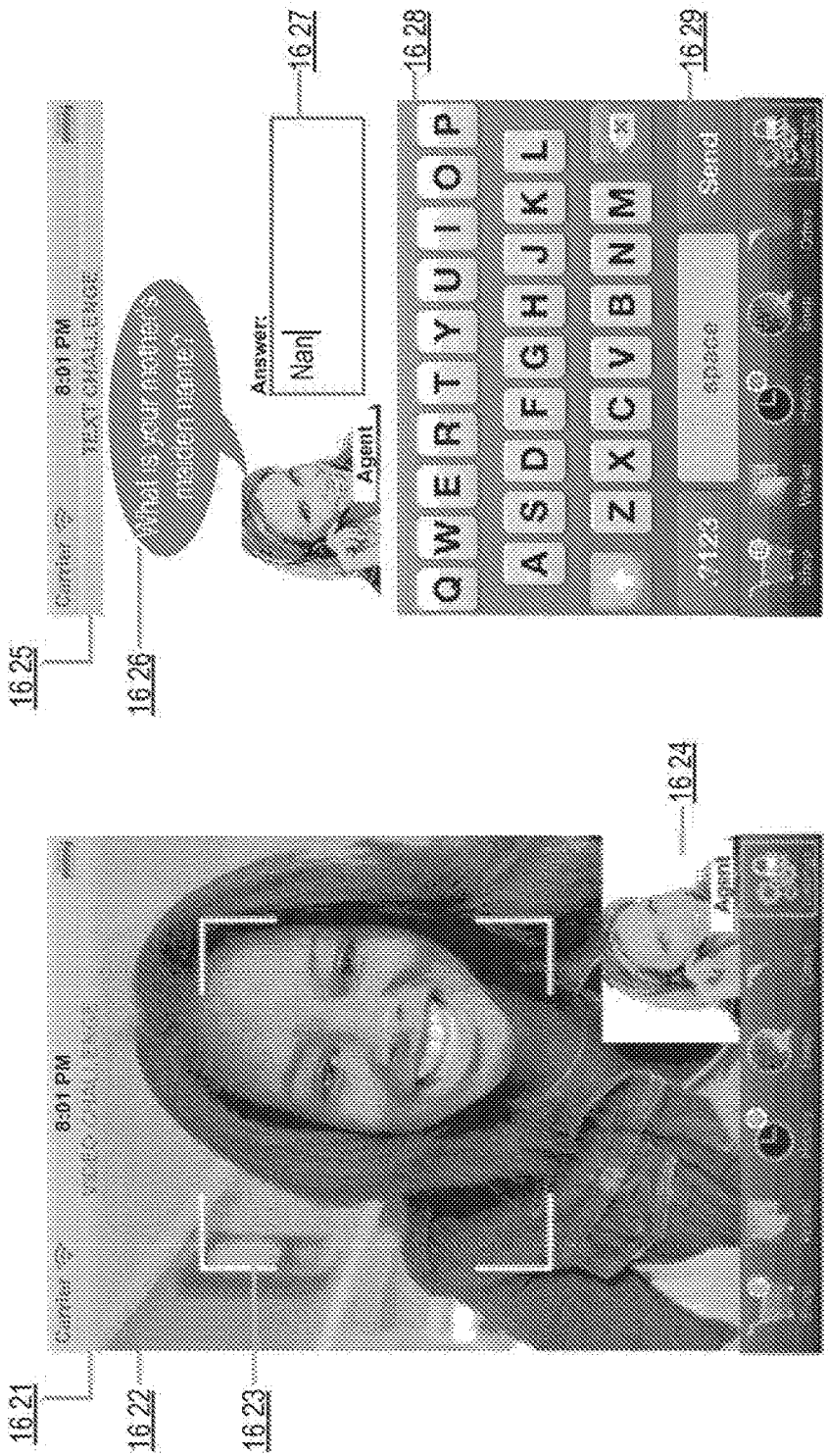

FIGS. 16A-B show user interface diagrams illustrating example features of virtual wallet applications, in a security and privacy mode, in some embodiments of the SAT. With reference to FIG. 16A, in some implementations, the user may be able to view and/or modify the user profile and/or settings of the user, e.g., by activating a user interface element. For example, the user may be able to view/modify a user name (e.g., 1611*a-b*), account number (e.g., 1612*a-b*), user security access code (e.g., 1613-*b*), user pin (e.g., 1614-*b*), user address (e.g., 1615-*b*), social security number associated with the user (e.g., 1616-*b*), current device GPS location (e.g., 1617-*b*), user account of the merchant in whose store the user currently is (e.g., 1618-*b*), the user's rewards accounts (e.g., 1619-*b*), and/or the like. In some implementations, the user may be able to select which of the data fields and their associated values should be transmitted to facilitate the purchase transaction, thus providing enhanced data security for the user. For example, in the example illustration in FIG. 16A, the user has selected the name 1611*a*, account number 1612*a*, security code 1613*a*, merchant account ID 1618*a* and rewards account ID 1619*a* as the fields to be sent as part of the notification to process the purchase transaction. In some implementations, the user may toggle the fields and/or data values that are sent as part of the notification to process the purchase transactions. In some implementations, the app may provide multiple screens of data fields and/or associated values stored for the user to select as part of the purchase order transmission. In some implementations, the app may provide the SAT with the GPS location of the user. Based on the GPS location of the user, the SAT may determine the context of the user (e.g., whether the user is in a store, doctor's office, hospital, postal service office, etc.). Based on the context, the user app may present the appropriate fields to the user, from which the user may select fields and/or field values to send as part of the purchase order transmission.

For example, a user may go to doctor's office and desire to pay the co-pay for doctor's appointment. In addition to basic transactional information such as account number and name, the app may provide the user the ability to select to transfer medical records, health information, which may be provided to the medical provider, insurance company, as well as the transaction processor to reconcile payments between the parties. In some implementations, the records may be sent in a Health Insurance Portability and Accountability Act (HIPAA)-compliant data format and encrypted, and only the recipients who are authorized to view such records may have appropriate decryption keys to decrypt and view the private user information.

With reference to FIG. 16B, in some implementations, the app executing on the user's device may provide a "VerifyChat" feature for fraud prevention. For example, the SAT may detect an unusual and/or suspicious transaction. The SAT may utilize the VerifyChat feature to communicate with the user, and verify the authenticity of the originator of the purchase transaction. In various: implementations, the SAT may send electronic mail message, text (SMS) messages, Facebook@ messages, Twitter™ tweets, text chat, voice chat, video chat (e.g., Apple FaceTime), and/or the like to communicate with the user. For example, the SAT may initiate a video challenge for the user, e.g., 1621. For example, the user may need to present him/her-self via a video chat, e.g., 1622. In some implementations, a customer service representative, e.g., agent 1624, may manually determine the authenticity of the user using the video of the user. In some implementations, the SAT may utilize face, biometric and/or like recognition (e.g., using pattern classification techniques) to determine the identity of the user. In some implementations, the app may provide reference marker (e.g., cross-hairs, target box, etc.), e.g., 1623, so that the user may the video to facilitate the SAT's automated recognition of the user. In some implementations, the user may not have initiated the transaction, e.g., the transaction is fraudulent. In such implementations, the user may cancel the challenge. The SAT may then cancel the transaction, and/or initiate fraud investigation procedures on behalf of the user.

In some implementations, the SAT may utilize a text challenge procedure to verify the authenticity of the user, e.g., 1625. For example, the SAT may communicate with the user via text chat, SMS messages, electronic mail, Facebook® messages, Twitter™ tweets, and/or the like. The SAT may pose a challenge question, e.g., 1626, for the user. The app may provide a user input interface element(s) (e.g., virtual keyboard 1628) to answer the challenge question posed by the SAT. In some implementations, the challenge question may be randomly selected by the SAT automatically; in some implementations, a customer service representative may manually communicate with the user. In some implementations, the user may not have initiated the transaction, e.g., the transaction is fraudulent. In such implementations, the user may cancel the text challenge. The SAT may cancel the transaction, and/or initiate fraud investigation on behalf of the user.

SAT Controller

FIG. 17 shows a block diagram illustrating embodiments of a SAT controller 1701. In this embodiment, the SAT controller 1701 may serve to aggregate, process, store search, serve, identify, instruct, generate, match, and/or facilitate interactions with a computer through various technologies, and/or other related data.

Typically, users, e.g., 1733*a*, which may be people and/or other systems, may engage information technology systems (e.g., computers) to facilitate information processing. In turn, computers employ processors to process information; such processors 1703 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 1729 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the SAT controller 1701 may be connected to and/or communicate with entities such as, but not limited to: one or more users from user input devices 1711; peripheral devices 1712; an optional cryptographic processor device 1728; and/or a communications network 1713. For example, the SAT controller 1701 may be connected to and/or communicate with users, e.g., 1733*a*, operating client device(s), e.g., 1733*b*, including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™, HP Slate™, Motorola Xoom™, etc.), eBook reader(s) (e.g., Amazon Kindle™, Barnes and Noble's Nook™ eReader, etc.), laptop computer(s), notebook(s), netbook(s), gaming console(s) (e.g., XBOX live™, Nintendo® DS, Sony PlayStation® Portable, etc.), portable scanner(s), and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients". The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The SAT controller 1701 may be based on computer systems that may comprise, but are not limited to, components such as: a computer systemization 1702 connected to memory 1729.

Computer Systemization

A computer systemization 1702 may comprise a clock 1730, central processing unit ("CPU(s)" and/or "processor(s)" (these terms are used interchangeable throughout the disclosure unless noted to the contrary)) 1703, a memory 1729 (e.g., a read only memory (ROM) 1706, a random access memory (RAM) 1705, etc.), and/or an interface bus 1707, and most frequently, although not necessarily, are all interconnected and/or communicating through a system bus 1704 on one or more (mother)board(s) 1702 having conductive and/or otherwise transportive circuit pathways through which instructions (e.g., binary encoded signals) may travel to effectuate communications, operations, storage, etc. The computer systemization may be connected to a power source 1786; e.g, optionally the power source may be internal. Optionally, a cryptographic processor 1726 and/or transceivers (e.g., ICs) 1774 may be connected to the system bus. In another embodiment, the cryptographic processor and/or transceivers may be connected as either internal and/or external peripheral devices 1712 via the interface bus I/O. In turn, the transceivers may be connected to antenna(s) 1775, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing SAT controller to determine its location)); Broadcom BCM4329FKUBG transceiver chip (e.g., providing 802.11n, Bluetooth 2.1+ EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 1729 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the SAT controller and beyond through various interfaces. Should processinag requirements dictate a greater amount speed and/or capacity, distributed processors (e.g., Distributed SAT), mainframe, multi-core, parallel, and/or supercomputer architectures may similarly be employed. Alternatively, should deployment requirements dictate greater portability, smaller Personal Digital Assistants (PDAs) may be employed.

Depending on the particular implementation, features of the SAT may be achieved by implementing a microcontroller such as CASs R8051XC2 microcontroller; Intel's MCS 51 (i.e., 8051 microcontroller); and/or the like. Also, to implement certain features of the SAT, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the SAT component collection (distributed or otherwise) and/or features may be implemented via the microprocessor and/or via embedded components; e.g., via ASIC, coprocessor, DSP, FPGA, and/or the like. Alternately, some implementations of the SAT may be implemented with embedded components that are configured and used to achieve a variety of features or signal processing.

Depending on the particular implementation, the embedded components may include software solutions, hardware solutions, and/or some combination of both hardware/software solutions. For example, SAT features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the SAT features. A hierarchy of programmable interconnects allow logic blocks to be interconnected as needed by the SAT system designer/administrator, somewhat like a one-chip programmable breadboard. An FPGA's logic blocks can be programmed to perform the operation of basic logic gates such as AND, and XOR, or more complex combinational operators such as decoders or simple mathematical operations. In most FPGAs, the logic blocks also include memory elements, which may be circuit flip-flops or more complete blocks of memory. In some circumstances, the SAT may be developed on regular FPGAs and then migrated into a fixed version that more resembles ASIC implementations. Alternate or coordinating implementations may migrate SAT controller features to a final ASIC instead of or in addition to FPGAs. Depending on the implementation all of the aforementioned embedded components and microprocessors may be considered the "CPU" and/or "processor" for the SAT.

Power Source

The power source 1786 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1786 is connected to at least one of the interconnected subsequent components of the SAT thereby providing an electric current to all subsequent components. In one example, the power source 1786 is connected to the stem bus component 1704. In an alternative embodiment, an outside power source 1786 is provided through a connection across the I/O 1708 interface. For example, a USB and/or IEEE 1394 connection carries both data and power across the connection and is therefore a suitable source of power.

Interface Adapters

Interface bus(ses) 1707 may accept, connect, and/or communicate to a number of interface adapters, conventionally although not necessarily in the form of adapter cards, such as but not limited to: input output interfaces (I/O) 1708, storage interfaces 1709, network interfaces 1710, and/or the like. Optionally, cryptographic processor interfaces 1727 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1709 may accept, communicate, and/or connect to a number of storage devices such as, but not limited to: storage devices 1714, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel Small Computer Systems Interface (SCSI), Universal Serial Bus (USB), and/or the like.

Network interfaces 1710 may accept, communicate, and/or connect to a communications network 1713. Through a communications network 1713, the SAT controller is accessible through remote clients 1733*b* (e.g., computers with web browsers) by users 1733*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed SAT), architectures may similarly be employed to pool, load balance, and/or otherwise increase the communicative bandwidth required by the SAT controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1710 may be used to engage with various communications network types 1713. For example, multiple network interfaces may be employed to allow for the communication over broadcast, multicast, and/or unicast networks.

Input Output interfaces (I/O) 1708 may accept, communicate, and/or connect to user input devices 1711, peripheral devices 1712, cryptographic processor devices 1728, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.1na/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 1711 often are a type of peripheral device 1712 (see below) and may include: card readers, dongles, finger print readers, gloves, graphics tablets, joysticks, keyboards, microphones, mouse (mice), remote controls, retina readers, touch screens (e.g., capacitive, resistive, etc.), trackball, trackpads, sensors (e.g., accelerometers, ambient light, GPS, gyroscopes, proximity, etc.), styluses, and/or the like.

Peripheral devices 1712 may be connected and/or communicate to I/O and/or other facilities of the like such as network interfaces, storage interfaces, directly to the interface bus, system bus, the CPU, and/or the like. Peripheral devices may be external, internal and/or part of the SAT controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 1728), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the SAT controller may be embodied as an embedded, dedicated, and/or monitor-less (i.e., headless) device, wherein access would be provided over a network interface connection.

Cryptographic units such as, but not limited to, microcontrollers, processors 1726, interfaces 1727, and/or devices 1728 may be attached, and/or communicate with the SAT controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications'40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 1729. However, memory is a fungible technology and resource, thus, any number of memory embodiments may be employed in lieu of or in concert with one another. It is to be understood that the SAT controller and/or a computer systemization may employ various forms of memory 1729. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 1729 will include ROM 1706, RAM 1705, and a storage device 1714. A storage device 1714 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 1729 may contain a collection of program and/or database components and/or data such as, but not limited to: operating system component(s) 1715 (operating system); information server component(s) 1716 (information server); user interface component(s) 1717 (user interface); Web browser component(s) 1718 (Web browser); database(s) 1719; mail server component(s) 1721; mail client component(s) 1722; cryptographic server component(s) 172o (cryptographic server); the SAT component(s) 1735; and/or the like (i.e., collectively a component collection). These components may be stored and accessed from the storage devices and/or from storage devices accessible through an interface bus. Although non-conventional program components such as those in the component collection, typically, are stored in a local storage device 1714, they may also be loaded and/or stored in memory such as: peripheral devices, RAM, remote storage facilities through a communications network, ROM, various forms of memory, and/or the like.

Operating System

The operating system component 1715 is an executable program component facilitating the operation of the SAT controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the SAT controller to communicate with other entities through a communications network 1713. Various communication protocols may be used by the SAT controller as a subcarrier transport mechanism for interaction, such as but t limited to: multicast, TCP/IP, UDP, unicast and/or the like.

Information Server

An information server component 1716 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C # and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the SAT controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the SAT database 1719, operating systems, other program components, user interfaces, Web browsers, and/or the like.

Access to the SAT database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the SAT. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the SAT as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 1717 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1718 is a stored program component that is executed by a CPU. The Web browser may be a conventional hypertext viewing application such: as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the SAT enabled nodes. The combined application may be nugatory on systems employing standard Web browsers.

Mail Server

A mail server component 1721 is a stored program component that is executed by a CPU 1703. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C # and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the SAT.

Access to the SAT mail may be achieved through a number of APIs offered by the individual Web server components and/or the operating system.

Also, a mail server may contain, communicate, generate obtain, and/or provide program component, system, user, and/or data communications, requests, information, and/or responses.

Mall Client

A mail client component 1722 is a stored program component that is executed by a CPU 1703. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1720 is a stored program component that is executed by a CPU 1703, cryptographic processor 1726, cryptographic processor interface 1727, cryptographic processor device 1728, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the SAT may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the SAT component to engage in secure transactions if so desired. The cryptographic component facilitates the secure accessing of resources on the SAT and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The SAT Database

The SAT database component 1719 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the SAT database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the SAT database is implemented as a data-structure, the use of the SAT database 1719 may be integrated into another component such as the SAT component 1735. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1719 includes several tables 1719a-p. A Users table 1719a may include fields such as, but not limited to: user_id, ssn, dob, first_name, lastLname, age, state, address_firstline, address_secondline, zipcode, devices_list, contact_info, contact_type, alt_contact_info, alt_contact_type, and/or the like. The Users table may support and/or track multiple entity accounts on a SAT. A Devices table 1719b may include fields such as, but not limited to: device_ID, device_name, device_IP, device_MAC, device_type, device_model, device_version, device_OS, device_apps_ist, device_securekey, wallet_app_installed_flag and/or the like. An Apps table 1719c may include fields such as, but not limited to: app_ID, app_name, app_type, app_dependencies, and/or the like. An Accounts table 1719d may include fields such as, but not limited to: account_number, account_security_code, account_name, issuer_acquirer_flag, issuer_name, acquirer_name, account_address, routing_number, access_API_call, linked_wallets_list, and/or the like. A Merchants table 1719e may include fields such as, but not limited to: merchant_id, merchant_name, merchant_address, ip_address, mac_address, auth_key, port_num, security_settings_ist, and/or the like. An Issuers table 1719f may include fields such as, but not limited to: issuer_id, issuer_name, issuer_address, ip_address, mac_address, auth_key, port_num, security_settings_list, and/or the like. An Acquirers table 1719g may include fields such as, but not limited to: account_firstname, account_lastname, account_type, account_num, account_balance_list, billingaddress_line1, billingaddress_line2, billing_zipcode, billing_state, shipping_preferences, shippingaddress_line1, shippingaddress_line2, shipping_zipcode, shipping_state, and/or the like. A Pay Gateways table 1719h may include fields such as, but not limited to: gateway_ID, gateway_IP, gateway_MAC, gateway_secure_key, gateway_access_list, gateway_API_call_list, gateway_services_list, and/or the like. A Transactions table 1719i may include fields such as, but not limited to: order_id, user_id, timestamp, transaction_cost, purchase_details_list, num_products, products_list, product_type, product_paramslist, product_title, product_summary, quantity, user_id, client_id, client_ip, client_type, client_model, operating_system, os_version, app_installed_flag, user_id, account_firstname, account_latname, account_type, account_num, account_priority_account_ratio, billiigaddress_liner, billingaddress_line2, billing_zipcode, billing_state, shipping_preferences, shippingaddress_line1, shippingaddress_line2, shipping_zipcode, shipping_state, merchant_id, merchant_name, merchant_auth_key, and/or the like. A Batches table 1719j may include fields such as, but not limited to: batch_id, transaction_id_list, timestamp_list, cleared_flag_list, clearance_trigger_settings, and/or the like. A Ledgers table 1719k may include fields such as, but not limited to: request_id, timestamp, deposit_amount, batch_id, transaction_id, clear_flag, deposit_account, transaction_summary, payor_name, payor_account, and/or the like. A Products table 1719l may include fields such as, but not limited to: product_ID, product_title, product_attributes_list, product_price, tax_info_list, related_products_list, offers_list, discounts_list, rewards_list, merchants_list, merchant_availability_list, and/or the like. An Offers table 1719m may include fields such as, but not limited to: offer_ID, offer_title, offer_attributes_list, offer_price, offer_expiry, related_products_list, discounts_list, rewards_list, merchants_list, merchant_availability_list, and/or the like. A Behavior Data table 1719n may include fields such as, but not limited to: user_id, timestamp, activity_type, activity_location, activity_attribute_list, activity_attribute_values_list, and/or the like. An Analytics table 1719O may include fields such as, but not limited to: report_id, user_id, report_type, report_algorithm_id, reort_destinaton_address, and/or the like. An Anonymized Accounts table 1719P may include fields such as, but not limited to: anon_id; account_id; anon_auth_request_id; and/or the like.

In one embodiment, the SAT database may interact with other database systems. For example, employing a distributed database system, queries and data access by search SAT component may treat the combination of the SAT database, an integrated data security layer database as a single database entity.

In one embodiment, user programs may contain various user interface primitives, which may serve to update the SAT. Also, various accounts may require custom database tables depending upon the environments and the types of clients the SAT may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1719a-p. The SAT may be configured to keep track of various settings, inputs, and parameters via database controllers.

The SAT database may communicate to and/or with other components in a component collection, including itself, and/or facilities of the like. Most frequently, the n SAT database communicates with the SAT component, other program components, and/or the like. The database may contain, retain, and provide information regarding other nodes and data.

The SATs

The SAT component 1735 is a stored program component that is executed by a CPU. In one embodiment, the SAT component incorporates any and/or all combinations of the aspects of the SAT discussed in the previous figures. As such, the SAT affects accessing, obtaining and the provision of information, services, transactions, and/or the like across various communications networks.

The SAT component may transform hardware-verified user authentication requests via SAT components into secure transaction notifications, and/or the like and use of the SAT. In one embodiment, the SAT component 1735 takes inputs (e.g., checkout request 211; product data 215; wallet access input 411; transaction authorization input 414; payment gateway address 419; payment network address 422; issuer server address(es) 426; funds authorization request(s) 427; user(s) account(s) data 429; batch data 812; payment network address 816; issuer server address(es) 824; individual payment request 825; payment ledger, merchant account data 831; and/or the like) etc., and transforms the inputs via various components (e.g., UPC 1741; PTA 1742; PTC 1743; 1T-ACG 1744; PIR 1745; and/or the like), into outputs (e.g., checkout request message 213; checkout data 217; card authorization request 417, 423; funds authorization response(s) 431; transaction authorization response 433; batch append data 435; purchase receipt 436; batch clearance request 814; batch payment request 818; transaction data 820; individual payment confirmation 828, 829; updated payment ledger, merchant account data 833; and/or the like).

The SAT component enabling access of information between nodes may be developed by employing standard development tools and languages such as, but not limited to: Apache components, Assembly, ActiveX, binary executables, (ANSI) (Objective-) C (++), Ca and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the SAT server employs a cryptographic server to encrypt and decrypt communications. The SAT component may communicate to and/or with other components in a component collection, including itself, and/or facilities of the like. Most frequently, the SAT component communicates with the SAT database, operating systems, other program components, and/or the like. The SAT may contain, communicate, generate, obtain, and/or provide program component, system, user, and/or data communications, requests, and/or responses.

Distributed SATs

The structure and/or operation of any of the SAT node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the SAT controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space variable passing, and/or the like.

If component collection components are discrete, separate, and/or external to one another, then communicating, obtaining, and/or providing data with and/or to other components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the SAT controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
   $input = "";
   $input = socket_read($client, 1024);
   $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference herein.

In order to address various issues and advance the art, the entirety of this application for SECURE ANONYMOUS TRANSACTION APPARATUSES, METHODS AND SYSTEMS (including the Cover Page, Title, Headings, Field, Background, Summary, Brief Description of the Drawings, Detailed Description, Claims, Abstract, Figures, Appendices and/or otherwise) shows by way of illustration various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations, including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a SAT individual and/or enterprise user, database configuration and/or relational model, data type, data transmission and/or network framework, syntax structure, and/or the like, various embodiments of the SAT may be implemented that enable a great deal of flexibility and customization. For example, aspects of the SAT may be adapted for access management; or security systems; and/or the like. While various embodiment and discussions of the SAT have been directed to electronic commerce, however, it is to be understood that the embodiments described herein may be readily configured and/or customized for a wide variety of other applications and/or implementations.

What is claimed is:

1. A computer-implemented method, comprising:
receiving, by a computer system from a merchant computer, an anonymized purchase order that comprises an anonymized shipping address, the anonymized shipping address generated by a one-time anonymous data generation component of a network server;
receiving, by the computer system from the network server, an identifier associated with the anonymized purchase order;
generating, by the computer system, an encrypted request message including a digital certificate, the encrypted request message including a request for an actual shipment address for the anonymized purchase order based at least in part on the identifier;

transmitting, by the computer system and to the network server, the encrypted request message, wherein the network server verifies the digital certificate and responds to the encrypted request message with the actual shipment address in response to verifying the digital certificate; and instructing, by the computer system, shipment of items related to the anonymized purchase order to the actual shipping address upon receiving the actual shipping address from the network server.

2. The computer-implemented method of claim 1, further comprising:
obtaining a purchase notification for the anonymized purchase order; and
providing a real-time notification to a user associated with the anonymized purchase order.

3. The computer-implemented method of claim 1, further comprising:
prior to receiving the anonymized purchase order:
obtaining, by the network server, a secure anonymous transaction user authentication request; and
verifying, by the network server, the authenticity of a user using the secure anonymous transaction user authentication request, wherein receiving the anonymized purchase order is contingent upon verifying the authenticity of the user.

4. The computer-implemented method of claim 3, wherein the user uses a user device that utilizes a hardware chip operatively connected to the user device to verify the authenticity of the user.

5. The computer-implemented method of claim 1, wherein a mobile device executing a virtual wallet application is utilized to initiate the anonymized purchase order.

6. The computer-implemented method of claim 5 wherein the virtual wallet application provides a graphical user interface element configured to initiate generating the anonymized shipping address when it is activated.

7. The computer-implemented method of claim 1, wherein the merchant computer obtains the anonymized purchase order from an associated point-of-sale terminal.

8. The computer-implemented method of claim 1, wherein the anonymized purchase order further comprises a one-time anonymized account number, the one-time anonymized account number including a card number and a card verification value number.

9. The computer-implemented method of claim 8, wherein the one-time anonymized account number is generated using random number generation.

10. The computer-implemented method of claim 8, wherein the one-time anonymized account number is generating using an encryption procedure.

11. A system, comprising:
a processor; and
a memory disposed in communication with the processor and storing processor-executable instructions to:
receive, from a merchant computer, an anonymized purchase order that comprises an anonymized shipping address, the anonymized shipping address generated by a one-time anonymous data generation component of a network server;
receive, from the network server, an identifier associated with the anonymized purchase order;
generate an encrypted request message including a digital certificate, the encrypted request message including a request for an actual shipment address for the anonymized purchase order based at least in part on the identifier;
transmit, to the network server, the encrypted request message, wherein the network server verifies the digital certificate and responds to the encrypted request message with the actual shipment address in response to verifying the digital certificate; and
instruct shipment of items related to the anonymized purchase order to the actual shipping address.

12. The system of claim 11, the memory further storing instructions to:
obtain a purchase notification for the anonymized purchase order; and
provide a real-time notification to a user associated with the anonymized purchase order.

13. The system of claim 11, wherein the anonymized purchase order includes an identification of products for purchase from a plurality of merchants.

14. The system of claim 11, wherein the anonymized purchase order includes a plurality of anonymous account numbers.

15. The system of claim 11, wherein prior to receiving the anonymized purchase order the network server obtains a secure anonymous transaction user authentication request and verifies the authenticity of a user using the secure anonymous transaction user authentication request, wherein receiving the anonymized purchase order is contingent upon verifying the authenticity of the user.

16. The system of claim 15, wherein the user users a user device that utilizes a hardware chip operatively connected to the user device to verify the authenticity of the user.

17. The system of claim 11, wherein a mobile device executing a virtual wallet application is utilized to initiate the anonymized purchase order.

18. The system of claim 17, wherein the virtual wallet application provides a graphical user interface element configured to initiate generating the anonymized shipping address when it is activated.

19. The system of claim 11, wherein the merchant computer obtains the anonymized purchase order from an associated point-of-sale terminal.

20. The system of claim 11, wherein the anonymized purchase order further comprises a one-time anonymized account number, the one-time anonymized account number including a card number and a card verification value number.

* * * * *